US012562458B2

(12) United States Patent
Lee et al.

(10) Patent No.: US 12,562,458 B2
(45) Date of Patent: Feb. 24, 2026

(54) ANTENNA AND ELECTRONIC DEVICE INCLUDING SAME

(71) Applicant: Samsung Electronics Co., Ltd., Suwon-si (KR)

(72) Inventors: Kookjoo Lee, Suwon-si (KR); Sumin Yun, Suwon-si (KR); Jaebong Chun, Suwon-si (KR); Chaejun Lee, Suwon-si (KR); Jinwoo Jung, Suwon-si (KR); Hochul Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 560 days.

(21) Appl. No.: 18/065,968

(22) Filed: Dec. 14, 2022

(65) Prior Publication Data

US 2023/0110601 A1 Apr. 13, 2023

Related U.S. Application Data

(63) Continuation of application No. PCT/KR2021/007798, filed on Jun. 22, 2021.

(30) Foreign Application Priority Data

Jun. 29, 2020 (KR) ........................ 10-2020-0079353

(51) Int. Cl.
*H01Q 1/24* (2006.01)
*H01Q 3/34* (2006.01)
*H01Q 9/04* (2006.01)

(52) U.S. Cl.
CPC ............... *H01Q 1/243* (2013.01); *H01Q 3/34* (2013.01); *H01Q 9/0407* (2013.01)

(58) Field of Classification Search
CPC ......... H01Q 1/243; H01Q 3/34; H01Q 9/0407
(Continued)

(56) References Cited

U.S. PATENT DOCUMENTS 8,044,874 B2 10/2011 Parsche
8,213,757 B2 7/2012 Harrysson et al.
(Continued)

FOREIGN PATENT DOCUMENTS

JP 2001-267832 A 9/2001
JP 2002-084123 A 3/2002
(Continued)

OTHER PUBLICATIONS

Korean Office Action dated Jun. 24, 2024, issued in Korean Application No. 10-2020-0079353.

*Primary Examiner* — Michael R Neff
(74) *Attorney, Agent, or Firm* — Jefferson IP Law, LLP

(57) ABSTRACT

An electronic device is provided. The electronic device includes a housing including a front cover, a rear cover facing the direction opposite to that of the front cover, and a lateral member encompassing the space between the front cover and the rear cover, a display panel, a dielectric sheet, a first mesh pattern part formed through a plurality of first conductive lines in the dielectric sheet, and a wireless communication circuit, and which is electrically connected to the first mesh pattern part, wherein the first mesh pattern part is formed so that the inner length of a first line facing a first direction, is longer than the inner length of a second line, and the unit pattern is formed so that the inner length of a third line, is longer than the inner length of a fourth line.

20 Claims, 46 Drawing Sheets

(58) Field of Classification Search
USPC .......................................................... 455/566
See application file for complete search history.

(56) References Cited

U.S. PATENT DOCUMENTS

| | | | | |
|---|---|---|---|---|
| 8,860,612 | B2 | 10/2014 | Kim | |
| 10,381,750 | B2 | 8/2019 | Jung et al. | |
| 2015/0255856 | A1* | 9/2015 | Hong | H01Q 21/061 343/702 |
| 2016/0093939 | A1 | 3/2016 | Kim et al. | |
| 2016/0344089 | A1 | 11/2016 | Baik et al. | |
| 2019/0058264 | A1* | 2/2019 | Jung | H01Q 9/0435 |
| 2020/0227835 | A1 | 7/2020 | Kim et al. | |
| 2020/0251813 | A1* | 8/2020 | Ryu | H01Q 1/38 |
| 2021/0126348 | A1 | 4/2021 | Kim et al. | |

FOREIGN PATENT DOCUMENTS

| | | | |
|---|---|---|---|
| KR | 10-2015-0104509 | A | 9/2015 |
| KR | 10-2016-0036436 | A | 4/2016 |
| KR | 10-2016-0137315 | A | 11/2016 |
| KR | 10-2019-0019802 | A | 2/2019 |
| KR | 10-1971490 | B1 | 4/2019 |
| KR | 10-2020-0005010 | A | 1/2020 |
| KR | 10-2020-0039321 | A | 4/2020 |

* cited by examiner

ANTENNA AND ELECTRONIC DEVICE INCLUDING SAME

CROSS-REFERENCE TO RELATED APPLICATION(S)

This application is a continuation application, claiming priority under § 365 (c), of an International application No. PCT/KR2021/007798, filed on Jun. 22, 2021, which is based on and claims the benefit of a Korean patent application number 10-2020-0079353, filed on Jun. 29, 2020, in the Korean Intellectual Property Office, the disclosure of which is incorporated by reference herein in its entirety.

BACKGROUND

1. Field

The disclosure relates to an antenna, and an electronic device including the same.

2. Description of Related Art

With the development of wireless communication technologies, electronic devices (e.g., communication electronic devices) are widely used in everyday life, and thus the use of content increases exponentially. Due to the rapid increase in the use of the content, the usage of the network is approaching capacity limit. After commercialization of 4th generation (4G) communication systems, in order to meet growing wireless data traffic demand, a communication system (e.g., 5th generation (5G), pre-5G communication system, or new radio (NR)) that transmits and/or receives signals using a frequency of a high frequency (e.g., millimeter wave (mmWave)) band (e.g., 3 gigahertz (GHz) to 300 GHz band) is being developed.

The above information is presented as background information only to assist with an understanding of the disclosure. No determination has been made, and no assertion is made, as to whether any of the above might be applicable as prior art with regard to the disclosure.

SUMMARY

An electronic device may include an antenna capable of transmitting and receiving a signal using a frequency ranging from about 3 GHz to about 100 GHz. The antenna is being developed to have an efficient mounting structure and various forms corresponding to the structure to overcome high free space loss due to high frequency characteristics and increase gain. For example, the antenna may include an antenna array in which at least one antenna element (e.g., at least one conductive pattern and/or at least one conductive patch) is arranged at regular intervals on a substrate (e.g., a printed circuit board (PCB)). These antenna elements may have the same or different phases inside the electronic device, and may be placed to form a beam pattern in at least one direction using this phase difference.

The antenna may be constrained in radiation direction due to peripheral conductors (e.g., a conductive frame or a bezel) of the electronic device. For example, the radiation performance of the antenna may be degraded due to peripheral conductors (e.g., a conductive frame or a side bezel) of the electronic device. Also, in case that the display including a conductive layer occupies most of the front surface of the electronic device, the antenna arranged in the inner space of the electronic device may have difficulty in front radiation.

The antenna may be arranged between the display panel and the front cover (e.g., a window layer or a front plate) for radiation in a front direction toward which the display of the electronic device faces. In this case, in order to achieve smooth radiation performance while ensuring visibility of the display, the antenna may be formed in a manner that removes a portion of the conductive mesh pattern arranged on the dielectric sheet.

However, the antenna formed as a part of the conductive mesh pattern may have degraded polarization isolation and/or cross-polarization discrimination (XPD) in dual polarization feeding structure in which feeders are symmetrically arranged to be orthogonal to each other, due to the difference in the electrical effective lengths in the horizontal and vertical directions.

Aspects of the disclosure are to address at least the above-mentioned problems and/or disadvantages and to provide at least the advantages described below. Accordingly, an aspect of the disclosure is to provide an antenna and an electronic device including the same.

Another aspect of the disclosure is to provide an antenna capable of improving polarization isolation and/or cross-polarization discrimination in a dual polarization feeding structure, and an electronic device including the same.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a front cover, a rear cover facing a direction opposite to a direction of the front cover, and a lateral member encompassing a space between the front cover and the rear cover, a display panel which is arranged in the space and which is arranged to be viewable from an outside through the front cover, a dielectric sheet arranged between the display panel and the front cover, a first mesh pattern part formed through a plurality of first conductive lines in the dielectric sheet, and a wireless communication circuit which is arranged in the space, and which is electrically connected to the first mesh pattern part, wherein the first mesh pattern part is formed so that an inner length of a first line, which passes through a first center of the first mesh pattern part and faces a first direction, is longer than the inner length of a second line, which passes through the first center and faces a second direction perpendicular to the first direction, the first mesh pattern includes at least one unit pattern, and the unit pattern is formed so that the inner length of a third line, which passes through a second center of the unit pattern and is at an angle range of 0 to 45 degrees with respect to the first direction, is longer than the inner length of a fourth line, which passes through the second center of the unit pattern and is perpendicular to the third line.

In accordance with another aspect of the disclosure, a display is provided. The display includes a display panel, a dielectric sheet arranged on the display panel, and a first mesh pattern part formed in the dielectric sheet through a plurality of conductive lines and operated as an antenna. The first mesh pattern part is formed so that an inner length of a first line passing through a first center of the first mesh pattern part and facing a first direction is formed to be longer than an inner length of a second line passing through the first center and facing a second direction perpendicular to the first direction. The first mesh pattern part includes at least one unit pattern. The unit pattern may be formed so that an inner length of a third line passing through a second center of the unit pattern and forming an angle in the range of 0 degrees to 45 degrees with the first direction is formed longer than an inner length of a fourth line perpendicular to the third line.

According to various embodiments of the disclosure, the polarization isolation and/or cross-polarization discrimination in the dual polarization feeding structure may be improved through the shape change of the conductive mesh pattern.

Other aspects, advantages, and salient features of the disclosure will become apparent to those skilled in the art from the following description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
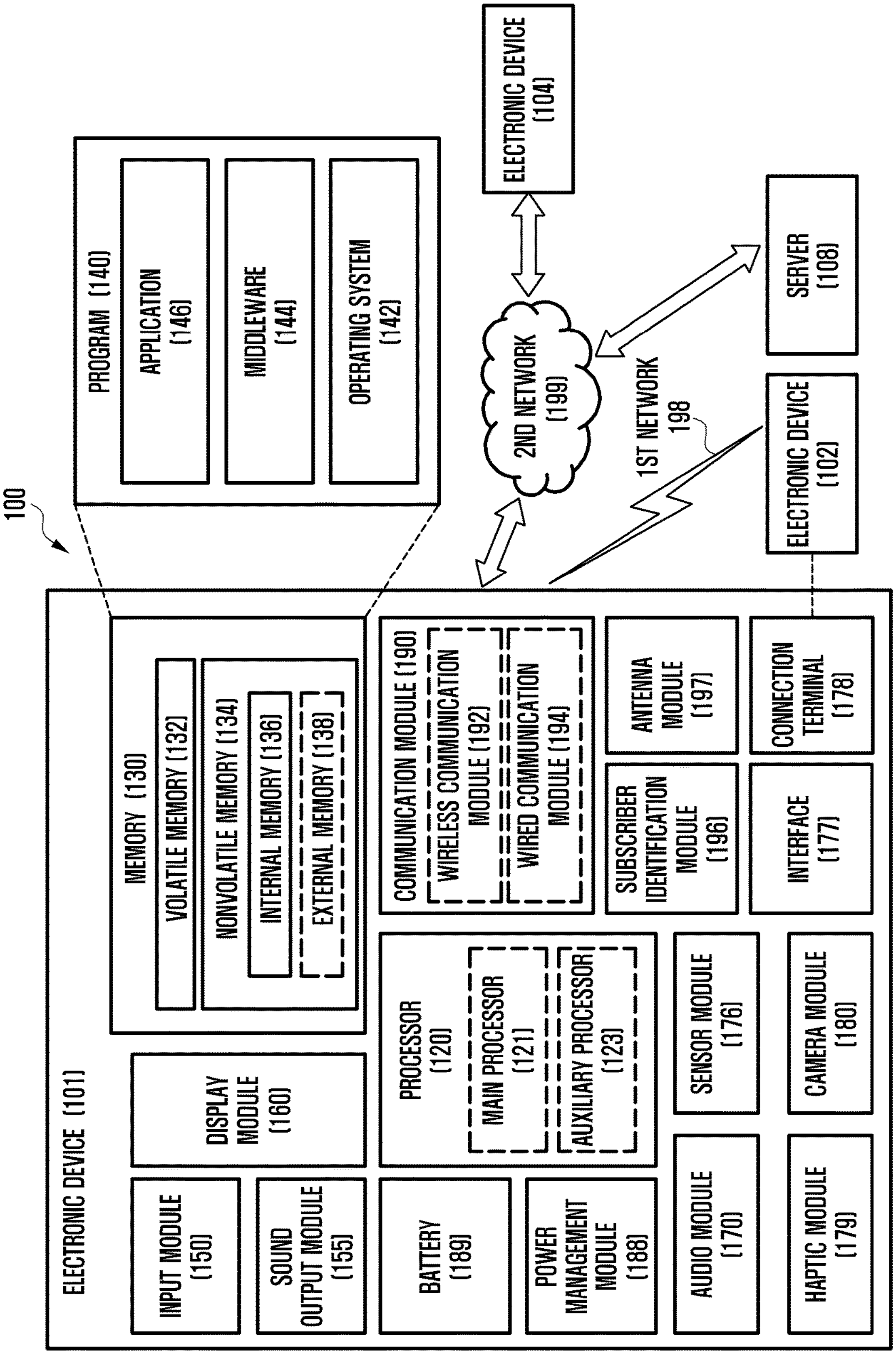
FIG. 1 illustrates a block view of an electronic device inside a network environment, according to an embodiment of the disclosure.

FIG. 1 is a block diagram illustrating an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. the non-volatile memory 134 may include internal memory 136 and external memory 138.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the displays, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture an image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to an embodiment may be one of various types of electronic devices. The electronic device may include a portable communication device (e.g., a smart phone), a computer device, a portable multimedia device, a portable medical device, a camera, a wearable device, or a home appliance. However, the electronic device is not limited to any of those described above.

Certain embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
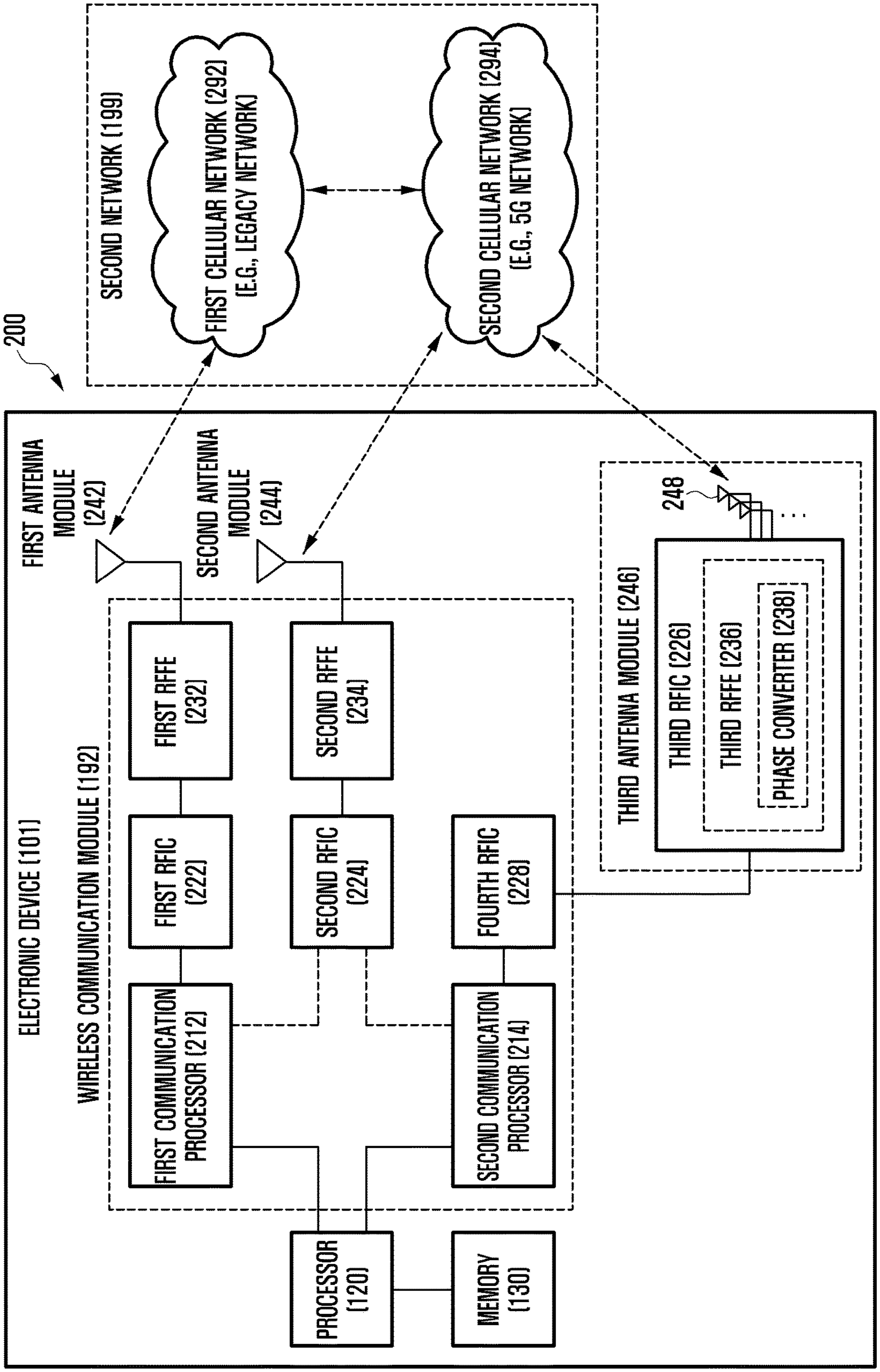
FIG. 2 illustrates a block view of an electronic device for supporting legacy network communication and 5G network communication according to an embodiment of the disclosure.

FIG. 2 is a block diagram illustrating an example configuration of an electronic device in a network environment including a plurality of cellular networks according to an embodiment of the disclosure.

Referring to FIG. 2, the electronic device 101 a network environment 200 may include a first communication processor (e.g., including processing circuitry) 212, second communication processor (e.g., including processing circuitry) 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel. According to various embodiments, the first cellular network may be a legacy network including a second generation (2G), third generation (3G), 4G, or long term evolution (LTE) network. The second communication processor 214 may include various processing circuitry and establish a communication channel corresponding to a designated band (e.g., about 6 GHz to about 60 GHZ) of bands to be used for wireless communication with the second cellular network 294, and support 5G network communication through the established communication channel. According to various embodiments, the second cellular network 294 may be a 5G network defined in third generation partnership project (3GPP). Additionally, according to an embodiment, the first communication processor 212 or the second communication processor 214 may establish a communication channel corresponding to another designated band (e.g., about 6 GHZ or less) of bands to be used for wireless communication with the second cellular network 294 and support 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 megahertz (MHZ) to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHZ) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHZ) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHZ) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
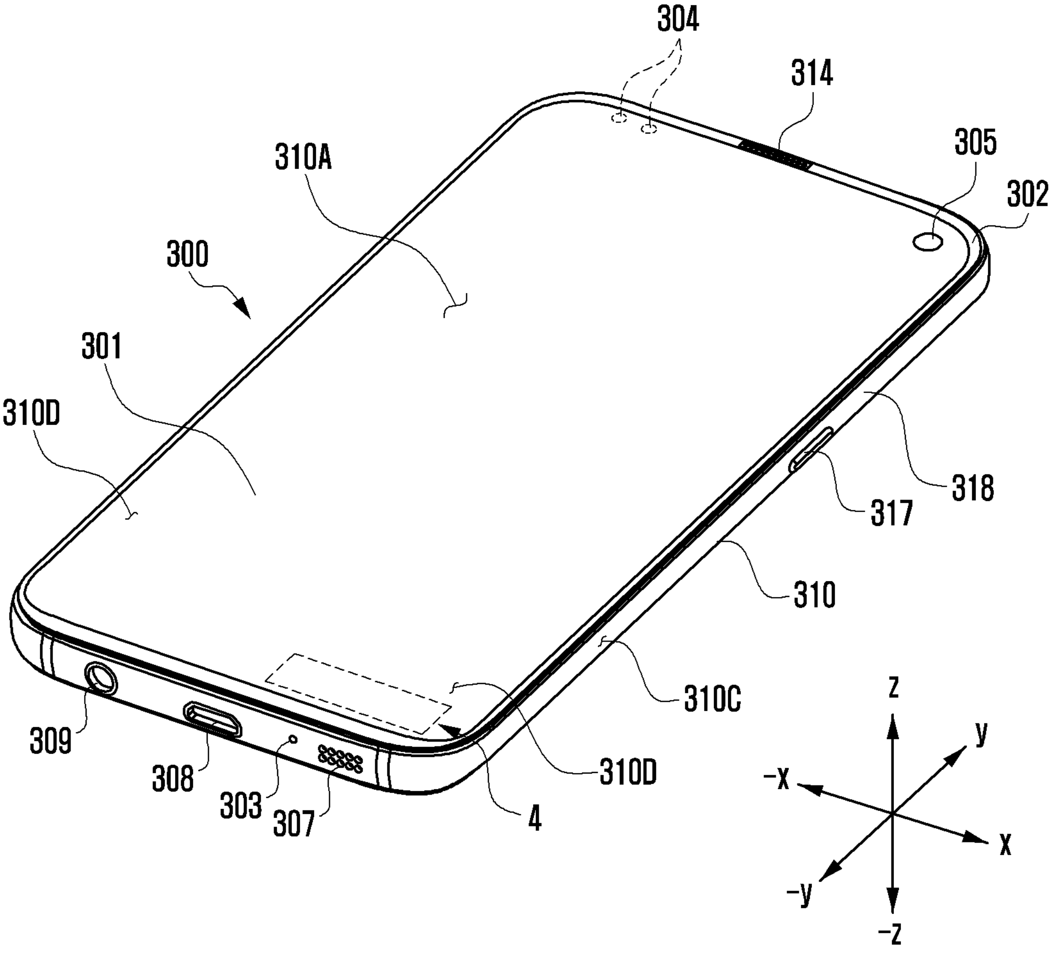
FIG. 3A illustrates a perspective view of a mobile electronic device according to an embodiment of the disclosure.
Figure 3B:
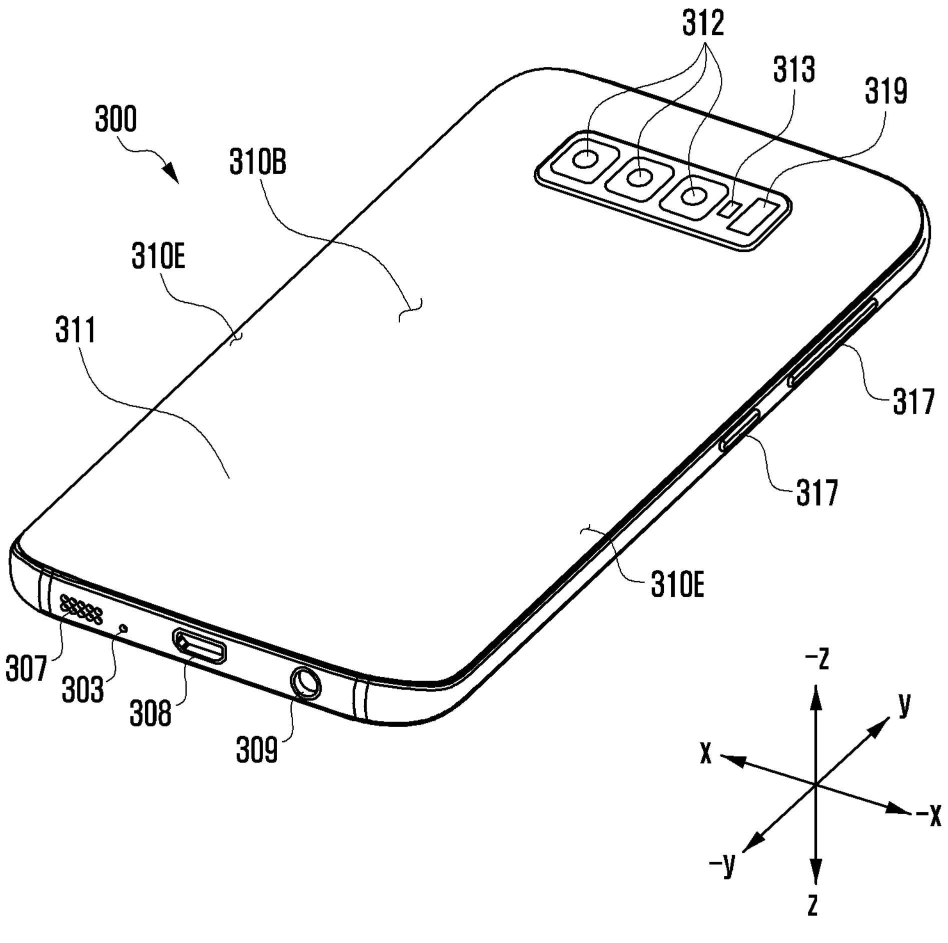
FIG. 3B illustrates a rear perspective view of a mobile electronic device according to an embodiment of the disclosure.

FIG. 3A is a front perspective view of a mobile electronic device according to an embodiment of the disclosure, and FIG. 3B is a rear perspective view of the mobile electronic device shown in FIG. 3A according to an embodiment of the disclosure.

The electronic device 300 in FIGS. 3A and 3B may be at least partially similar to the electronic device 101 in FIG. 1 or may further include various embodiments.

Referring to FIGS. 3A and 3B, a mobile electronic device 300 may include a housing 310 that includes a first surface (or front surface) 310A, a second surface (or rear surface) 310B, and a lateral surface 310C that surrounds a space between the first surface 310A and the second surface 310B. The housing 310 may refer to a structure that forms a part of the first surface 310A, the second surface 310B, and the lateral surface 310C. The first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") 318 which is combined with the front plate 302 and the rear plate 311 and includes a metal and/or polymer. The rear plate 311 and the lateral bezel structure 318 may be integrally formed and may be of the same material (e.g., a metallic material such as aluminum).

The front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. The front plate 302 (or the rear plate 311) may include only one of the first regions 310D (or of the second regions 310E). The first regions 310D or the second regions 310E may be omitted in part. When viewed from a lateral side of the mobile electronic device 300, the lateral bezel structure 318 may have a first thickness (or width) on a lateral side where the first region 310D or the second region 310E is not included, and may have a second thickness, being less than the first thickness, on another lateral side where the first region 310D or the second region 310E is included.

The mobile electronic device 300 may include at least one of a display 301, audio modules 303, 307 and 314, sensor modules 304 and 319, camera modules 305, 312 and 313, a key input device 317, a light emitting device, and connector holes 308 and 309. The mobile electronic device 300 may omit at least one (e.g., the key input device 317 or the light emitting device) of the above components, or may further include other components.

The display 301 may be visible through a substantial portion of the front plate 302, for example. At least a part of the display 301 may be visible through the front plate 302 that forms the first surface 310A and the first region 310D of the lateral surface 310C. Outlines (i.e., edges and corners) of the display 301 may have substantially the same form as those of the front plate 302. The spacing between the outline of the display 301 and the outline of the front plate 302 may be substantially unchanged in order to enlarge the visible area of the display 301.

The audio modules 303, 307 and 314 may correspond to a microphone hole 303 and speaker holes 307 and 314, respectively. The microphone hole 303 may contain a microphone disposed therein for acquiring external sounds and, in a case, contain a plurality of microphones to sense a sound direction. The speaker holes 307 and 314 may be classified into an external speaker hole 307 and a call receiver hole 314. The microphone hole 303 and the speaker holes 307 and 314 may be implemented as a single hole, or a speaker (e.g., a piezo speaker) may be provided without the speaker holes 307 and 314.

The sensor modules 304 and 319 may generate electrical signals or data corresponding to an internal operating state of the mobile electronic device 300 or to an external environmental condition. The sensor modules 304 and 319 may include a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) and/or a fourth sensor module (e.g., a fingerprint sensor) disposed on the second surface 310B of the housing 310. The fingerprint sensor may be disposed on the second surface 310B as well as the first surface 310A (e.g., the display 301) of the housing 310. The electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312 and 313 may include a first camera device 305 disposed on the first surface 310A of the electronic device 300, and a second camera module 312 and/or a flash 313 disposed on the second surface 310B. The camera module 305 or the camera module 312 may include one or more lenses, an image sensor, and/or an image signal processor. The flash 313 may include, for example, a light emitting diode or a xenon lamp. Two or more lenses (infrared cameras, wide angle and telephoto lenses) and image sensors may be disposed on one side of the electronic device 300.

The key input device 317 may be disposed on the lateral surface 310C of the housing 310. The mobile electronic device 300 may not include some or all of the key input device 317 described above, and the key input device 317 which is not included may be implemented in another form such as a soft key on the display 301. The key input device 317 may include the sensor module disposed on the second surface 310B of the housing 310.

The light emitting device may be disposed on the first surface 310A of the housing 310. For example, the light emitting device may provide status information of the electronic device 300 in an optical form. The light emitting device may provide a light source associated with the operation of the camera module 305. The light emitting device may include, for example, a light emitting diode (LED), an IR LED, or a xenon lamp.

The connector holes 308 and 309 may include a first connector hole 308 adapted for a connector (e.g., a universal serial bus (USB) connector) for transmitting and receiving power and/or data to and from an external electronic device, and/or a second connector hole 309 adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. In an embodiment, some sensor modules 304 may be arranged to perform their functions without being visually exposed through the front plate 302 in the internal space of the electronic device. For example, in this case, an area of the display 301 facing the sensor module may not require a perforated opening.

Figure 3C:
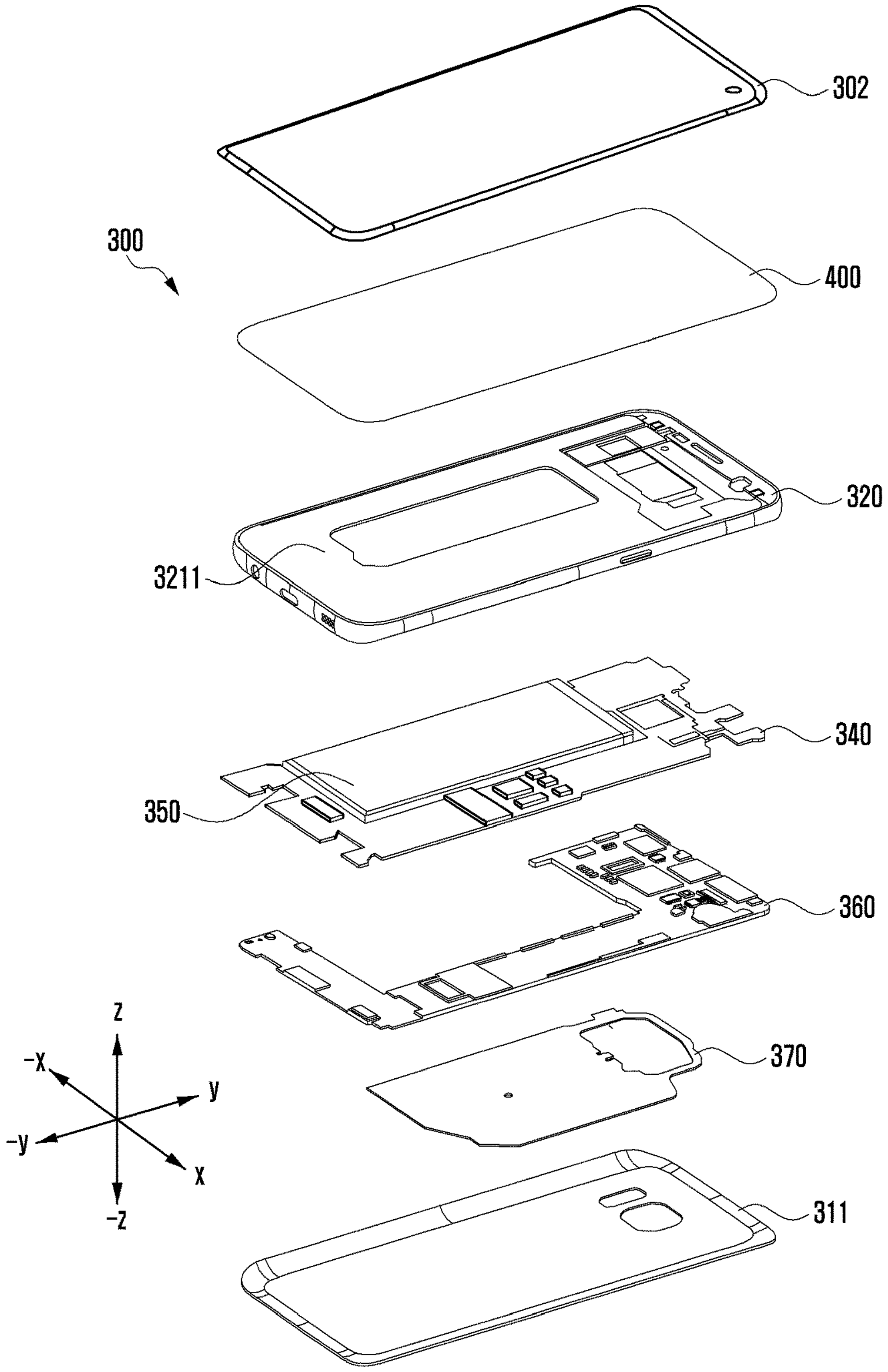
FIG. 3C illustrates an exploded perspective view of a mobile electronic device according to an embodiment of the disclosure.

FIG. 3C is an exploded perspective view illustrating the mobile electronic device shown in FIG. 3A according to an embodiment of the disclosure.

Referring to FIG. 3C a mobile electronic device 300 may include a lateral bezel structure 320, a first support member 3211 (e.g., a bracket), a front plate 302, a display 301, an electromagnetic induction panel (not shown), a printed circuit board (PCB) 340, a battery 350, a second support member 360 (e.g., a rear case), an antenna 370, and a rear plate 311. The mobile electronic device 300 may omit at least one (e.g., the first support member 3211 or the second support member 360) of the above components or may further include another component. Some components of the electronic device 300 may be the same as or similar to those of the mobile electronic device 101 shown in FIG. 3A or 3B, thus, descriptions thereof are omitted below.

The first support member 3211 is disposed inside the mobile electronic device 300 and may be connected to, or integrated with, the lateral bezel structure 320. The first support member 3211 may be formed of, for example, a metallic material and/or a non-metal (e.g., polymer) material. The first support member 3211 may be combined with the display 301 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 311 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 320 and/or the first support member 3211.

Figure 4:
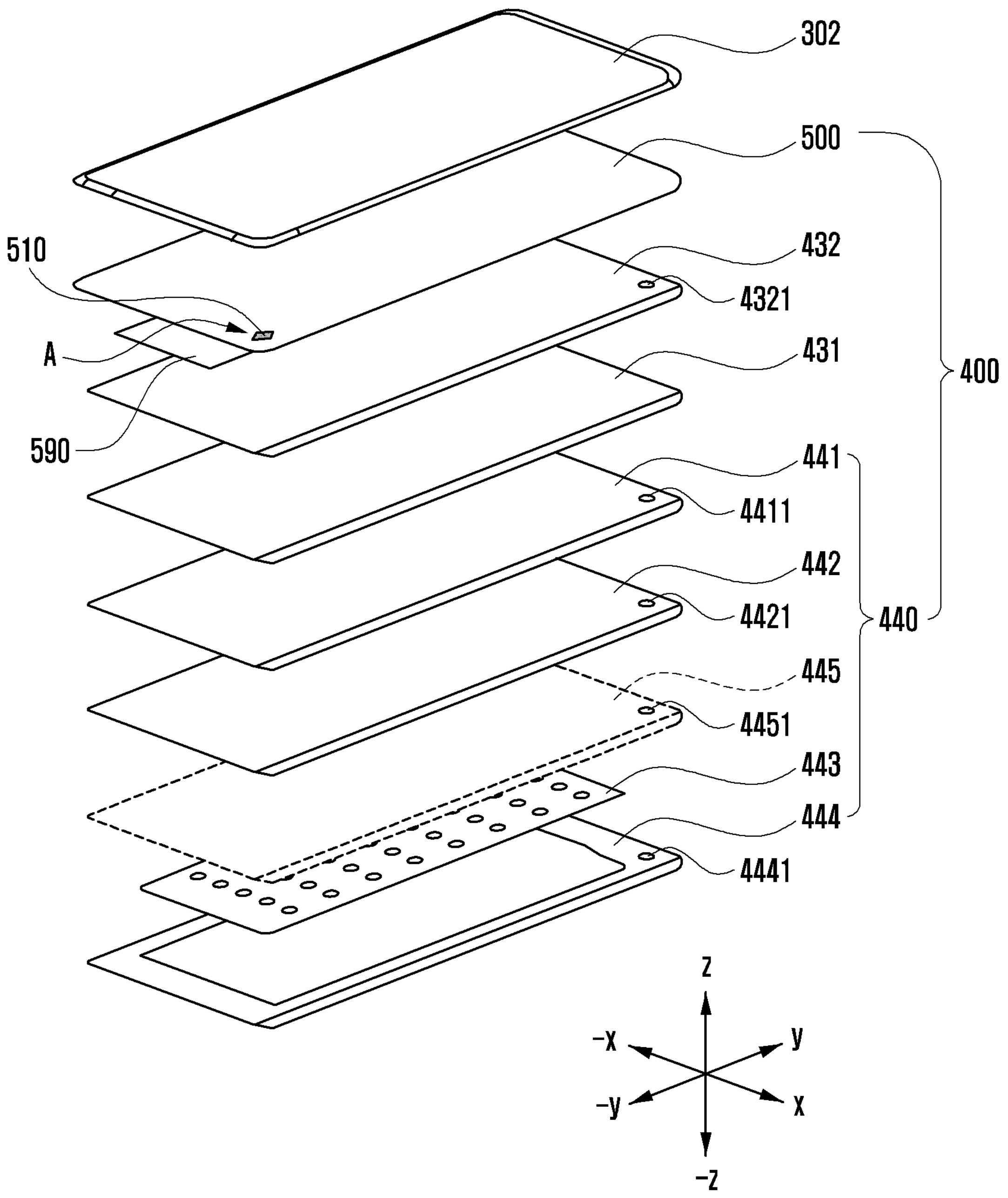
FIG. 4 illustrates an exploded perspective view of a display according to an embodiment of the disclosure.

FIG. 4 illustrates an exploded perspective view of a display according to an embodiment of the disclosure.

A display 400 in FIG. 4 may be similar, at least in part, to the display 301 in FIG. 3A, or may further include other embodiment of a display.

Referring to FIG. 4, a display 400 may include a dielectric sheet 500 stacked through an adhesive member on a rear surface of the front cover 302 (e.g., a front plate, a glass plate, a first cover member, or a cover member), a polarizer (POL) 432 (e.g., polarizing film), a display panel 431, and/or at least one additional layer 440. According to an embodiment, the adhesive member may include an optical clear adhesive (OCA), a pressure sensitive adhesive (PSA), a heat-reactive adhesive, a normal adhesive, or a double-sided tape. According to an embodiment, the display panel 431 and the POL 432 may be integrally formed. According to another embodiment, the display 400 may further include a touch sensor (e.g., a touch sensor 800 in FIG. 23) arranged between the front cover 302 and the polarizer 432, between the display panel 431 and the polarizer 432, or on the display panel 431.

According to various embodiments, the display 400 may include a control circuit (not illustrated). According to an embodiment, the control circuit may include a flexible printed circuit board (FPCB) for electrically connecting a printed circuit board (e.g., the printed circuit board 340 in FIG. 3C) of an electronic device (e.g., the electronic device 300 in FIG. 3C) and the display panel 431, and a display driver IC (DDI) mounted on the FPCB. According to an embodiment, the display 400 may include a touch sensor. In a case that the display 400 operates as a touch display of an in-cell or on-cell type depending on the arrangement position of the touch sensor, the control circuit may include a touch display driver integrated circuit (TDDI). In another embodiment, the display 400 may also include a fingerprint sensor (not illustrated) arranged near the control circuit. According to an embodiment, the fingerprint sensor may include an ultrasonic or optical fingerprint sensor capable of recognizing, through a hole formed at least partially in some of components of the display 400, a fingerprint of a finger that is in contact with or close to the outer surface of the front cover 302.

According to various embodiments, the display 400 may include a dielectric sheet 500 arranged under the front cover 302. According to an embodiment, the dielectric sheet 500 may include at least one mesh pattern part 510 formed through a plurality of conductive lines (e.g., conductive lines 515 in FIG. 5C). According to an embodiment, the at least one mesh pattern part 510 may operate as an antenna A by being electrically connected to a wireless communication circuit (e.g., a wireless communication circuit 591 in FIG. 5B) (e.g., the wireless communication module 192 in FIG. 1) of an electronic device (e.g., the electronic device 300 in FIG. 3A) through a flexible printed circuit board (FPCB) 590 drawn from the dielectric sheet 500. According to an embodiment, the wireless communication circuit 192 may be configured to transmit and/or receive a wireless signal in a frequency band (e.g., about 3 GHz to about 100 GHz) specified through at least one mesh pattern part 510. In some embodiments, the at least one mesh pattern part 510 may operate as an array antenna by including at least two mesh pattern parts spaced apart from each other at a predetermined interval in the dielectric sheet 500. According to an embodiment, the antenna A including the mesh pattern part 510 may form a beam pattern in a direction (z-axis direction) the front cover 302 of the electronic device 300 is facing. According to an embodiment, the antenna A including the mesh pattern part 510 may be arranged at a position overlapping the active area (display area) of the display panel 431 when the front cover 302 is viewed from above. In some embodiments, the antenna A may be arranged in an area overlapping an inactive area (non-display area) of the display panel 431. For example, the antenna A including the mesh pattern part 510 may be arranged in the area 4 of FIG. 3A, but is not limited thereto. In some embodiments, the antenna A including the mesh pattern part 510 may be arranged to overlap various positions of the display 400. In some embodiments, in a case that a plurality of antennas A including at least one mesh pattern part 510 is arranged, at least some of the plurality of antennas A may be arranged in different regions overlapping the display.

According to various embodiments, the antenna A including at least one mesh pattern part 510 may include two feeders for constituting two polarizations orthogonal to each other. According to an embodiment, the two feeders include a first feeder arranged at a first point on a first imaginary line passing through the center of the at least one mesh pattern part 510, and a second feeder arranged at a second point on a second virtual line passing through the center of the at least one mesh pattern part 510 and crossing the first virtual line. According to an embodiment, a conductive member 444

(e.g., a metal sheet) of the display 400 may be applied as a ground for the antenna A including at least one mesh pattern part 510.

According to various embodiments, the at least one additional layer 440 may include at least one polymer members 441, 442 arranged on the rear surface (−z-axis direction) of the display panel 431, at least one functional member 443 arranged on the rear surface (−z-axis direction) of the at least one polymer members 441, 442, and a conductive member 444 arranged on the rear surface (−z-axis direction) of the at least one functional member 443. According to an embodiment, the at least one polymer members 441, 442 may include a light-shielding layer 441 (e.g., a black layer having an uneven pattern) and/or a cushion layer 442. The light-shielding layer 441 not only removes air bubbles that may occur between the display panel 431 and underlying layers, but also blocks light generated from the display panel 431 or light incident from the outside. The cushion layer 442 is arranged to relieve a shock. According to an embodiment, the at least one functional member 443 may include a heat dissipation sheet for heat dissipation (e.g., a graphite sheet), a force-touch FPCB, a fingerprint sensor FPCB, a communication antenna radiator, a conductive/non-conductive tape, an open cell sponge, or the like. According to an embodiment, the conductive member 444 may be a metal sheet (e.g., metal plate) that may be used for reinforcing the rigidity of an electronic device (e.g., the electronic device 300 in FIGS. 3A to 3C), shielding ambient noise, and dissipating heat released from surrounding heat-releasing components. In an embodiment, the conductive member 444 may include copper (Cu), aluminum (Al), magnesium (Mg), stainless steel (SUS), or a clad (e.g., a laminated member in which SUS and Al are alternately arranged). In another embodiment, the display 400 may further include a detection member 445 for detecting an input action by an electronic pen of an electromagnetic induction type. According to an embodiment, the detection member 445 may include a digitizer. According to an embodiment, the detection member 445 may be arranged between the at least one polymer member 442 and the functional member 443. In another embodiment, the detection member 445 may be arranged between the display panel 431 and the at least one polymer member 441.

According to various embodiments, the additional layer 440 may have openings 4321, 4411, 4421, 4441, or 4451 arranged in the inner space of the electronic device 300. For example, these openings 4321, 4411, 4421, 4441, or 4451 may be utilized as a path for external environment detection for a sensor module (e.g., the sensor module 304 in FIG. 3A) and/or a camera device (e.g., a camera device 305 in FIG. 3A) arranged in the inner space of the electronic device 300. In another embodiment, the polarizer 432 may be treated transparently or have a removed polarization characteristic at a position corresponding to the sensor module and/or camera device without the opening 4321. In another embodiment, the display panel 431 may be formed without an opening so that the transmittance of a position corresponding to the sensor module and/or the camera device is higher than that of the surrounding area. In this case, the region of the display panel 431 corresponding to the sensor module and/or the camera device may be formed to have a pixel and/or wiring structure omitted or to have a lower pixel density and/or wiring density than a peripheral region.

Figure 5A:
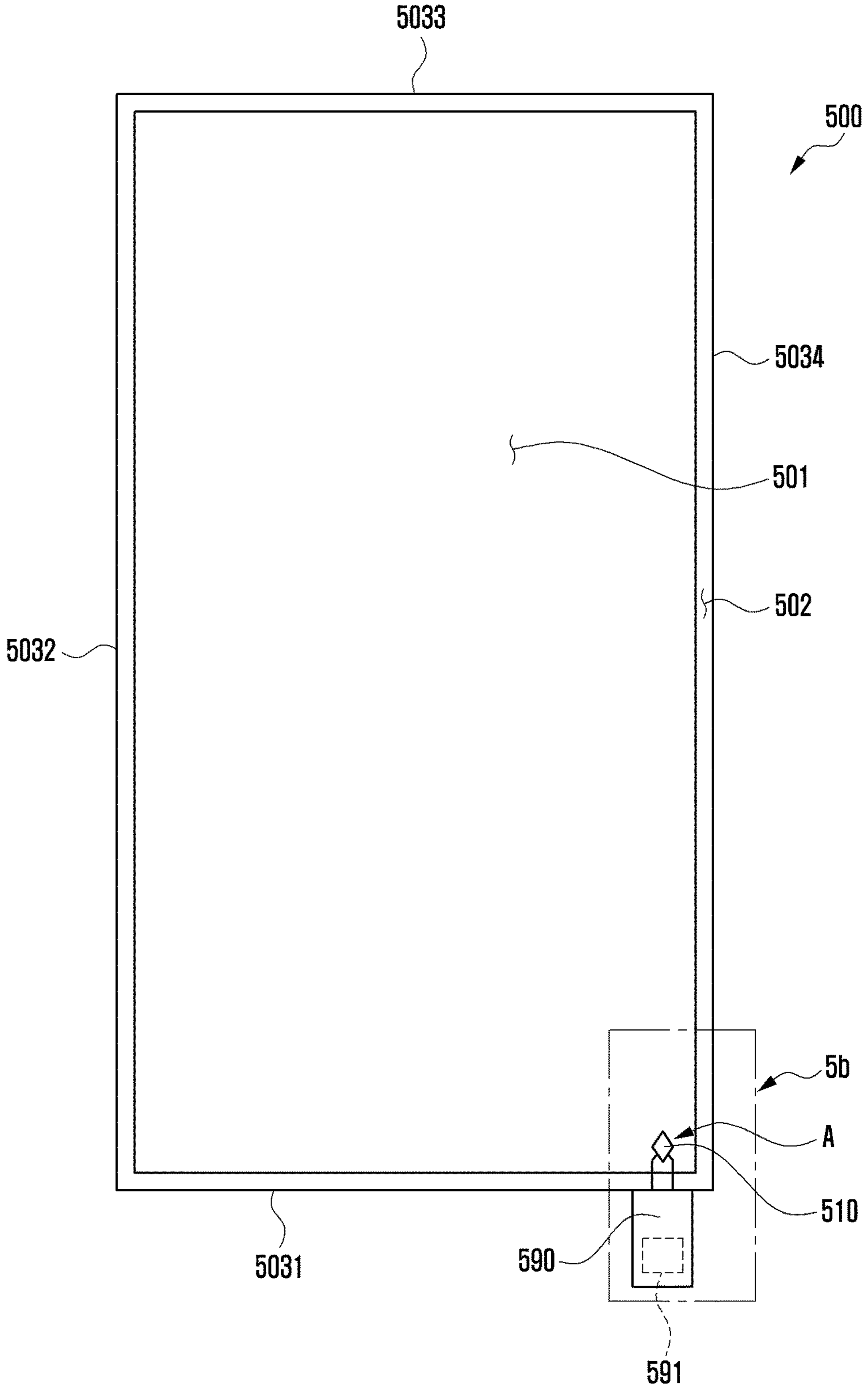
FIG. 5A illustrates a block view of a dielectric sheet according to an embodiment of the disclosure.
Figure 5B:
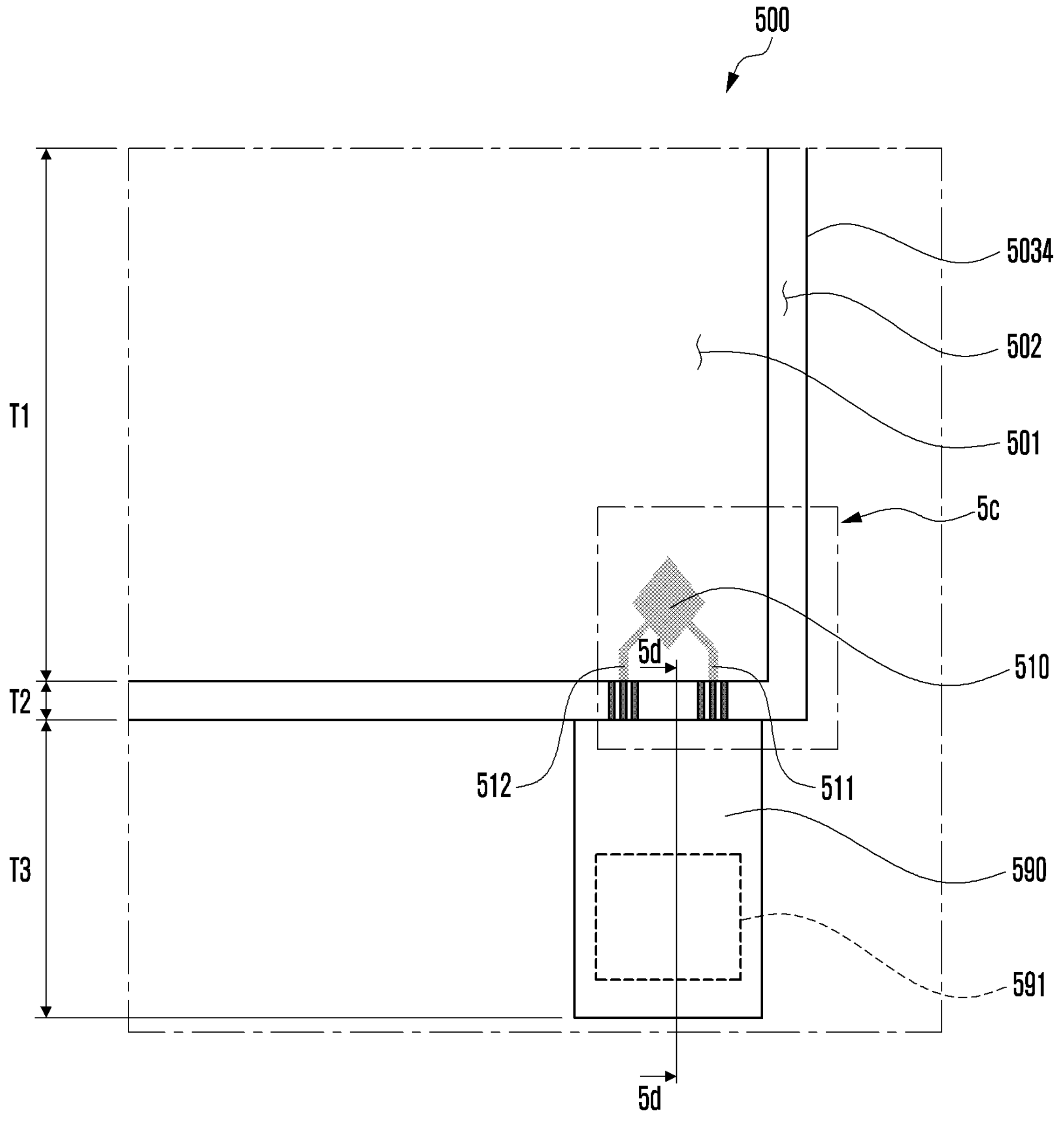
FIG. 5B illustrates an enlarged view of an area 5*b* in FIG. 5A according to an embodiment of the disclosure.
Figure 5C:
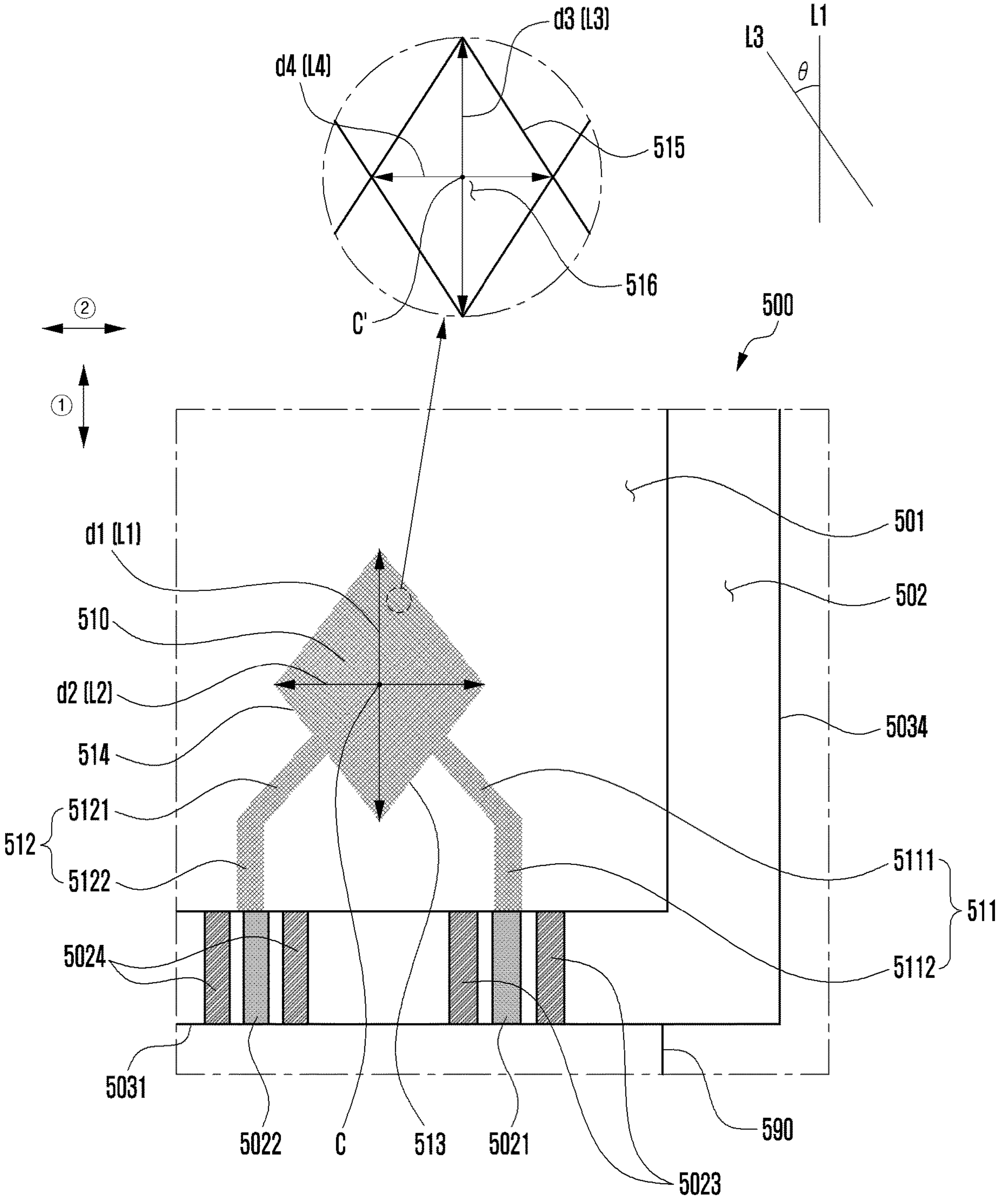
FIG. 5C illustrates an enlarged view of an area 5*c* in FIG. 5B according to an embodiment of the disclosure.

FIG. 5A illustrates a block view of a dielectric sheet 500 according to an embodiment of the disclosure. FIG. 5B illustrates an enlarged view of an area 5*b* in FIG. 5A according to an embodiment of the disclosure. FIG. 5C illustrates an enlarged view of an area 5*c* in FIG. 5B according to an embodiment of the disclosure.

Figure 6A:
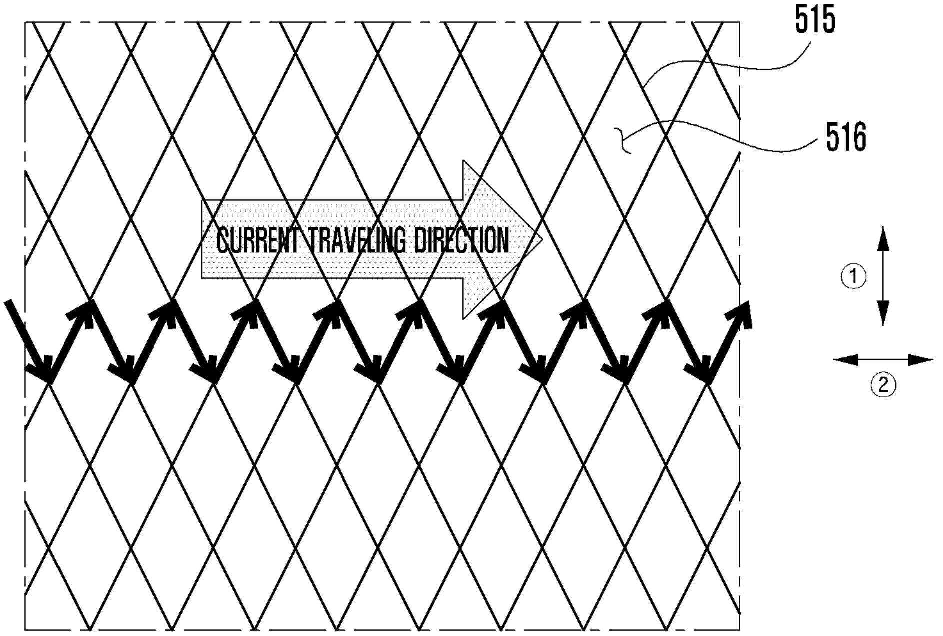
FIGS. 6A and 6B illustrate views of a current flow through unit patterns according to various embodiments of the disclosure.
Figure 6B:
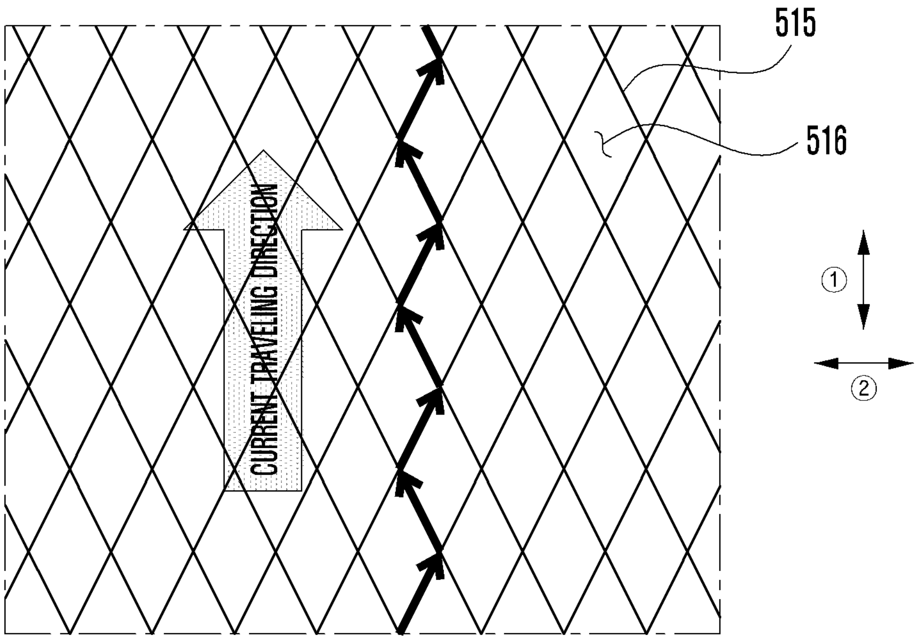

FIGS. 6A and 6B illustrate views of a current flow through unit patterns 516 according to various embodiments of the disclosure.

Referring to FIG. 5A, the dielectric sheet 500 may be arranged at a position substantially overlapping a front cover (substantially a display panel (e.g., the display panel 431 in FIG. 4 when the front cover 302 in FIG. 4 is viewed from above). According to an embodiment, the dielectric sheet 500 may be formed of a transparent polymer material. According to an embodiment, the dielectric sheet 500 may be formed in a rectangular shape. As another example, the dielectric sheet 500 may be formed in a shape corresponding to the shape of the display panel. According to an embodiment, the dielectric sheet 500 may include a first edge 5031 having a first length, a second edge 5032 extending in a substantially perpendicular direction from the first edge 5031 and formed longer than the first length, a third edge 5033 extending parallel to the first edge 5031 from the second edge 5032 and having the first length, and a fourth edge 5034 extending substantially parallel to the second edge 5032 from the third edge 5033 to the fourth edge 5034 and having a second length. According to an embodiment, the dielectric sheet 500 may include a first area 501 and a second area 502 (e.g., a peripheral region) configured to at least partially encompass the first area 501. According to an embodiment, the first area 501 may be arranged at a position overlapping the active area (display area) of the display panel (e.g., the display panel 431 in FIG. 4) when the front cover (e.g., the front cover 302 in FIG. 4) is viewed from above. According to an embodiment, at least a portion of the second area 502 is arranged at a position overlapping the inactive area (non-display area) of the display panel (e.g., the display panel 431 in FIG. 4) when the front cover (e.g., the front cover 302 in FIG. 4) is viewed from above. In another embodiment, the first area 501 may be formed in an area smaller or larger than the active area of the display panel 431 (e.g., the display panel 431 in FIG. 4).

According to various embodiments, the dielectric sheet 500 may include the mesh pattern part 510 (e.g., at least one mesh pattern part 510 in FIG. 4) formed through a plurality of conductive lines (e.g., the conductive lines 515 in FIG. 5C) and used as the antenna A. According to an embodiment, in the antenna A, the mesh pattern part 510 may be arranged near the first edge 5031 of the dielectric sheet 500. However, the disclosure is not limited thereto, and the antenna A may be arranged near the second edge 5032, the third edge 5033 and/or the fourth edge 5034. According to an embodiment, the dielectric sheet 500 may include a flexible printed circuit board (FPCB) 590 attached to the first edge 5031 and electrically connected to the mesh pattern part 510. According to an embodiment, the FPCB 590 may be formed to have a length that can be electrically connected to a printed circuit board (e.g., the printed circuit board 340 in FIG. 3C) of an electronic device (e.g., the electronic device 300 in FIG. 3C). According to an embodiment, the FPCB 590 may include a wireless communication circuit 591 (e.g., the third RFIC 226 in FIG. 2). In another embodiment, the wireless communication circuit 591 is mounted on a printed circuit board (e.g., the printed circuit board 340 in FIG. 3C) of an electronic device (e.g., the electronic device 300 in FIG. 3C), and may be electrically connected to the mesh pattern part 510 through the FPCB 590.

According to various embodiments, the wireless communication circuit 591 may be configured to form a beam pattern in a direction in which the front cover faces through the antenna A including the mesh pattern part 510. According to an embodiment, the wireless communication circuit 591 may be configured to transmit and/or receive a radio signal in a frequency band of about 3 GHz to about 100 GHZ through the antenna A including the mesh pattern part 510.

Referring to FIG. 5B, the antenna A may include the mesh pattern part 510 formed near the first edge 5031 of the dielectric sheet 500 through a plurality of conductive lines (e.g., the conductive lines 515 in FIG. 5C). According to an embodiment, the mesh pattern part 510 may include a first feed line 511 and a second feed line 512 that extend from the mesh pattern part 510 and are electrically connected to the FPCB 590. According to an embodiment, the mesh pattern part 510 may be formed in a rhombus shape, and may operate to have a dual polarization by the first feed line 511 passing through the center (e.g., the center (C) in FIG. 5C) and connected to the first point on the first virtual line intersecting each other, and the second feed line 512 connected to the second point on the second virtual line. According to an embodiment, the wireless communication circuit 591 may be configured to transmit and/or receive a first signal having a first polarization through the first feed line 511. According to an embodiment, the wireless communication circuit 591 may be configured to transmit and/or receive a second signal having a second polarization perpendicular to the first polarization through the second feed line 512.

Referring to FIGS. 5C and 6, the mesh pattern part 510 arranged on the dielectric sheet 500 may be formed in such a way that the plurality of conductive lines 515 crosses each other. According to an embodiment, the unit patterns 516 of the mesh pattern part 510 may have a rhombus structure having different horizontal to vertical diagonal ratios to reduce a more phenomenon. For example, the unit patterns 516 may be formed to have the horizontal to vertical diagonal ratio of 1:2.

In this case, as illustrated in FIGS. 6A and 6B, in the conductive mesh structure formed through the plurality of conductive lines 515, due to the shape of the unit patterns 516 having different horizontal and vertical ratios, a difference in an electrical performance may occur depending on the direction in which current flows. For example, in a case of the mesh pattern part 510 having a square shape, in a case that a current travels in the horizontal direction (e.g., the second direction (② direction)), since a current traveling path is lengthen compared in a case where the current travels in the vertical direction (e.g., the first direction (① direction)), a difference may be generated in the effective lengths in the current traveling direction. Therefore, even if the antenna A including the mesh pattern part 510 has a dual polarization feeding structure that is symmetrical to each other, as described above, due to the difference in effective length with respect to the current traveling direction, the polarization isolation and/or cross-polarization discrimination may be degraded.

Various embodiments of the disclosure change the shape of the mesh pattern part 510 to form substantially the same current traveling path in the horizontal and vertical directions of the conductive mesh structure, thereby improving the polarization isolation and/or cross-polarization discrimination of the antenna A.

Referring to FIG. 5C, the mesh pattern part 510 may be formed in a rhombus shape similar to the unit pattern 516. The mesh pattern part 510 may include, for example, the plurality of unit patterns 516. According to an embodiment, the mesh pattern part 510 may be formed so that the inner length d1 of the first line L1 passing through the center C of the mesh pattern part 510 and directed in the first direction (① direction) is formed to be longer than the inner length d2 of the second line L2 passing through the center C and directed in the second direction (direction ② perpendicular to the first direction (direction ①). According to an embodiment, each of the plurality of unit patterns 516 included in the mesh pattern part 510 may be formed so that the inner length d3 of the third line L3 passing through the center C' of the unit pattern 516 and forming an angle (θ) in the range of about 0 degrees to about 45 degrees with the first direction (direction ①) is formed to be longer than the inner length d4 of the fourth line L4 passing through the center C' of the unit pattern 516 and perpendicular to the third line L3. Through this structure, the mesh pattern part 510 makes the inner length in the first direction (direction ①) longer than the inner length in the second direction (direction ②), so that the current traveling path through the unit patterns 516 may be formed substantially identically.

According to various embodiments, the mesh pattern part 510 may include the first feed line 511 formed so that the first side 513 and the second side 514 are adjacent to each other at a position close to the first edge 5301 of the dielectric sheet 500 and extending from the first side 513, and the second feed line 512 extending from the second side 514. According to an embodiment, the first feed line 511 extends from the first side 513 of the mesh pattern part 510 and may be electrically connected to a first feed pad 5021 arranged in the second area 502 of the dielectric sheet 500. According to an embodiment, the second feed line 512 extends from the second side 514 of the mesh pattern part 510, and may be electrically connected to a second feed pad 5022 arranged in the second area 502 of the dielectric sheet 500. According to an embodiment, the first feed line 511 may include a first subline 5111 connected substantially perpendicularly to the first side 513 at a first side 513, and a second subline 5112 extending from the first subline 5111 to the first feed pad 501 in a direction substantially perpendicular to the first edge 5301. According to an embodiment, the second feed line 512 may include a third subline 5121 connected substantially perpendicular to the second side 514 at the center of the second side 514, and a fourth subline 5122 extending from the third subline 5121 to the second feed pad 5022 in a direction substantially perpendicular to the first edge 5031.

According to various embodiments, the dielectric sheet 500 may include first conductive pads 5023 arranged on the left and right sides of the first feed pad 5021 at the first edge 5031 and/or second feed pads 5022 arranged on the left and right sides of the second feed pad 5022. According to an embodiment, the first conductive pads 5023 and/or the second conductive pads 5024 are electrically connected to the ground of the FPCB 590 connected to the dielectric sheet 500, so that, for example, it can help to shield the noise of the first feed pad 5021 and the second feed pad 5022 used as a signal line.

Figure 5D:
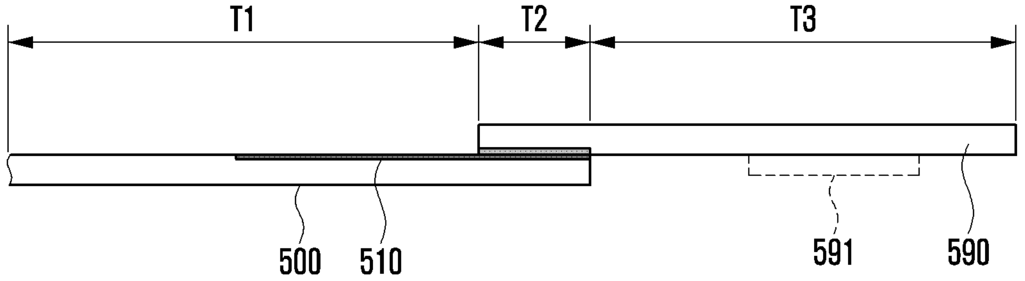
FIG. 5D illustrates a partial cross-sectional view of a dielectric sheet taken along line 5*d*-5*d* in FIG. 5B according to an embodiment of the disclosure.

FIG. 5D illustrates a partial cross-sectional view of the dielectric sheet 500 taken along line **5*d*-5*d* in FIG. 5**B according to an embodiment of the disclosure.

Referring to FIG. 5D, the dielectric sheet 500 may include a first section T1 having the first area 501 that at least partially overlaps with the active area (display area) of a display (e.g., the display 400 in FIG. 4), and a second section T2 having the second area 502 that at least partially encompasses the first section T1 and at least partially overlaps with the inactive area (non-display area) of the display 400. According to an embodiment, the mesh pattern part 510 is arranged overlapping at least a partial area of the second section T2, and may be electrically connected to the FPCB 590 arranged in a third section T3 from the outside of the dielectric sheet 500 through the feed lines 511, 512. According to an embodiment, the first section T1 may include the mesh pattern part 510 used as the antenna A and the feed lines 511, 512. According to an embodiment, the second section T2 may include the feed pads 5021, 5022 electrically connected to the feed lines 511, 512 and/or the conductive pads 5023, 5024 arranged on both sides of the feed pads 5021, 5022. According to an embodiment, the third section T3 may include the FPCB 590 as a transmission line. In another embodiment, the FPCB 590 may further include a wireless communication circuit 591 arranged on at least one surface.

According to an embodiment, at least a portion of the FPCB 590 may be located in the second section T2. For example, the FPCB 590 may be electrically connected to the first feed pad 5021, the second feed pad 5022, the first conductive pads 5023, or the second conductive pads 5024 in the second section T2.

Figure 7A:
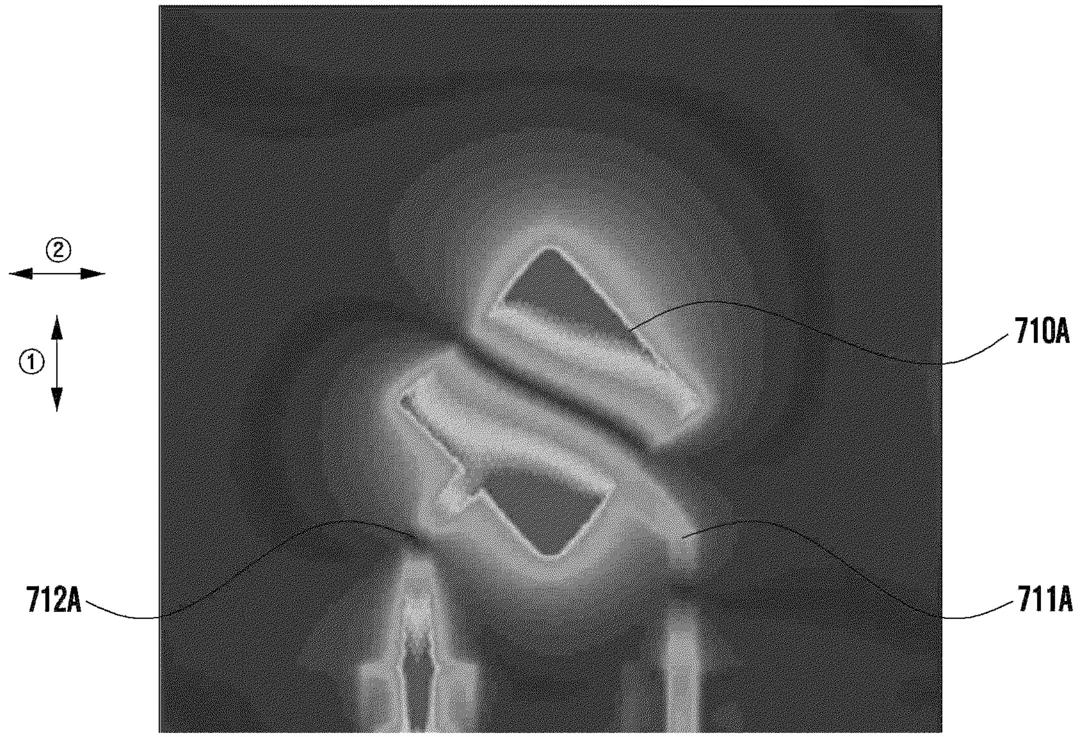
FIGS. 7A and 7B illustrate views of the comparison of electric field distributions through shape change of a mesh pattern part according to various embodiments of the disclosure.
Figure 7B:
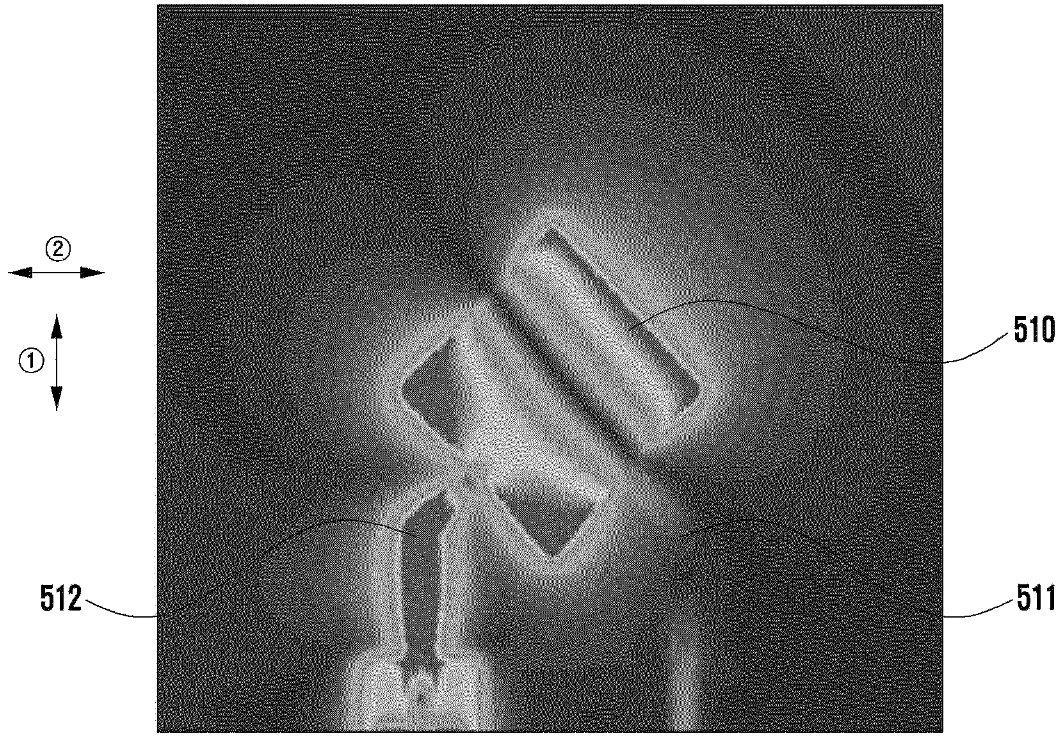

FIGS. 7A and 7B illustrate views of the comparison of electric field distributions through shape change of a mesh pattern part according to various embodiments of the disclosure.

Figure 8A:
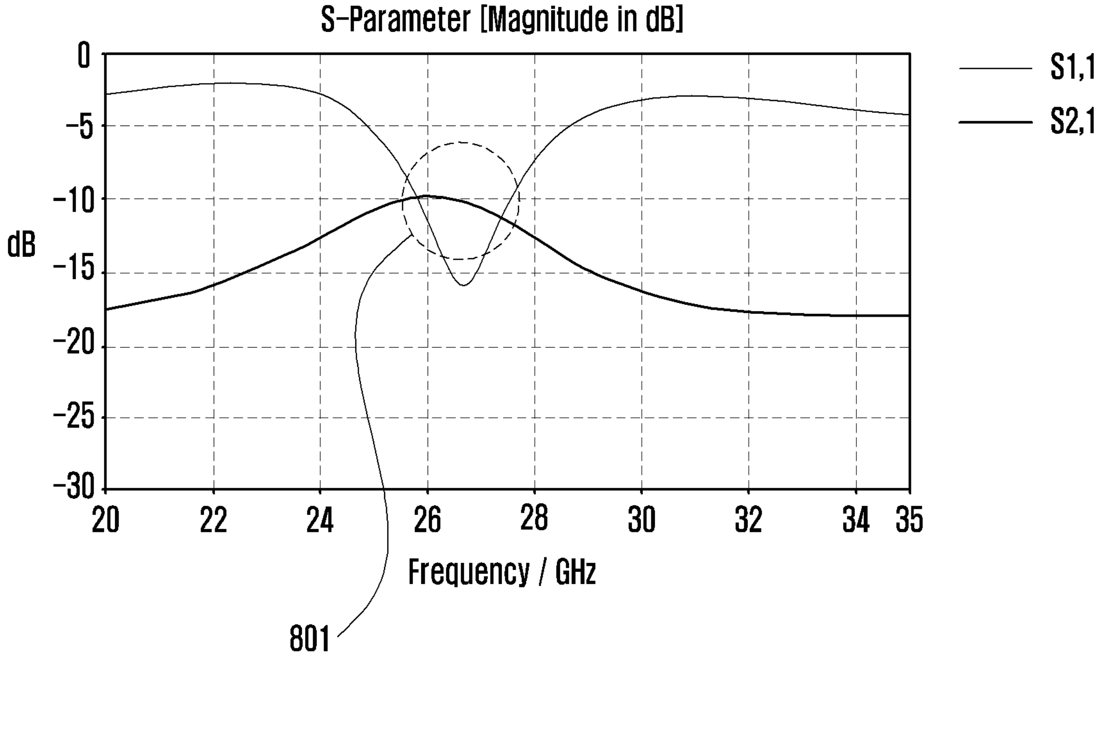
FIGS. 8A and 8B illustrate views of the comparison of polarization isolations through shape change of a mesh pattern part according to various embodiments of the disclosure.
Figure 8B:
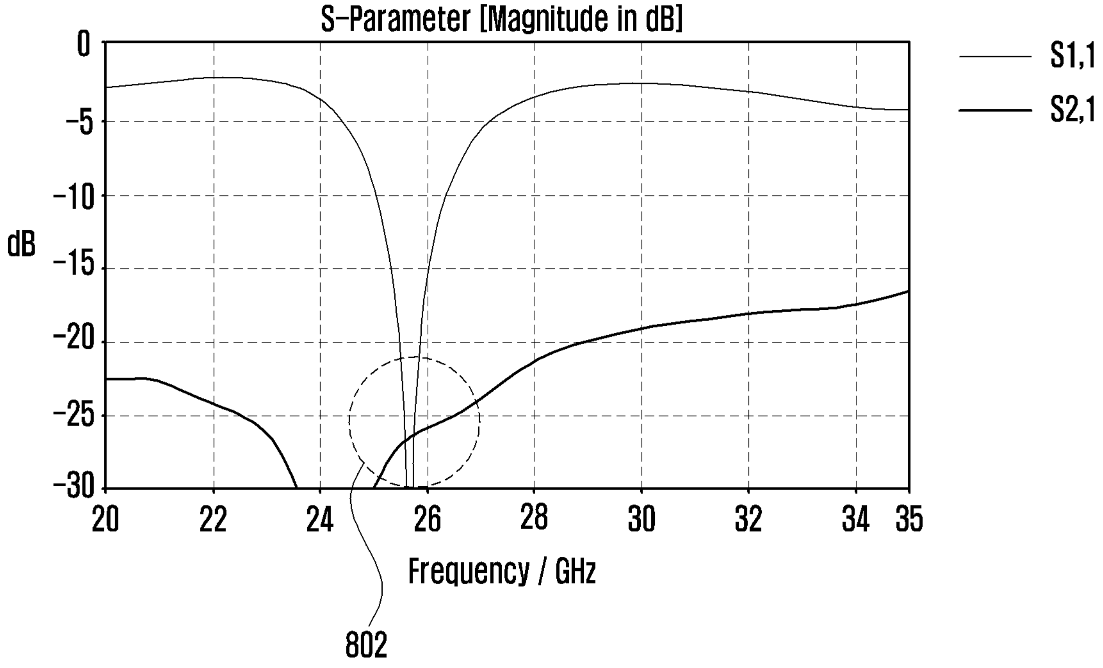

FIGS. 8A and 8B illustrate views of the comparison of polarization isolations through shape change of a mesh pattern part according to various embodiments of the disclosure.

Referring to FIGS. 7A and 8A, it is found that in a mesh pattern part 710A of a square structure used as an antenna, the current fed from a second feed line 712A affects a first feed line 711A, and the polarization isolation is about −10 dB (an area 801 in FIG. 8A). As illustrated in FIGS. 7B and 8B, it is found that in the mesh pattern part 510 of a rhombus structure used as an antenna according to an embodiment of the disclosure, which is formed so that the internal length in the vertical direction (e.g., the direction ① in FIG. 5C) is relatively elongated, the current fed from the second feed line 512 does not affect the first feed line 511, and the polarization isolation is improved to about −20 dB (an area 802 in FIG. 8B). This may mean that the isolation between the two polarizations of the antenna according to the embodiment of the disclosure using the mesh pattern part 510 of a rhombus structure with an increased vertical length is improved.

Figure 9A:
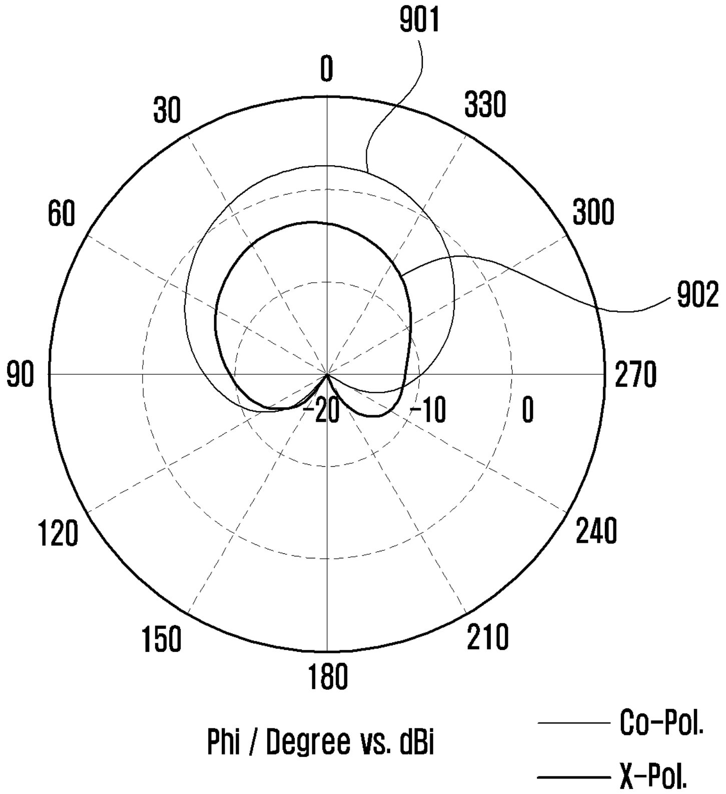
FIGS. 9A and 9B illustrate views of the comparison of radiation patterns through shape change of a mesh pattern part according to various embodiments of the disclosure.
Figure 9B:
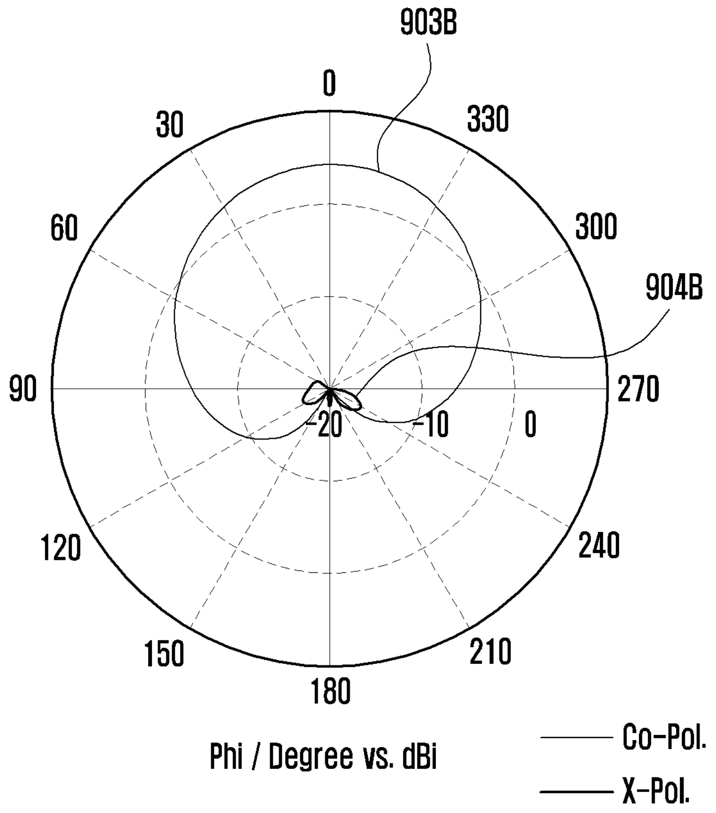

FIGS. 9A and 9B illustrate views of the comparison of radiation patterns through shape change of a mesh pattern part according to various embodiments of the disclosure.

Referring to FIG. 9A, in a case that a square mesh pattern part (e.g., the mesh pattern part 710A in FIG. 7A) is used as an antenna, the cross-polarization discrimination 902 from the co-polarization (Co-Pol) 901 is lowered. On the other hand, as illustrated in FIG. 9B, in a case that the mesh pattern part (e.g., the mesh pattern part 510 in FIG. 7B) of a rhombus structure according to an embodiment of the disclosure formed so that the internal length in the vertical direction (e.g., the direction ① in FIG. 5C) is relatively increased is used as an antenna, it is found that the cross-polarization discrimination 904B from the co-polarization (Co-Pol) 903B is improved.

Figure 10:
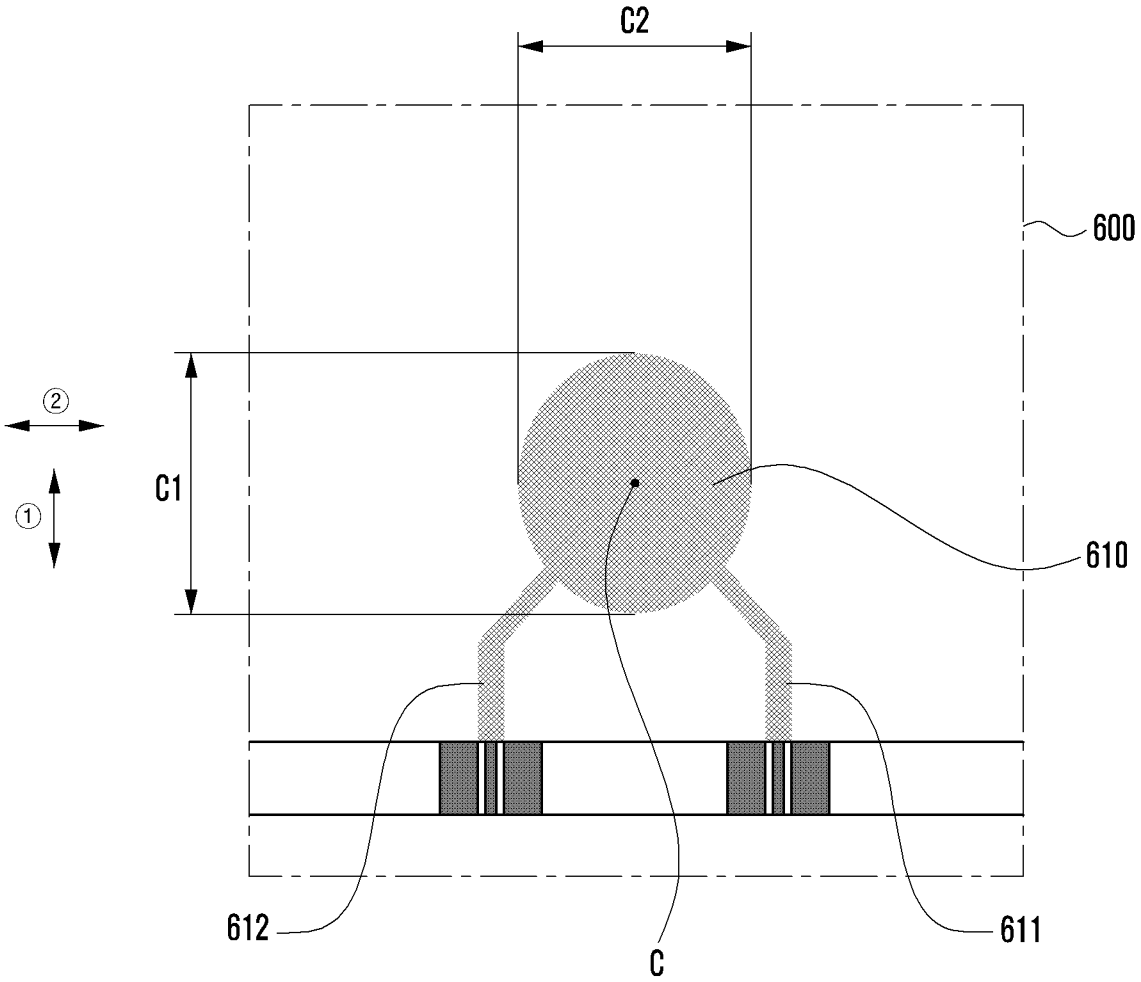
FIG. 10 illustrates a partial structure view of a dielectric sheet including a mesh pattern part according to an embodiment of the disclosure.

FIG. 10 illustrates a partial structure view of a dielectric sheet 600 including a mesh pattern part 610 according to an embodiment of the disclosure.

Since the structures of the dielectric sheet 600 and mesh pattern part 610 of FIG. 10 have substantially the same electrical connection structures as the mesh pattern part 510 formed on the dielectric sheet 500 of FIGS. 5A to 5C, the detailed description thereof may be omitted.

According to various embodiments, the unit patterns (e.g., the unit patterns 516 in FIG. 5C) are formed in a rhombus shape, and the mesh pattern part 610 formed using the unit patterns may be formed in various shapes capable of having a dual polarization feeding structure.

For example, with reference to FIG. 10, the mesh pattern part 610 may be formed in a circular shape. According to an embodiment, the mesh pattern part 610 may be formed in an elliptical shape formed so that the inner length Cl of the first direction (① direction) is longer than the inner length of the second direction (② direction) perpendicular to the first direction (① direction). According to an embodiment, the mesh pattern part 610 may include a first feed line 611 formed in substantially the same manner as the above-described first mesh pattern (e.g., the first mesh pattern 510 in FIG. 5C) and a second feed line 612. According to an embodiment, the mesh pattern part 610 has an elliptical shape in which the inner length of the first direction (direction ①) is longer, which forms substantially the same current traveling path in the horizontal and vertical directions of the conductive mesh pattern (e.g., the conductive mesh pattern 501 in FIG. 5C), thereby improving the polarization isolation and/or cross-polarization discrimination of the mesh pattern part 610 used as an antenna.

Figure 11A:
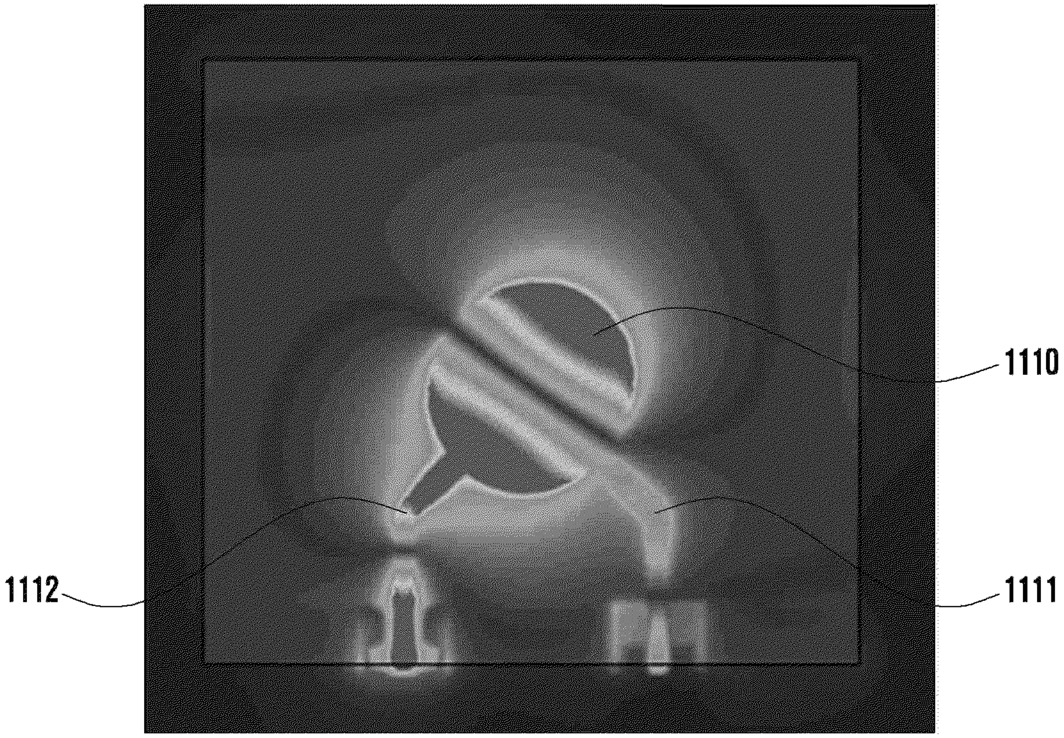
FIGS. 11A and 11B illustrate views of the comparison of electric field distributions through shape change of a mesh pattern part according to various embodiments of the disclosure.
Figure 11B:
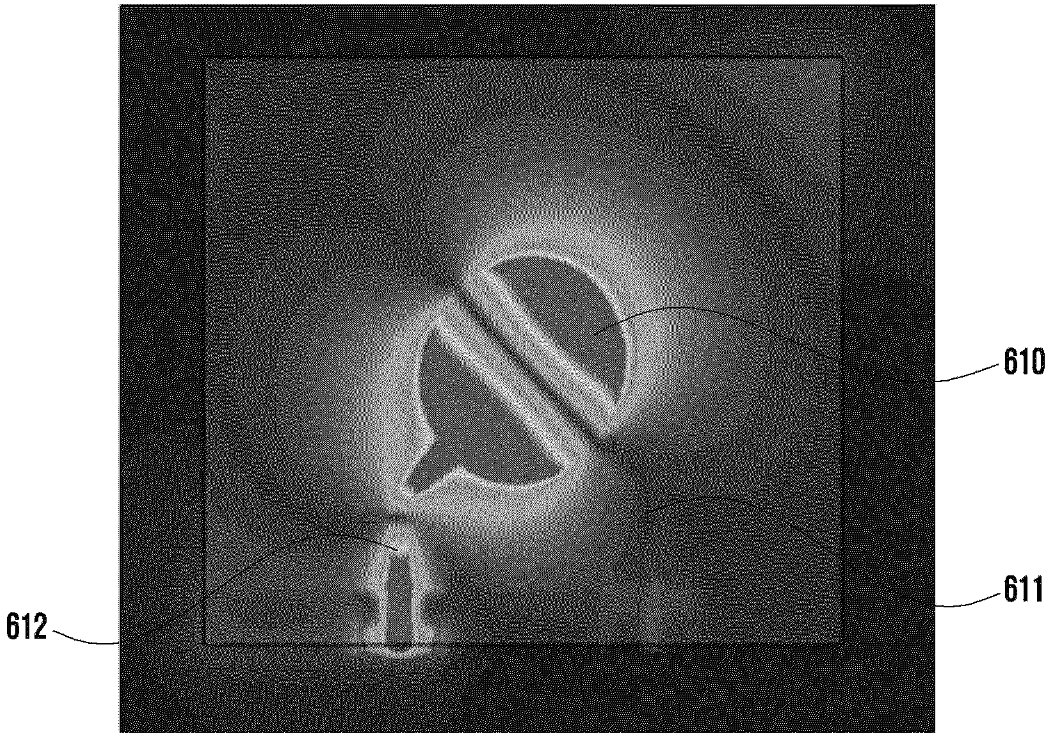

FIGS. 11A and 11B illustrate views of the comparison of electric field distributions through shape change of a mesh pattern part according to various embodiments of the disclosure.

Figure 12A:
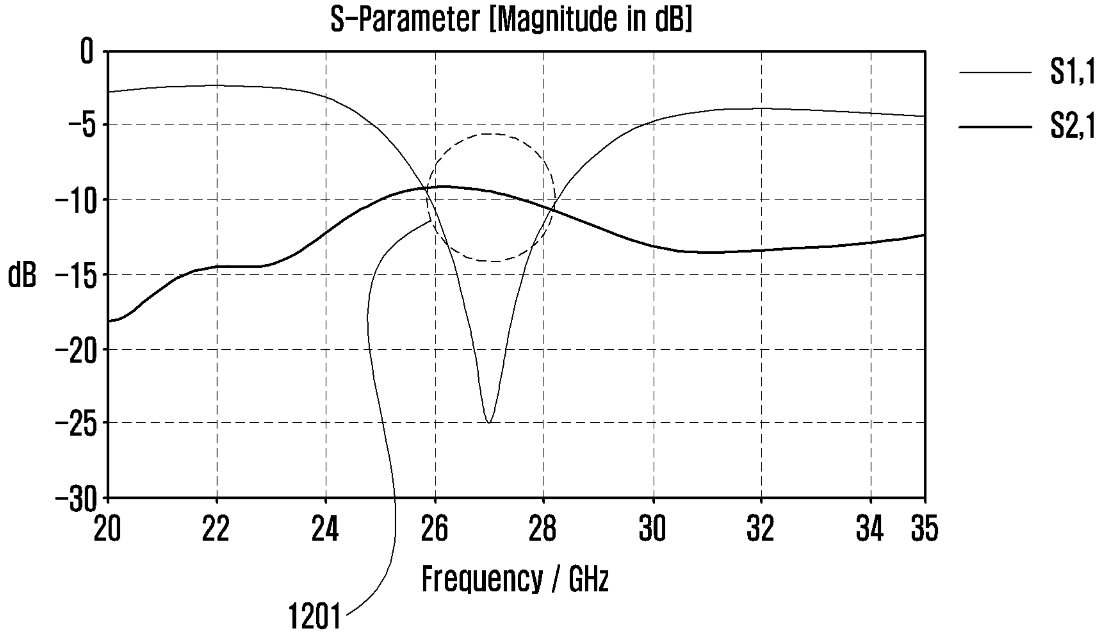
FIGS. 12A and 12B illustrate views of the comparison of polarization isolations through shape change of a mesh pattern part according to various embodiments of the disclosure.
Figure 12B:
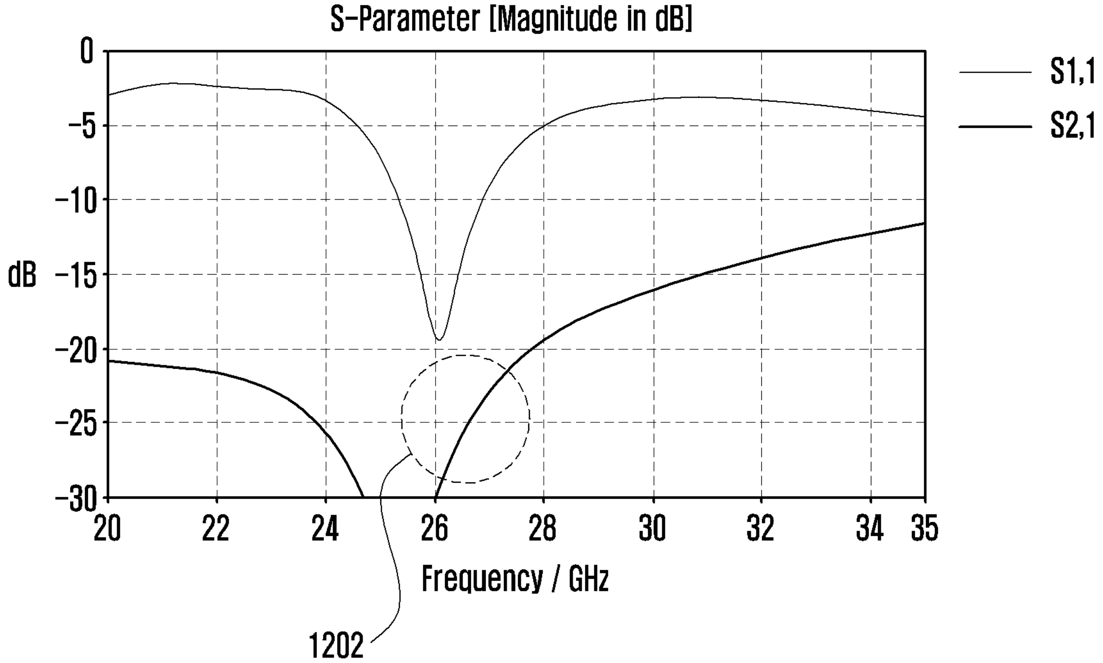

FIGS. 12A and 12B illustrate views of the comparison of polarization isolation through shape change of a mesh pattern part according to various embodiments of the disclosure.

Referring to FIGS. 11A and 12A, it is found that in the mesh pattern part 1110 of a circular structure used as an antenna, the current fed from the second feed line 1112 affects the first feed line 1111 and the polarization isolation is about −10 dB (an area 1201 in FIG. 12A). On the other hand, as illustrated in FIGS. 11B and 12B, it is found that in the mesh pattern part 610 of an elliptical structure used as an antenna according to an embodiment of the disclosure is formed so that the internal length in the vertical direction (e.g., the direction ① in FIG. 10) is relatively increased, the current fed from the second feed line 612 does not affect the first feed line 611 and the polarization isolation is improved to about −20 dB or less (an area 1202 in FIG. 12B). This may mean that the isolation between two polarizations is also improved in the antenna according to the embodiment of the disclosure using the mesh pattern part 610 of an elliptical structure with an increased vertical length.

Figure 13A:
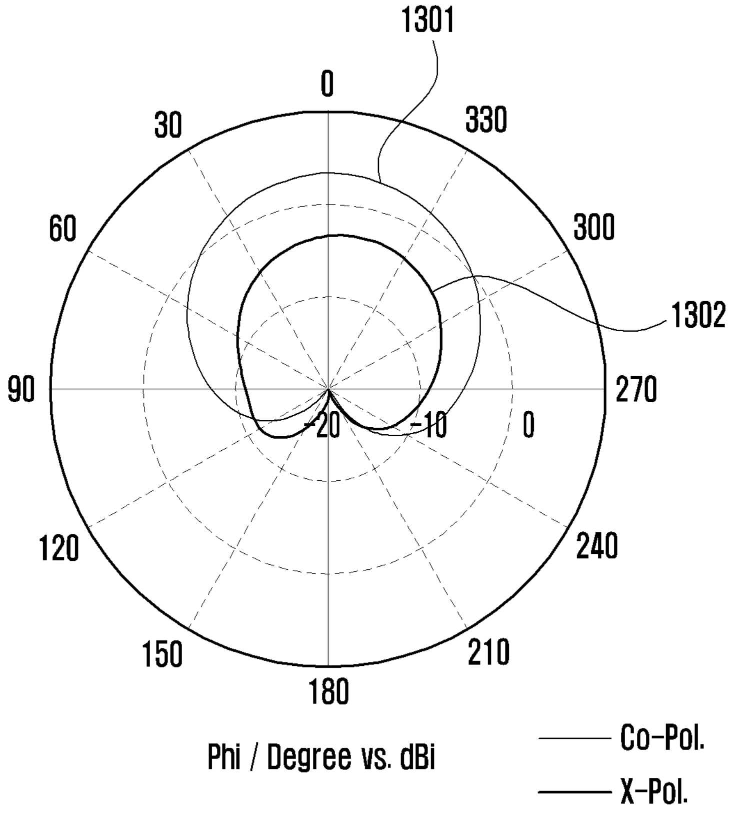
FIGS. 13A and 13B illustrate views of the comparison of radiation patterns through shape change of a mesh pattern part according to various embodiments of the disclosure.
Figure 13B:
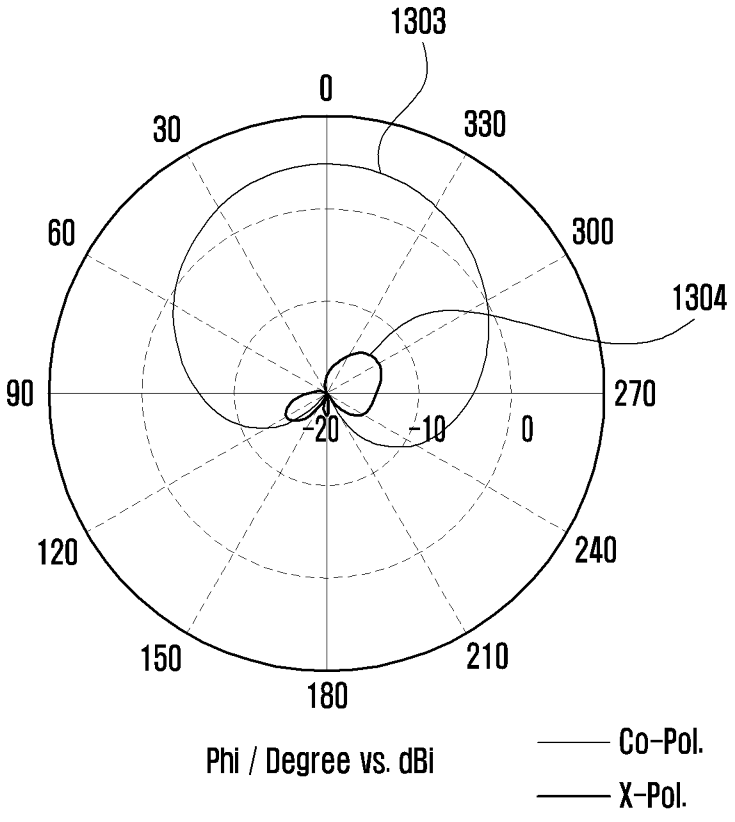

FIGS. 13A and 13B illustrate views of the comparison of radiation patterns through shape change of a mesh pattern part according to various embodiments of the disclosure.

Referring to FIG. 13A, in a case that a circular mesh pattern part (e.g., the mesh pattern part 1110 in FIG. 11A) is used as an antenna, the cross-polarization discrimination 1302 from the co-polarization (Co-Pol) 1301 is degraded. On the other hand, as illustrated in FIG. 13*b*, in a case that the mesh pattern part of an elliptical structure (e.g., the mesh pattern part 610 in FIG. 10) formed so that the internal length in the vertical direction (e.g., direction ① in FIG. 10) is relatively increased is used as an antenna, it is found that the cross-polarization discrimination 1304 from the co-polarization (Co-Pol) 1303 is improved.

Figure 14:
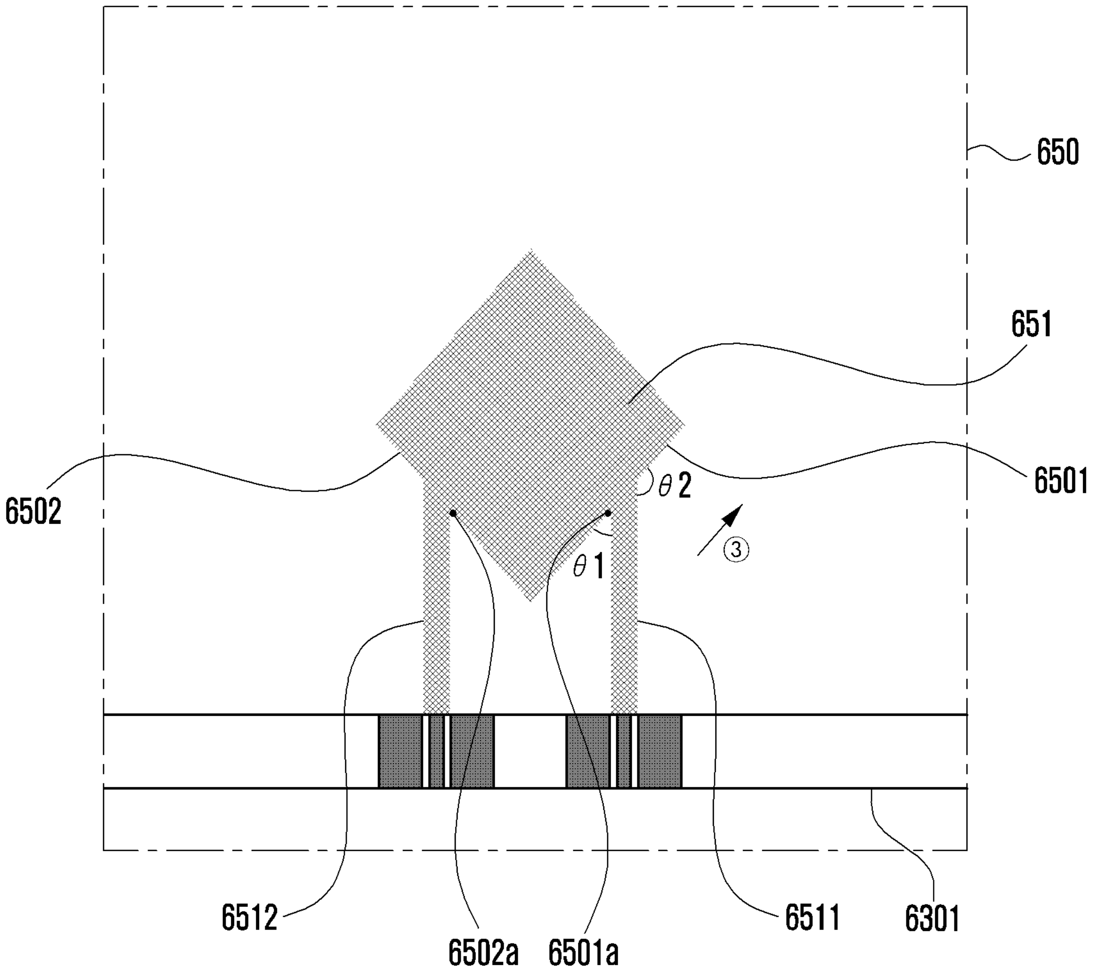
FIG. 14 illustrates a partial structure view of a dielectric sheet including a mesh pattern part according to an embodiment of the disclosure.

FIG. 14 illustrates a partial structure view of a dielectric sheet including a mesh pattern part according to an embodiment of the disclosure.

Since the structures of the dielectric sheet 650 and mesh pattern part 651 of FIG. 14 are formed in substantially the same manner as the mesh pattern part 510 formed on the dielectric sheet 500 of FIGS. 5A to 5C, the detailed description thereof may be omitted.

Referring to FIG. 10, the mesh pattern part 610 may be formed in a rhombus shape as illustrated in FIG. 5C.

Referring to FIG. 14, according to an embodiment, the mesh pattern part 610 may include a first side 6501 and a second side 6502 that are arranged close to a first edge 6301 of the dielectric sheet 650 and are adjacent to each other. According to an embodiment, the pair of feed lines 6511, 6512 may include a straight first feed line 6511 connected to the first side 6501 in a direction substantially perpendicular to the first edge 6301 of the dielectric sheet 650, and a straight first feed line 6511 connected to the second side 6502 in a direction substantially perpendicular to the first edge 6301 of the dielectric sheet 650.

According to various embodiments, the first feed line 6511 may be connected to the first side 6510 and the mesh pattern part 610 to include a first side 01 and a second angle θ2 (e.g., obtuse angle) greater than the first angle θ1 (e.g., acute angle). In this case, a coupling is generated between the first side 6501 and the first feed line 6511, having the first angle θ1. Thus, even if the first feed line 6511 is connected to the center of the first side 6501, as an asymmetric feed characteristic that acts as if power is supplied closer to the first edge 6301 from the center of the first side 6501 rather than the center is generated, the radiation characteristics may be degraded. According to an embodiment, the first feed line 6511 may be connected to a position farther from the first edge 6301 than the center 6501*a* of the first side 6501 on the first side 6501. As another example, the second feed line 6512 may be connected to a position farther from the first edge 6301 than the center 6502*a* of the second side 6502 on the second side 6502.

According to an embodiment of the disclosure, by changing the feed positions of the feed lines 6511, 6512, the polarization isolation and cross-polarization discrimination of the mesh pattern part 610 may be improved.

Figure 15A:
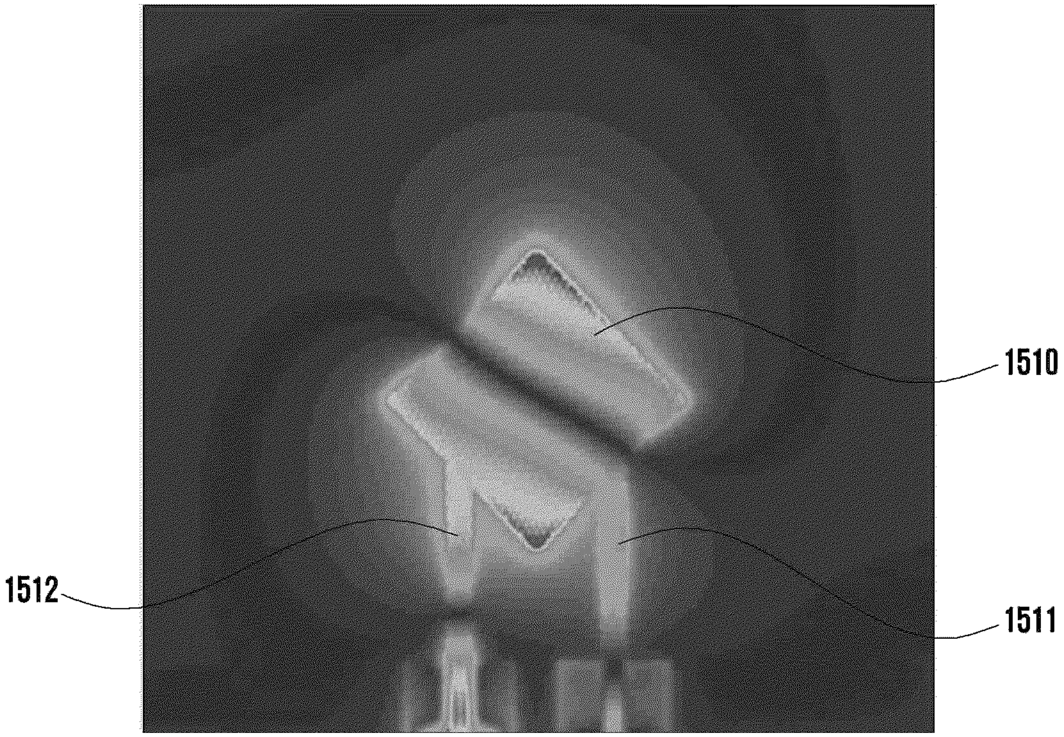
FIGS. 15A and 15B illustrate views of the comparison of electric field distributions through shape change of a mesh pattern part according to various embodiments of the disclosure.
Figure 15B:
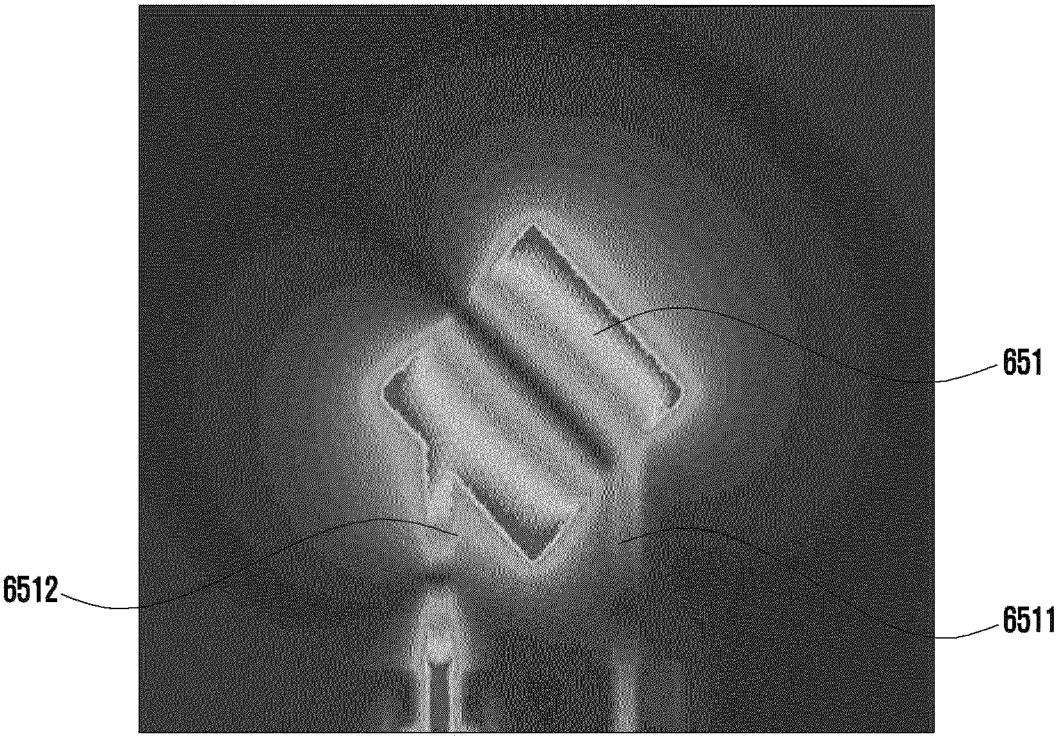

FIGS. 15A and 15B illustrate views of the comparison of electric field distributions through shape change of a mesh pattern part according to various embodiments of the disclosure.

Figure 16A:
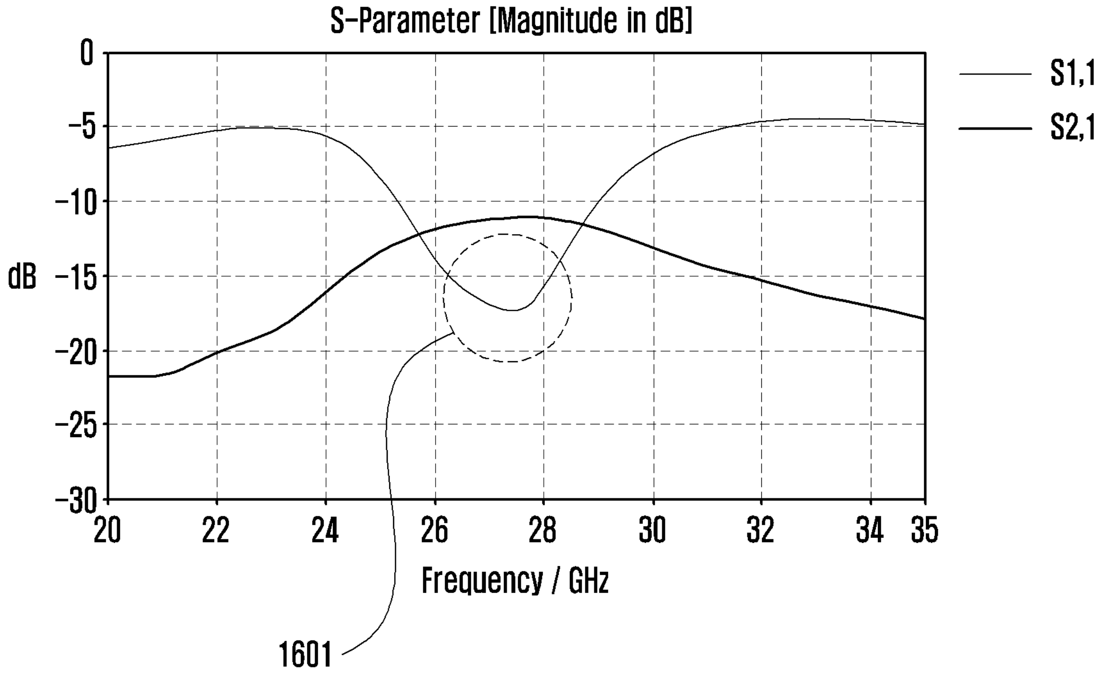
FIGS. 16A and 16B illustrate views of the comparison of polarization isolations through shape change of a mesh pattern part according to various embodiments of the disclosure.
Figure 16B:
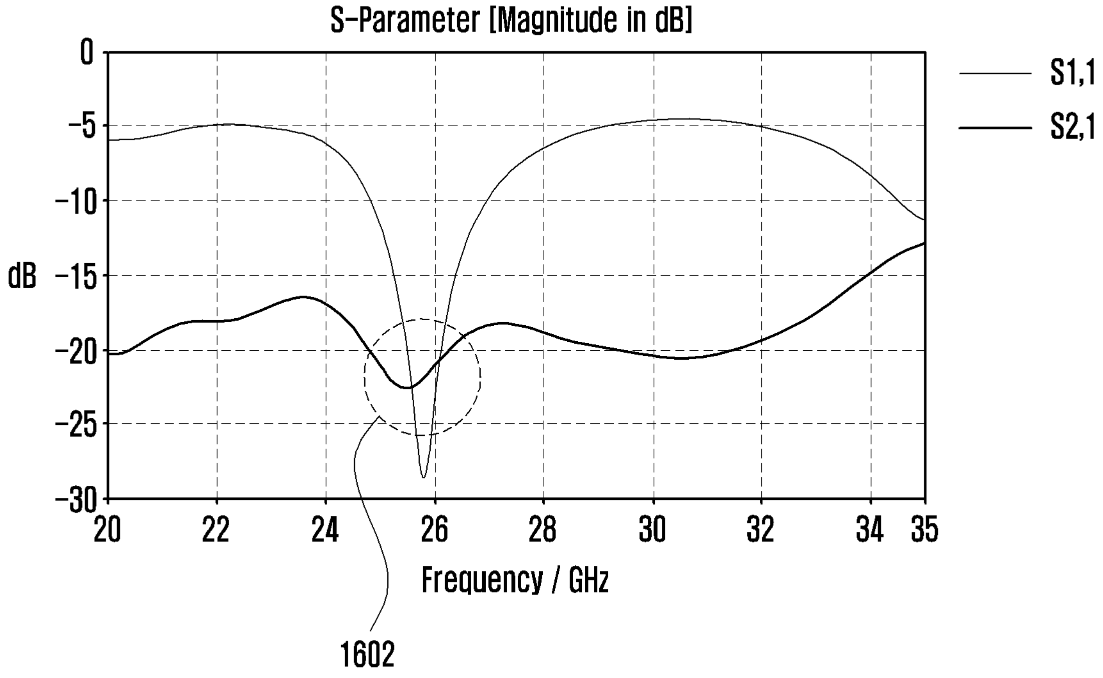

FIGS. 16A and 16B illustrate views of the comparison of polarization isolations through shape change of a mesh pattern part according to various embodiments of the disclosure.

Referring to FIGS. 15A and 16A, it is found that in a mesh pattern part 1510 having the straight feed lines 1511, 1512 connected to the center of two adjacent sides of the mesh pattern part 1510 in a direction perpendicular to the edge of the dielectric sheet, the current fed from the second feed line 1512 affects the first feed line 1511, and the polarization isolation is about −10 dB (an area 1601 in FIG. 16A). As illustrated in FIGS. 15B and 16B, it is found that in the mesh pattern part 651 having the straight feed lines 6511, 6512 connected from the edge (e.g., the first edge 6301 of FIG. 14) of the dielectric sheet (e.g., the dielectric sheet 650 in FIG. 14) at a position farther than the center (e.g., the center 6501*a*, 6502*a* in FIG. 14) of the adjacent two sides (e.g., the first side 6510 and the second side 6502 in FIG. 14) of the mesh pattern part 651, the current fed from the second feed line 6512 does not affect the first feed line 6511, and the polarization isolation is about −20 dB or less (the area 1602 in FIG. 16B). In a case that the feed lines 6511, 6512 are connected at a position moved by a specified distance from the center of each side 6501 6502 of the mesh pattern part 651, this may mean that the isolation between two polarizations is improved in consideration of the electrical coupling.

Figure 17A:
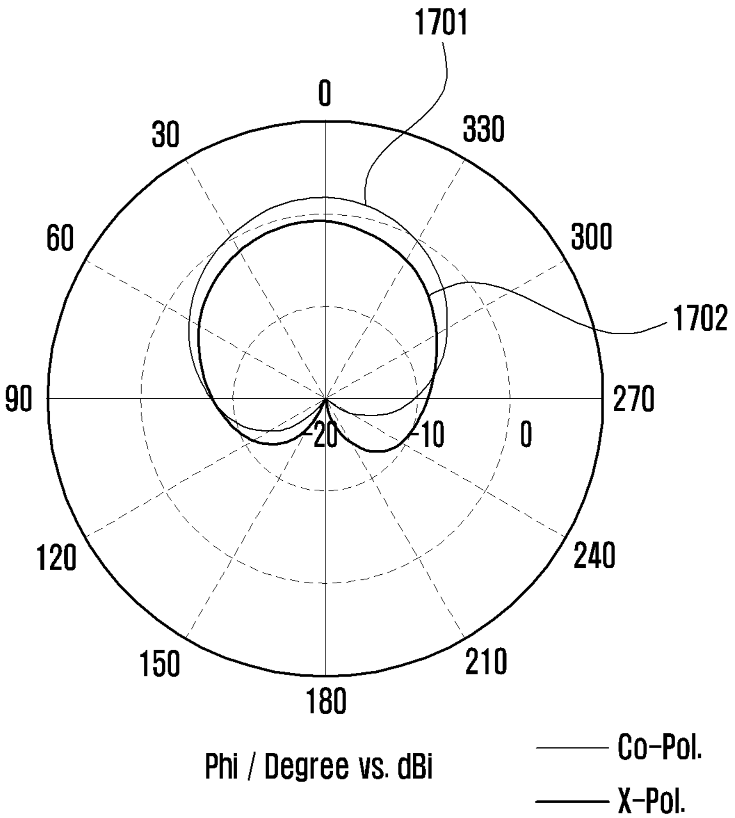
FIGS. 17A and 17B illustrate views of the comparison of radiation patterns through shape change of a mesh pattern part according to various embodiments of the disclosure.
Figure 17B:
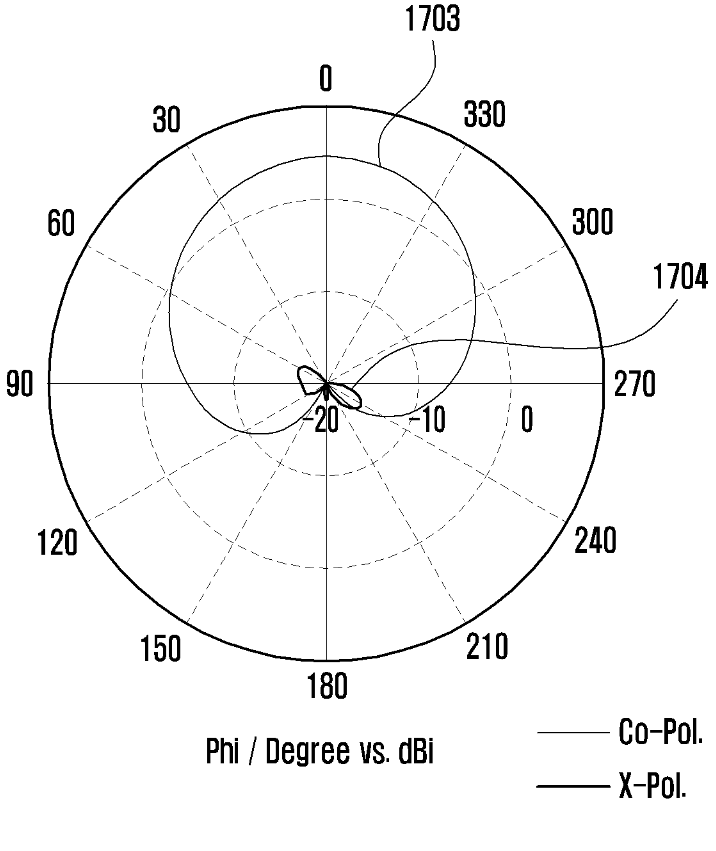

FIGS. 17A and 17B illustrate views of the comparison of radiation patterns through shape change of a mesh pattern part according to various embodiments of the disclosure.

Referring to FIG. 17A, it is found that in the antenna with the straight feed lines (e.g., feed lines 1511, 1512 in FIG. 15A) connected to the center of the mesh pattern part (e.g., the mesh pattern part 1510 in FIG. 15A), the cross-polarization discrimination 1702 from the co-polarization (Co-Pol) 1701 is degraded. On the other hand, as illustrated in FIG. 17B, it is found that in the antenna with the straight feed lines (e.g., feed lines 6511, 6512 in FIG. 14) connected at a position moved by a specified distance from the center of the mesh pattern part (e.g., 651 in FIG. 14) in consideration of coupling, the cross-polarization discrimination 1704 from the co-polarization (Co-Pol) 1703 is improved.

Figure 18A:
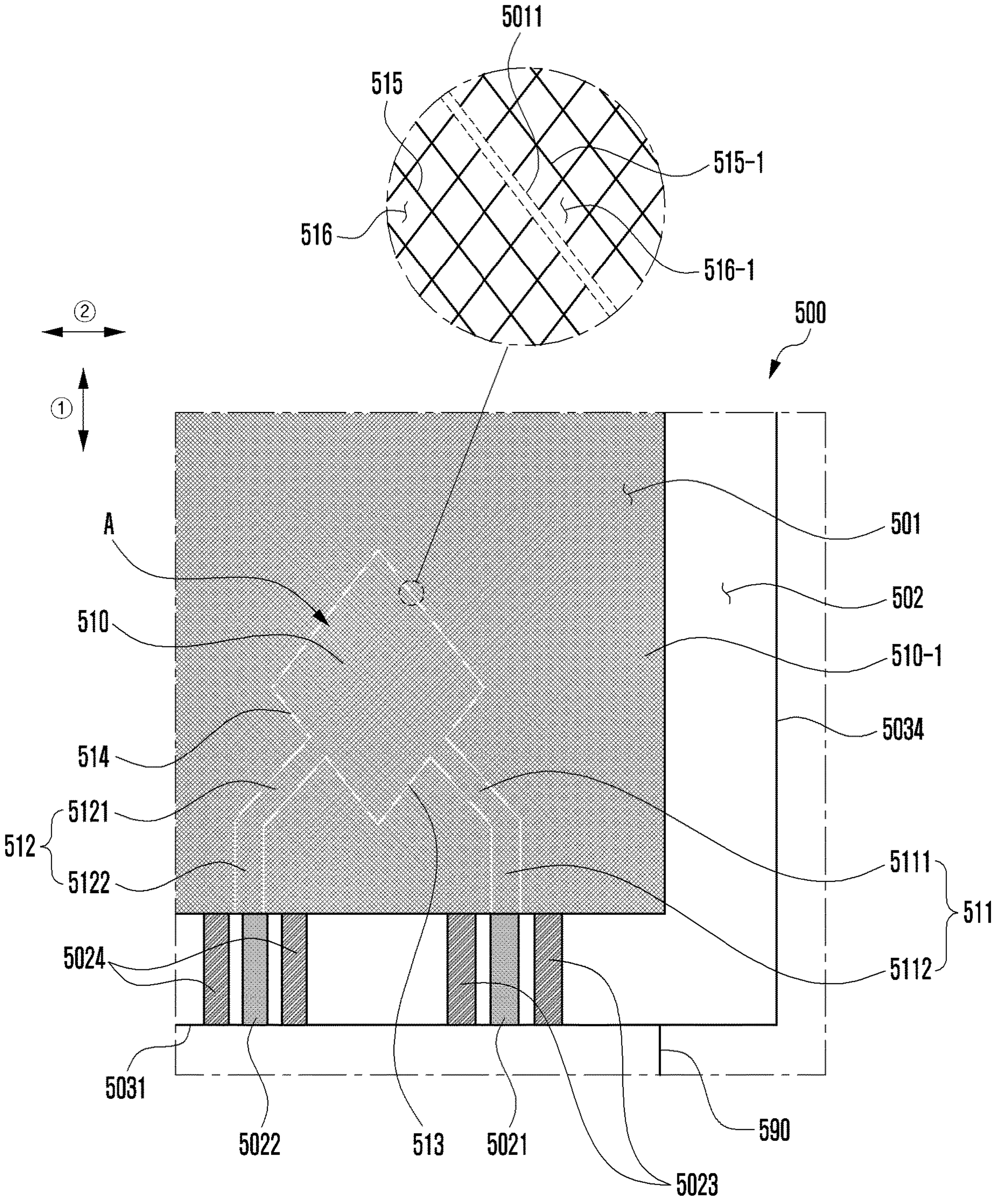
FIGS. 18A and 18B illustrate partial structure views of a dielectric sheet including a mesh pattern part according to various embodiments of the disclosure.
Figure 18B:
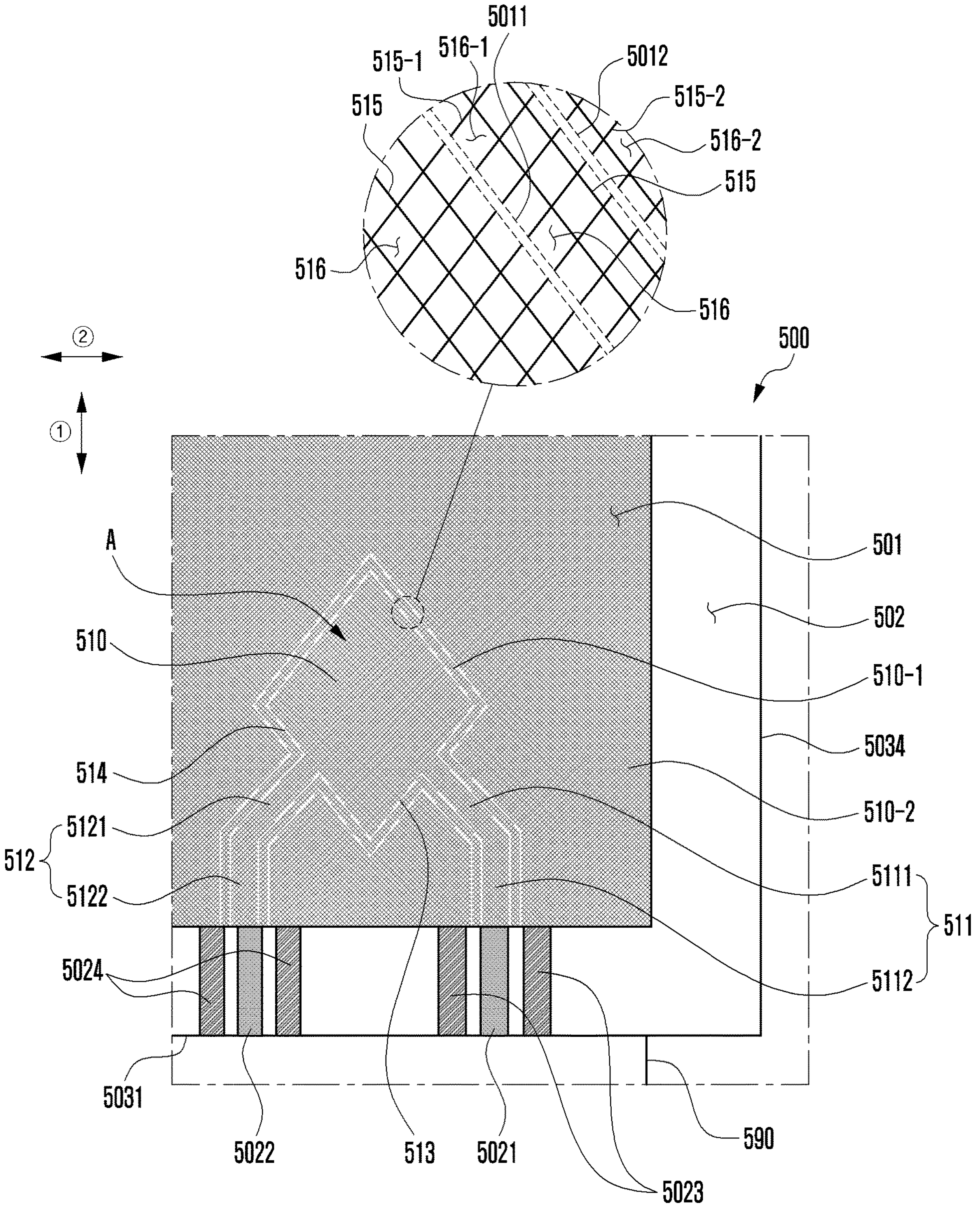

FIGS. 18A and 18B illustrate partial structure views of a dielectric sheet 500 including a mesh pattern part 510 according to various embodiments of the disclosure.

In the description of FIGS. 18A and 18B, the same reference numerals are assigned to the components substantially the same as those of FIG. 5C, and detailed descriptions thereof may be omitted.

Referring to FIG. 18A, the dielectric sheet 500 may include a mesh pattern part 510 formed by a plurality of unit patterns 516 formed by a plurality of first conductive lines 515 and a dummy pattern part 510-1 formed by a plurality of second unit patterns 516-1 formed by a plurality of second conductive lines 515-1 and arranged to encompass at least a portion of the mesh pattern part 510. According to an embodiment, the mesh pattern part 510 and the dummy pattern part 510-1 may be arranged to be segmented through a gap 5011 having a predetermined interval. According to an embodiment, the gap 5011 may include a gap (e.g., about 10 μm) that does not interfere with radiation performance when the mesh pattern part 510 is used as the antenna A. In another embodiment, the plurality of first unit patterns 516 and the plurality of second unit patterns 516-1 may have the same size and/or shape. In another embodiment, the plurality of first unit patterns 516 and the plurality of second unit patterns 516-1 may have different sizes and/or shapes. In this case, since the first mesh pattern part 510 and the encompassing dummy pattern part 510-1 may have uniform transmittance through the display, the phenomenon that only the mesh pattern part 510 is visually recognized in the dielectric sheet 500 can be prevented.

Referring to FIG. 18B, the dielectric sheet 500 may include the mesh pattern part 510 formed by the plurality of first unit patterns 516 formed by the plurality of first conductive lines 515, the first dummy pattern part 510-1 formed by the plurality of second unit patterns 516-1 formed by the plurality of conductive lines 515-1 and arranged to encompass at least a portion of the mesh pattern part 510, and a second dummy pattern part 510-2 formed by a plurality of third unit patterns 516-2 formed by a plurality of third conductive lines 515-2 and arranged to encompass at least a portion of the first dummy pattern part 510-2. According to an embodiment, the mesh pattern part 510 and the first dummy pattern part 510-1 may be arranged to be segmented through the first gap 5011 having a predetermined interval. According to an embodiment, the first dummy pattern part 510-1 and the second dummy pattern part 510-2 may be arranged to be segmented through a second gap 5012 having a predetermined interval. According to an embodiment, the first gap 5011 and/or the second gap 5012 may have an interval (e.g., about 10 μm) that does not interfere with the radiation performance when the mesh pattern part 510 is used as the antenna A. In another embodiment, the first plurality of unit patterns 516, the second plurality of unit patterns 516-1, and/or the third plurality of unit patterns 516-2 may have substantially the same size and/or shape. In another embodiment, the first plurality of unit patterns 516, the second plurality of unit patterns 516-1, and/or the third plurality of unit patterns 516-2 may have different sizes and/or shapes from each other. According to an embodiment, since the mesh pattern part 510 is electrically isolated from the encompassing dummy pattern parts 510-1, 510-2 through the first gap 5011 and the second gap 5012, at least doubly, radiation performance can be improved. In another embodiment, the at least one second gap 5012 may be formed irregularly (e.g., at a non-uniform interval) so as not to have a frequency in a specific space, thereby reducing the degradation in radiation performance of the antenna. For example, the second gap 5012 may be formed so that the distance from the first gap 5011 is not uniform. The first gap 5011 or the second gap 5012 may act as an insulating part. As another example, with reference to FIG. 18A or 18B, the first gap 5011 is formed in a substantially straight line, but the first gap 5011 may be formed in the form of a line instead of a straight line. In this case, visibility from the outside of the first gap 5011 may be reduced.

Figure 19:
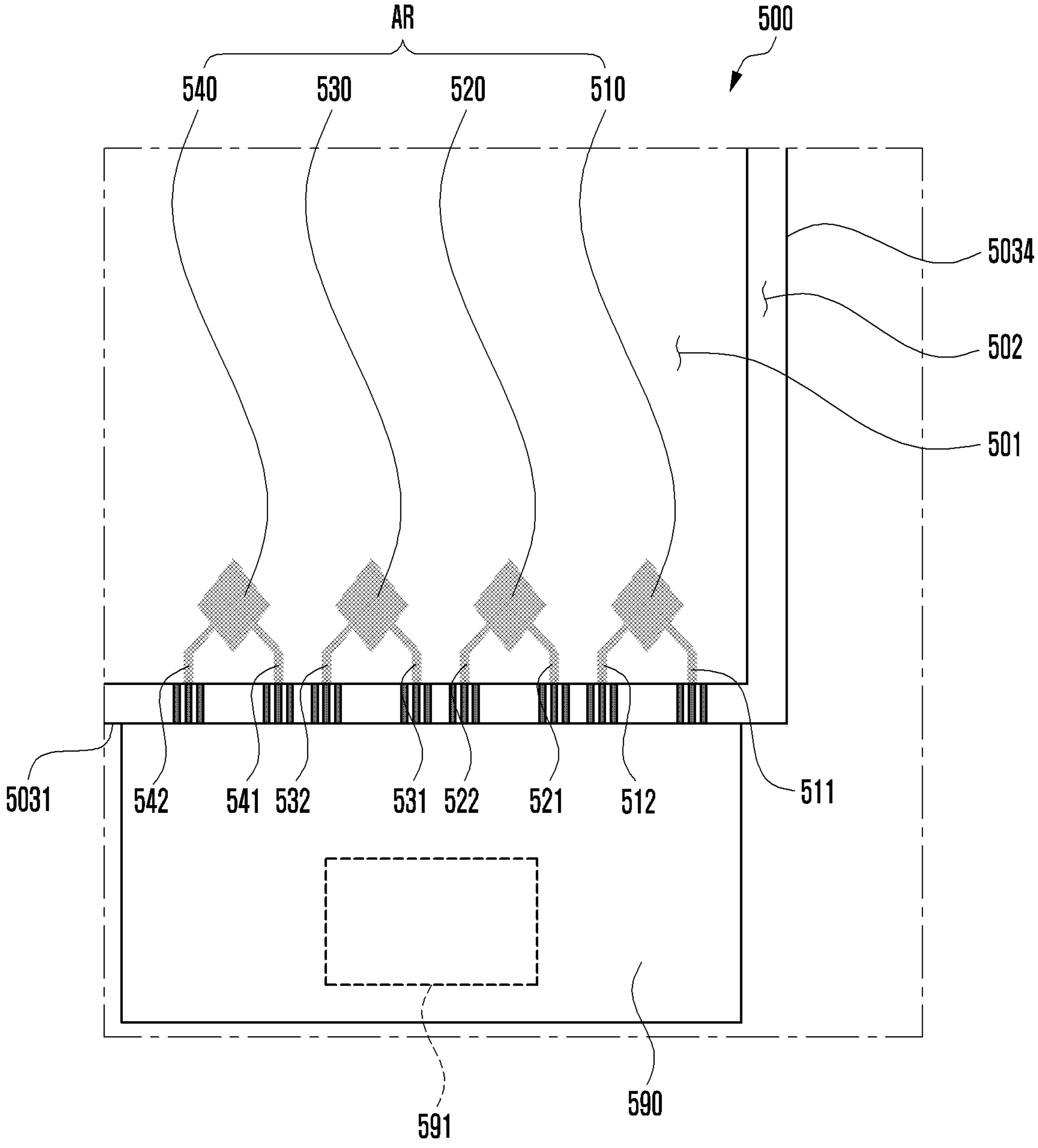
FIG. 19 illustrates a partial structure view of a dielectric sheet including a plurality of mesh pattern parts according to an embodiment of the disclosure.

FIG. 19 illustrates a partial structure view of a dielectric sheet 500 including a plurality of mesh pattern parts 510, 520, 530, 540 according to an embodiment of the disclosure.

Since the first mesh pattern part 510, the second mesh pattern part 520, the third mesh pattern part 530, and/or the fourth mesh pattern part 540 included in an array antenna AR of FIG. 19 have substantially the same electrical connection structure as the mesh pattern part 510 formed in the dielectric sheet 500 of FIG. 5C, a detailed description thereof may be omitted.

Referring to FIG. 19, the dielectric sheet 500 may include an array antenna AR arranged in at least a portion of the first area 501 overlapping the active area (display area) of a display panel (e.g., the display panel 431 in FIG. 4). According to an embodiment, the array antenna AR may include the first mesh pattern part 510, the second mesh pattern part 520, the third mesh pattern part 530, and/or the fourth mesh pattern part 540 that are spaced apart from each other near the first edge 5031 of the dielectric sheet 500. According to an embodiment, the first mesh pattern part 510, the second mesh pattern part 520, the third mesh pattern part 530, and/or the fourth mesh pattern part 540 may be formed in a rhombus shape, and may operate to have a double polarization by two feed lines 511, 512, 521, 522, 531, 532, 541, 542. According to an embodiment, the first mesh pattern part 510 may include the first feed line 511 and the second feed line that extend from the first mesh pattern part 510 and are electrically connected to the FPCB 590. According to an embodiment, the second mesh pattern part 520 may include the third feed line 521 and the fourth feed line 522 that extend from the second mesh pattern part 520 and are electrically connected to the FPCB 590. According to an embodiment, the third mesh pattern part 530 may include a fifth feed line 531 and a sixth feed line 532 that extend from the third mesh pattern part 530 and are electrically connected to the FPCB 590. According to an embodiment, the fourth mesh pattern part 540 may include a seventh line 541 and an eight feed line 542 that extend from the fourth mesh pattern part 540 and are electrically connected to the FPCB 590. According to an embodiment, the wireless communication circuit 591 may be configured to transmit and/or receive a first signal having a first polarization through the first feed line 511, the third feed line 521, the fifth feed line 531, and/or the seventh feed line 541. According to an embodiment, the wireless communication circuit 591 may be configured to transmit and/or receive a second signal having a second polarization perpendicular to the first polarization through the second feed line 512, the fourth feed line 522, the sixth feed line 532, and/or the eighth feed line 542. In another embodiment, the array antenna AR may include five or more mesh pattern parts spaced apart from the dielectric sheet 500. In another embodiment, as illustrated in FIG. 8A or 8B, at least one mesh pattern part of the plurality of mesh pattern parts 510, 520, 530, 540 of the array antenna AR may be formed through at least one of the gaps 5011, 5012 by cutting the plurality of conductive lines 515 in a case that the plurality of conductive lines 515 is arranged in the first area 501 of the dielectric sheet 500.

Figure 20A:
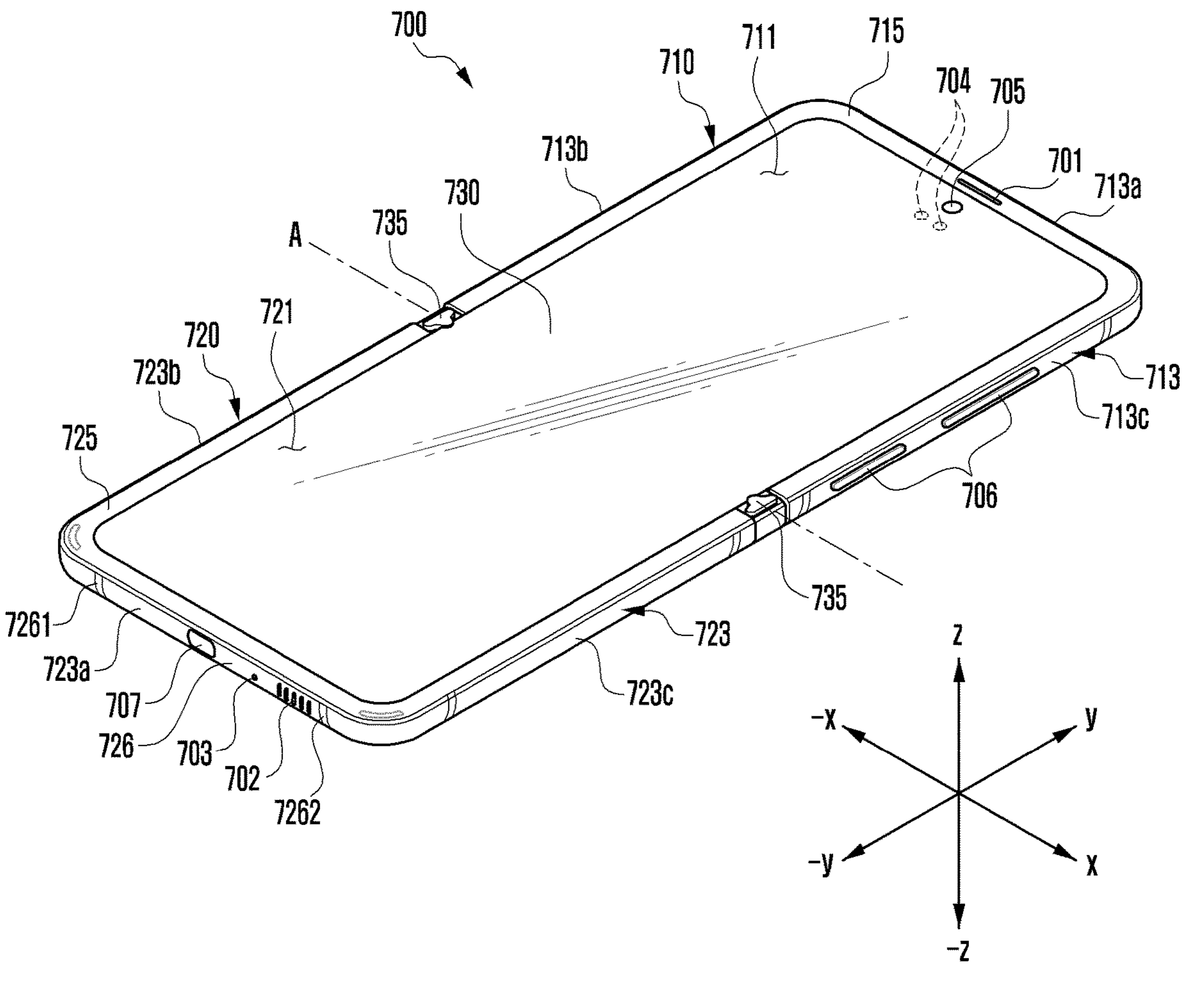
FIG. 20A illustrates a front perspective view of an electronic device in a flat or unfolding state according to an embodiment of the disclosure.
Figure 20B:
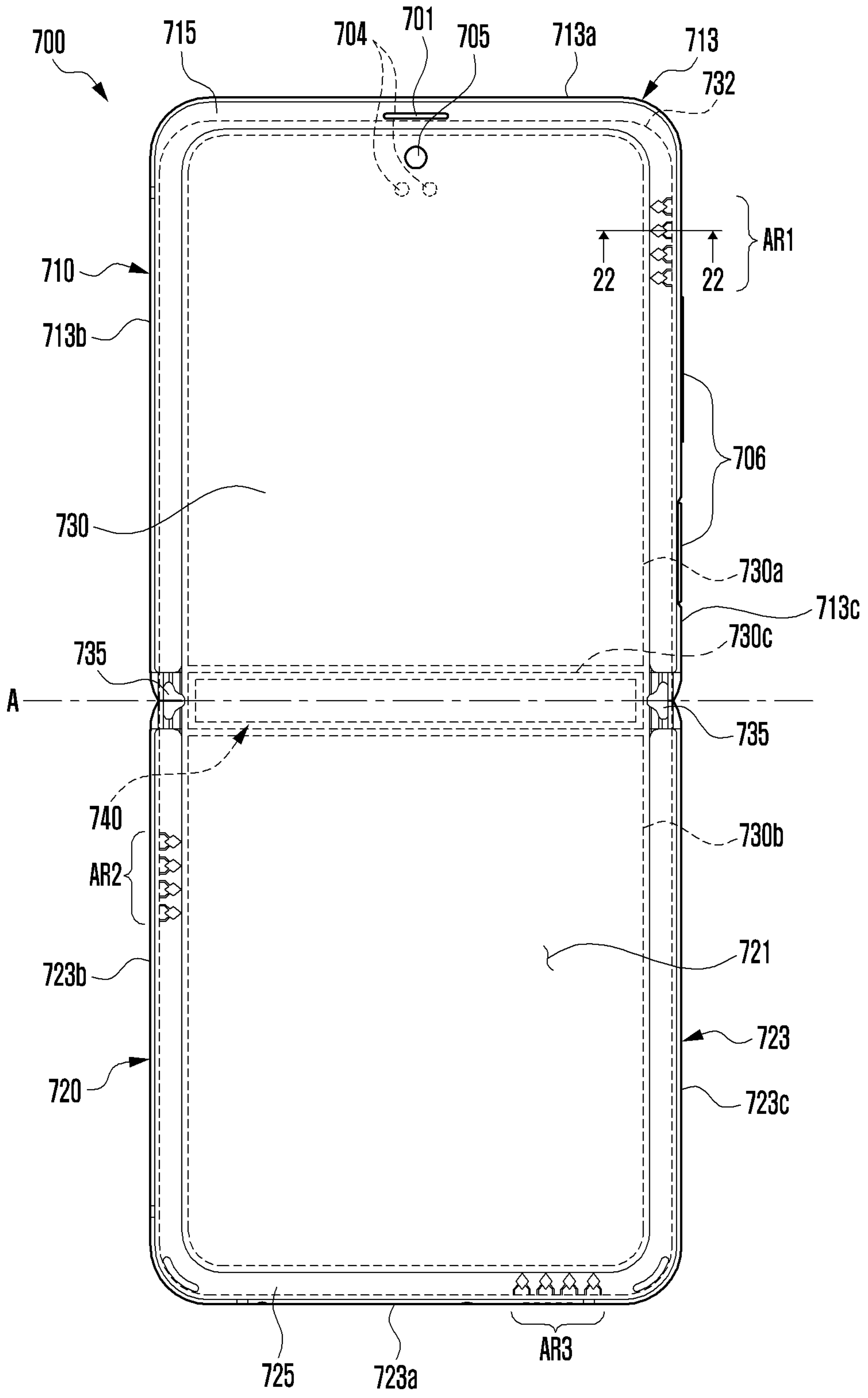
FIG. 20B illustrates a plan view of a front of an electronic device in a flat or unfolding state according to an embodiment of the disclosure.
Figure 20C:
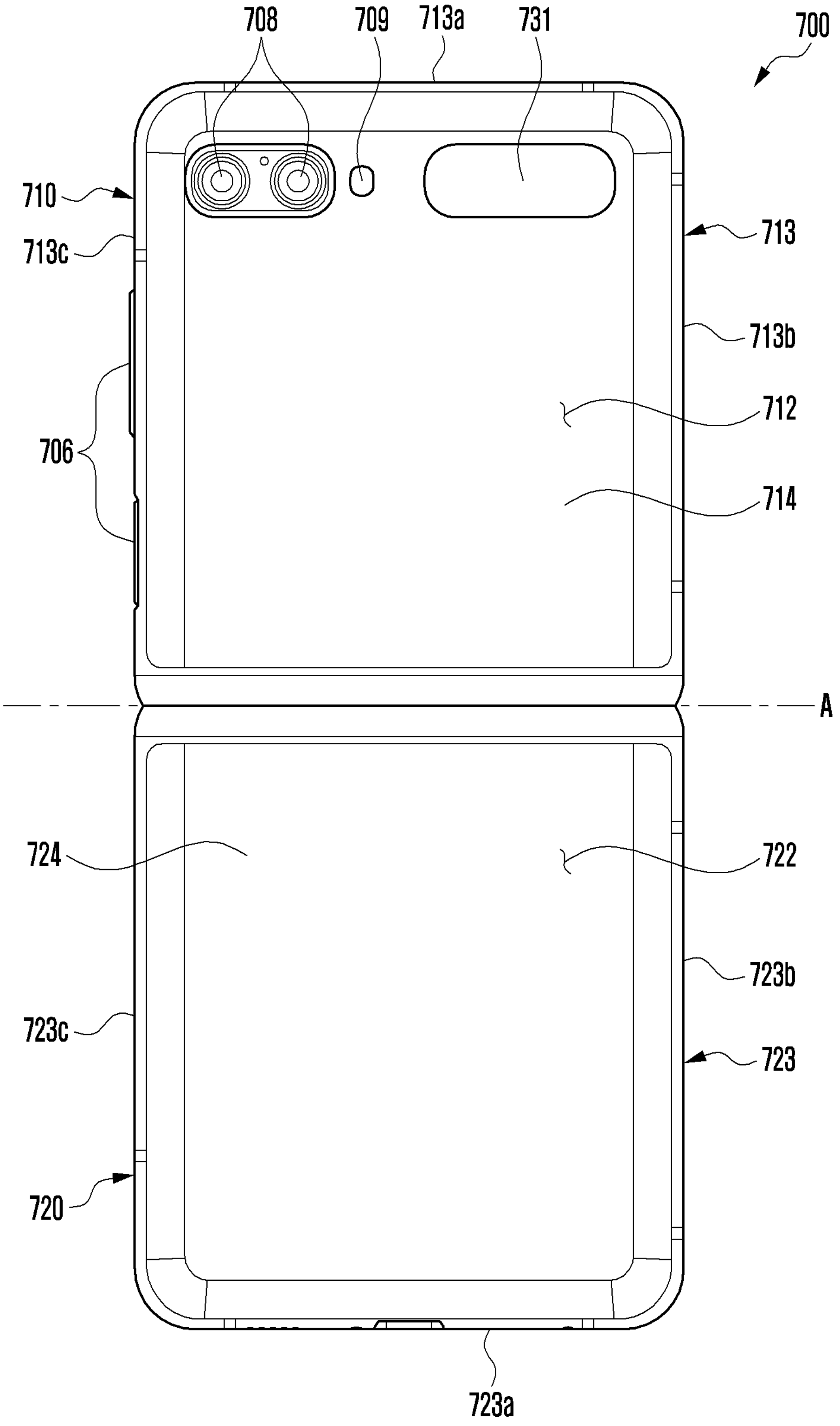
FIG. 20C illustrates a plan view of a rear of an electronic device in a flat or unfolding state according to an embodiment of the disclosure.

FIG. 20A is a perspective view illustrating an electronic device in a flat or unfolding state according to an embodiment of the disclosure. FIG. 20B is a plan view illustrating a front of an electronic device in a flat or unfolding state according to an embodiment of the disclosure. FIG. 20C is a plan view illustrating a rear of an electronic device in a flat or unfolding state according to an embodiment of the disclosure.

Figure 21A:
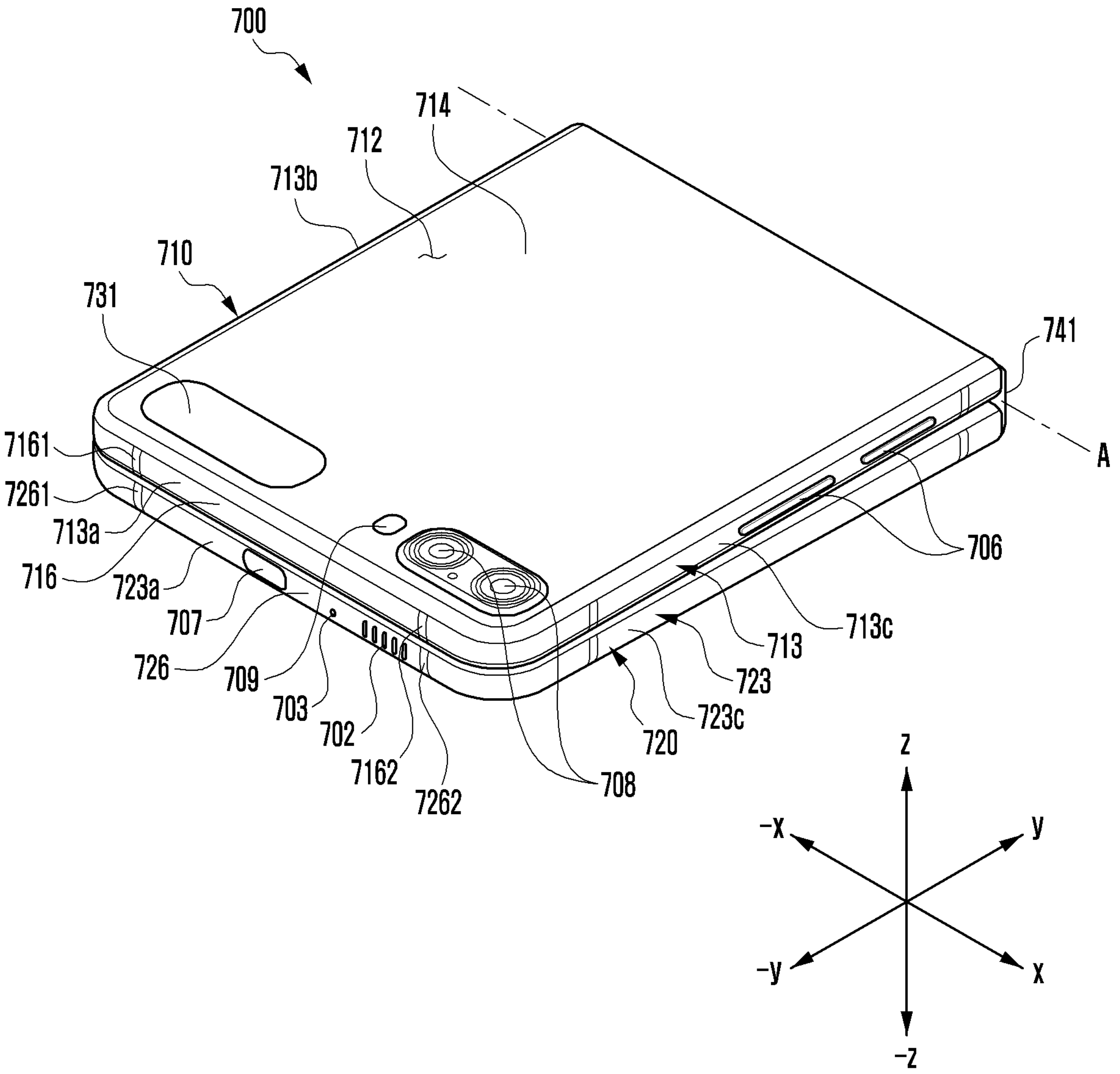
FIG. 21A illustrates a perspective view of an electronic device in a folding state according to an embodiment of the disclosure.
Figure 21B:
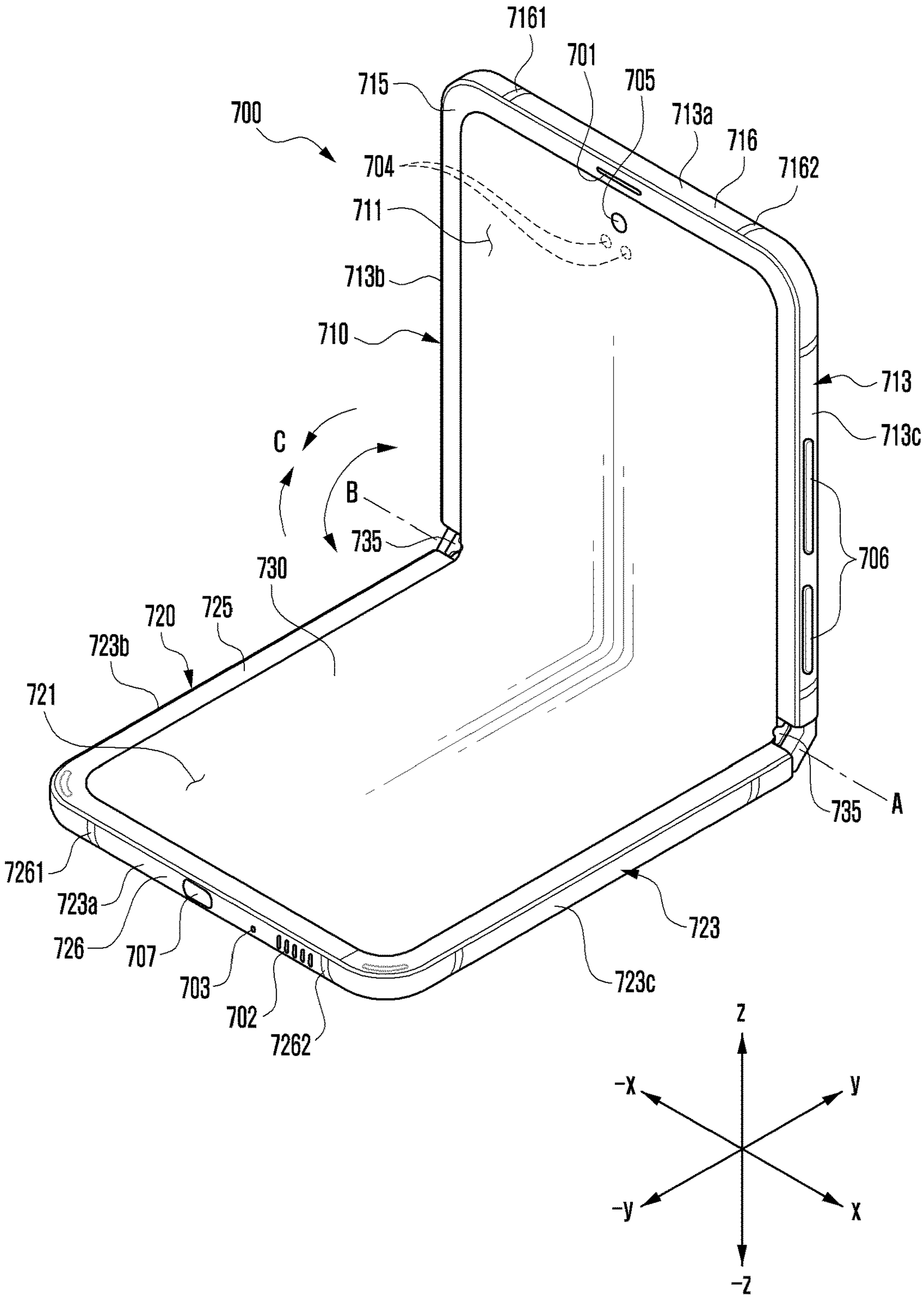
FIG. 21B illustrates a perspective view of an electronic device in an intermediate state according to an embodiment of the disclosure.

FIG. 21A is a perspective view illustrating an electronic device in a folding state according to an embodiment of the disclosure. FIG. 21B is a perspective view illustrating an electronic device in an intermediate state according to an embodiment of the disclosure.

Referring to FIGS. 20A, 20B, 20C, 21A, and 21B, the electronic device 700 may include housings 710, 720 (e.g., a foldable housing) that are rotatably coupled to face each other and to be folded based on a hinge module (e.g., a hinge module 740 in FIG. 20B). In another embodiment, the hinge module (e.g., the hinge module 740 in FIG. 20B) may be arranged in the x-axis direction or the y-axis direction. In another embodiment, two or more hinge modules 740 may be arranged to be folded in the same direction or in different directions. According to an embodiment, the electronic device 700 may include a flexible display 730 (e.g., a foldable display) arranged in an area formed by the housings 710, 720. According to an embodiment, the first housing 710 and the second housing 720 are arranged on both sides about a folding axis (A-axis), and may have substantially symmetrical shapes with respect to the folding axis (A-axis). According to an embodiment, the first housing 710 and the second housing 720 may form an angle or a distance therebetween, which may be variable depending on whether the electronic device 700 is in a flat or unfolding state, in a folding state, or in an intermediate state.

According to various embodiments, the housings 710, 720 may include the first housing 710 (e.g., a first housing structure) coupled to a hinge module and the second housing 720 (e.g., the second housing structure) coupled to the hinge module. According to an embodiment, the first housing 710 may include, in the unfolding state, a first surface 711 facing a first direction (e.g., front direction) (z-axis direction) and a second surface 712 facing a second direction (e.g., rear direction) (−z-axis direction) opposite the first surface 711. According to an embodiment, the second housing 720 includes, in the unfolding state, a third surface 721 facing the first direction (z-axis direction) and a fourth surface 722 facing the second direction (−z-axis direction). According to an embodiment, the electronic device 700 may be operated such that, in the unfolding state, the first surface 711 of the first housing 710 and the third surface 721 of the second housing 720 face substantially the same direction, i.e., the first direction (z-axis direction) and in the folding state, the first surface 711 and the third surface 721 face each other. According to an embodiment, the electronic device 700 may be operated such that, in the unfolding state, the second surface 712 of the first housing 710 and the fourth surface 722 of the second housing 720 face substantially the same direction, i.e., the second direction (−z-axis direction) and in the folding state, the second surface 712 and the fourth surface 722 face opposite directions. For example, in the folding state, the second surface 712 may face the first direction (2-axis direction), and the fourth surface 722 may face the second direction (−z-axis direction).

According to various embodiments, the first housing 710 may include a first side frame 713 forming at least a portion of the exterior of the electronic device 700 and a first rear cover 714 coupled to the first side frame 713 and forming at least a portion of the second surface 712 of the electronic device 700. According to an embodiment, the first side frame 713 may include a first side surface 713*a*, a second side surface 713*b* extending from one end of the first side surface 713*a*, and a third side face 713*c* extending from the other end of the first side surface 713*a*. According to an embodiment, the first side frame 713 may be formed in a rectangular (e.g., square or rectangular) shape through the first side 713*a*, the second side 713*b*, and the third side 713*c*.

According to various embodiments, the second housing 720 may include a second side frame 723 forming at least a portion of the exterior of the electronic device 700 and a second rear cover 724 coupled to the second side frame 723 and forming at least a portion of the fourth surface 722 of the electronic device 700. According to an embodiment, the second side frame 723 may include a fourth side surface 723*a*, a fifth side surface 723*b* extending from one end of the fourth side surface 723*a*, and a sixth side face 723*c* extending from the other end of the fourth side surface 723*a*. According to an embodiment, the second side frame 723 may be formed in a rectangular shape through the fourth side 723*a*, the fifth side 723*b*, and the sixth side 723*c*.

According to various embodiments, the housings 710, 720 are not limited to the illustrated shape and assembly, but may be implemented by other shapes or other combinations and/or assemblies of components. For example, in another embodiment, the first side frame 713 and the first rear cover 714 may be integrally formed, and in still another embodiment, the second side frame 723 and the second rear cover 724 may be integrally formed.

According to various embodiments, in the electronic device 700 in the unfolding state, the second side surface 713*b* of the first side frame 713 and the fifth side surface 723*b* of the second side frame 723 may form one virtual line. According to an embodiment, in the electronic device 700 in the unfolding state, the third side surface 713*c* of the first side frame 713 and the sixth side surface 723*c* of the second side frame 723 may form one a virtual line. According to an embodiment, the electronic device 700 may be configured such that, in the unfolding state, the total length of the second side surface 713*b* and the fifth side surface 723*b* is longer than the first side surface 713*a* and/or the fourth side surface 723*a*. As another example, the electronic device 700 may be configured such that the total length of the third side surface 713*c* and the sixth side surface 723*c* is longer than the first side surface 713*a* and/or the fourth side surface 723*a*.

According to various embodiments, the first side frame 713 and the second side frame 723 may be formed of metal or may further include a polymer injected into the metal. According to an embodiment, the first side frame 713 and/or the second side frame 723 may include at least one conductive portion 716 and/or 726 electrically segmented through at least one segmented portion 7161, 7162 and/or 7261, 7262 formed of a polymer. In this case, the at least one conductive portion 716 and/or 726 may be electrically connected to a wireless communication circuit included in the electronic device 700, thereby being used as an antenna that operates in at least one designated band (e.g., a legacy band).

According to various embodiments, the first rear cover 714 and/or the second rear cover 724 may be formed of at least one of coated or colored glass, ceramic, polymer, or metal (e.g., aluminum, stainless steel (STS), or magnesium), or any combination of at least two of the above.

According to various embodiments, the flexible display 730 may be arranged to extend from the first surface 711 of the first housing 710 to at least a portion of the third surface 721 of the second housing 720 across the hinge module 740. For example, the flexible display 730 may include a first area 730*a* substantially corresponding to the first surface 711, a second area 730*b* corresponding to the second surface 721, and a third area 730*c* connecting the first area 730*a* and the second area 730*b* and corresponding to the hinge module 740. The third area 730*c* may be bent or unfolded according to the operation of the first housing 710 or the second housing 720. According to various embodiment, the electronic device 700 may include a first protective cover 715 (e.g., a first protective frame or a first decoration member) coupled along edges of the first housing 710. According to an embodiment, the electronic device 700 may include a second protective cover 725 (e.g., a second protective frame or a second decoration member) coupled along edges of the second housing 720. According to one embodiment, the first protective cover 715 and/or the second protective cover 725 may be formed of a metal or polymer material. According to an embodiment, the first protective cover 715 and/or the second protective cover 725 may be used as a decoration member. According to an embodiment, the flexible display 730 may be positioned such that edges of a first flat area 730*a* is interposed between the first housing 710 and the first protective cover 715. According to an embodiment, the flexible display 730 may be positioned such that the edges of a second flat area 730*b* is interposed between the second housing 720 and the second protective cover 725. According to an embodiment, the flexible display 730 may be positioned such that by a protective cap (e.g., the protective cap 135 in FIGS. 3A, 3B, and 3C) arranged an area corresponding to the hinge module 740, the edge of the flexible display 730 corresponding to the protective cap can be protected. Accordingly, the edges of the flexible display 730 may be substantially protected from the outside. According to an embodiment, the electronic device 700 may include a hinge housing 741 (e.g., a hinge cover) to support the hinge module 740. The hinge housing 741 may be arranged so that, when the electronic device 700 is in the folding state, the hinge housing is exposed to the outside and when the electronic device 700 is in the unfolding state, the hinge housing is drawn into a first space (e.g., an inner space of the first housing 710) and a second space (e.g., an inner space of the second housing 720) so as to be invisible from the outside. In another embodiment, when the electronic device 700 is in a folding state, the second surface 712 and the fourth surface 722 may be operated to face each other so that the flexible display 730 is viewed from the outside. In this case (adjacent folding method), a first array antenna (AR1) and a second array antenna (AR2) may have beam patterns formed in opposite directions to each other.

According to various embodiments, the electronic device 700 may include a sub-display 731 arranged separately from the flexible display 730. According to an embodiment, the sub-display 731 may be arranged on the second surface 712 of the first housing 710 or the fourth surface 722 of the second housing to be at least partially exposed. For example, in the case of folding state, the sub-display 731 may display status information of the electronic device 700 or various contents such as time, image, or application. According to an embodiment, the sub-display 731 may be arranged to be visible from the outside through at least one area in the first rear surface cover 714. In another embodiment, the sub-display 731 may be arranged on the fourth surface 722 of the second housing 720. In this case, the sub-display 731 may be arranged to be visible from the outside through at least one area in the second rear surface cover 724.

According to various embodiments, the electronic device 700 may include at least one of an input device 703 (e.g., a microphone), sound output devices 701, 702, a sensor module 704, camera devices 705, 708, a key input device 706, and a connector port 707. In the illustrated embodiment, the input device 703 (e.g., a microphone), the sound output devices 701, 702, the sensor module 704, the camera devices 705, 708, the key input device 706, or the connector port 707 are indicated as holes or shapes formed in the first housing 710 or the second housing 720, but may be defined as including substantial electronic components (e.g., an input device, a sound output device, a sensor module, or a camera device) operating through the holes or shapes.

According to various embodiment, the input device 703 may include at least one microphone arranged in the second housing 720. In another embodiment, the input device 703 may include a plurality of microphones arranged to sense the direction of sound. In another embodiment, the plurality of microphones may be arranged at appropriate positions in the first housing 710 and/or the second housing 720. According to various embodiment, the sound output devices 701, 702 may include speakers. According to an embodiment, the speakers may include a call receiver 701 arranged in the first housing 710 and a speaker 702 arranged in the second housing 720. In another embodiment, the input device 703, the sound output devices 701, 702, and/or the connector port 707 are provided in the first housing 710 and/or the second housing 720 of the electronic device 700, and may be exposed to the external environment through one or more holes formed in the first housing 710 and/or the second housing 720. According to an embodiment, at least one connector port 707 may be used to transmit/receive power and/or data with respect to an external electronic device. In another embodiment, the at least one connector port 707 (e.g., an ear jack hole) may accommodate a connector (e.g., an ear jack) for transmitting/receiving an audio signal with respect to an external electronic device. In another embodiment, the holes formed in the first housing 710 and/or the second housing 720 may be commonly used for the input device 703 and the sound output devices 701, 702. In another embodiment, the sound output devices 70, 702 may include a speaker (e.g., a piezo speaker) that operates without holes formed in the first housing 710 and/or the second housing 720.

According to various embodiments, the sensor module 704 may generate an electrical signal or a data value corresponding to an internal operating state of the electronic device 700 or an external environmental state. The sensor module 704 may detect an external environment through the first surface 711 of the first housing 710. In another embodiment, the electronic device 700 may further include at least one sensor module arranged to detect an external environment through the second surface 712 of the first housing 710. According to an embodiment, the sensor module 704 (e.g., an illuminance sensor) may be arranged under the flexible display 730 in order to detect an external environment through the flexible display 730. According to an embodiment, the sensor module 704 may include at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, an illuminance sensor, a proximity sensor, a biometric sensor, an ultrasonic sensor, or an illuminance sensor 704.

According to various embodiments, the camera devices 705, 708 may include a first camera device 705 (e.g., a front camera device) arranged on the first surface 711 of the first housing 710 and/or a second camera device 708 arranged on the second surface 712 of the first housing 710. The electronic device 700 may further include a flash 709 arranged near the second camera device 708. According to an embodiment, the camera devices 705, 708 may include one or more lenses, an image sensor, and/or an image signal processor. For example, the flash 709 may include a light emitting diode or a xenon lamp. According to an embodiment, the camera devices 705, 708 may be arranged such that two or more lenses (e.g., a wide-angle lens, an ultra-wide-angle lens, or a telephoto lens) and image sensors are located on one surface (e.g., the first surface 711, the second surface 712, the third surface 721, or the fourth surface 722) of the electronic device 700. In another embodiment, the camera devices 705, 708 may include lenses for time-of-flight (TOF) and/or image sensors.

According to various embodiments, the key input device 706 (e.g., a key button) may be arranged on the third side surface **713*c* of the first side frame 713 of the first housing 710. In another embodiment, the key input device 706 may be arranged on at least one of the other side surfaces 713*a*, 713*b* of the first housing 710 and/or the side surfaces 723*a*, 723*b*, 723*c* of the second housing 720. In another embodiment, the electronic device 700 may not include some or all of the key input devices 706, and a key input device 706 not included in the electronic device 700 may be implemented in another form such as a touch key or a soft key on the flexible display 730. In another embodiment, the key input device 706 may be implemented using a pressure sensor included in the flexible display 730**.

According to various embodiments, some of the camera devices 705, 708 (e.g., the first camera device 705) or the sensor module 704 may be arranged to be exposed through the flexible display 730. For example, the first camera device 705 or the sensor module 704 may be arranged to be in contact with the external environment through an opening (e.g., a through hole) formed at least partially in the flexible display 730 in the inner space of the electronic device 700. In another embodiment, some sensor modules 704 may be arranged in the space inside the electronic device 700 to perform the functions thereof without being visually exposed through the flexible display 730. For example, in this case, an area of the flexible display 730 that faces the sensor module may not need to be opened. As another example, without the flexible display 730 opening, a position corresponding to the sensor module 704 and/or the camera devices 705, 708 may be formed to have a higher transmittance than a peripheral area. In this case, the area corresponding to the sensor module 704 and/or the camera devices 705, 708 of the flexible display 730 may be formed to have a pixel and/or wiring structure omitted, or to have a lower pixel density and/or wiring density than a peripheral area.

Referring to FIG. 21B, the electronic device 700 may be operated to maintain an intermediate state through the hinge module 740. For example, in the case of intermediate state, the angle between the first housing 710 and the second housing 720 may be greater than 0 degrees and less than 180 degrees. In an embodiment, in the case of intermediate state, the electronic device 700 may control the flexible display 730 to display different contents on the display area corresponding to the first surface 711 and the display area corresponding to the third surface 721. For example, in the case of intermediate state, the electronic device 700 may display a video on the first area 730*a* of the flexible display 730 and may display a controller capable of controlling the video on the second area 730*b*. According to an embodiment, the electronic device 700 may be operated in a substantially unfolding state (e.g., an unfolding state in FIG. 20A) and/or a substantially folding state (e.g., a folding state in FIG. 21A) through the hinge module 740 based on a predetermined bend angle (e.g., an angle between the first housing 710 and the second housing 720 in the intermediate state). For example, in a case that a pressing force is provided in an unfolding direction (B direction) in a state in which the electronic device 700 is unfolded at a predetermined bend angle through the hinge module 740, the electronic device 700 may be operated to transit into an unfolding state (e.g., an unfolding state in FIG. 20A). For example, in a case that a pressing force is provided in a folding direction (C direction) in a state in which the electronic device 700 is unfolded at a predetermined bend angle through the hinge module 740, the electronic device 700 may be operated to transit into a closed state (e.g., a folding state in FIG. 21A). In an embodiment, the electronic device 700 may be operated to maintain an unfolding state (not illustrated) at various angles through the hinge module 740.

Figure 22:
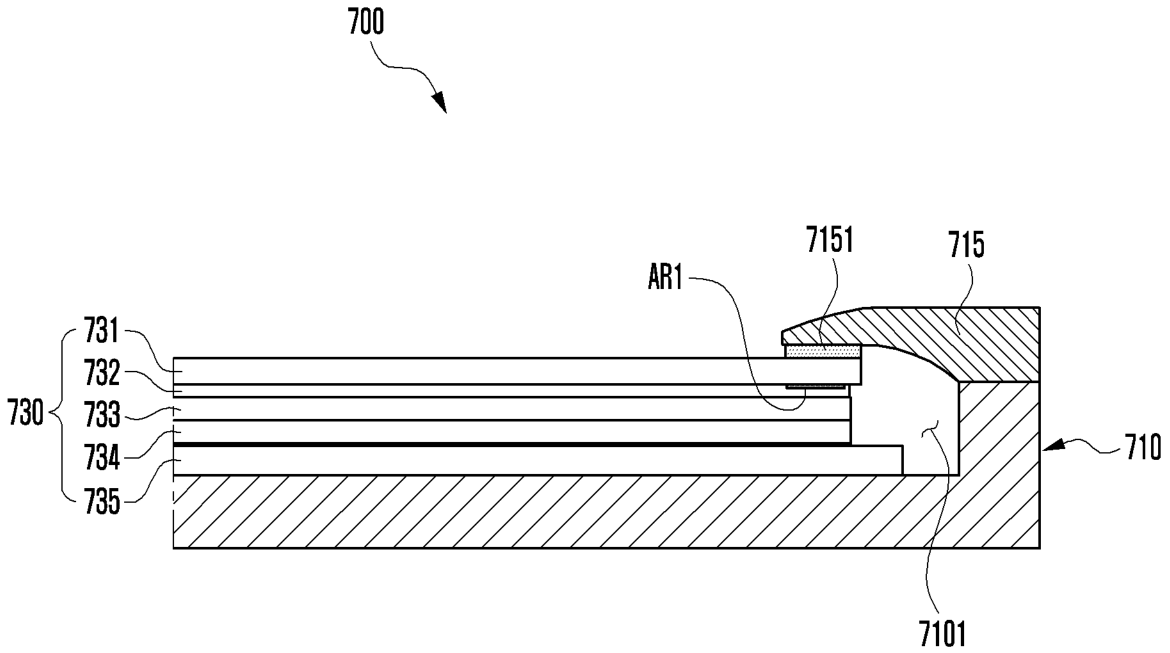
FIG. 22 illustrates a partial cross-sectional view of an electronic device taken along line 22-22 of FIG. 20B according to an embodiment of the disclosure.

Referring to FIG. 22, according to various embodiments, the electronic device 700 may include a dielectric sheet 732 arranged to at least partially overlap the flexible display 730. According to an embodiment, the dielectric sheet 732 may include at least one array antenna AR1, AR2, AR3 (e.g., the array antenna AR in FIG. 19) arranged in at least a partial area. For example, the at least one array antenna AR1, AR2, AR3 may include a first array antenna AR1, a second array antenna AR2, and/or a third array antenna AR3. According to an embodiment, the at least one array antenna AR1, AR2, AR3 may include a first array antenna AR1 arranged in an area overlapping the first housing 710, a second array antenna AR2 and third array antenna AR3 arranged in an area overlapping the second housing 720 in the dielectric sheet 732 when the flexible display 730 is viewed from above. According to an embodiment, the first array antenna AR1 may be arranged at a position overlapping the first protective cover 715 arranged on the first housing 710 when the flexible display 730 is viewed from above. In this case, when the flexible display 730 is viewed from above, the area of the first protective cover 715 overlapping the first array antenna AR1 may include a non-conductive material (e.g., a polymer material). In another embodiment, the first array antenna AR1 may be arranged at a position overlapping the first flat area 730*a* of the flexible display 730 when the flexible display 730 is viewed from above. According to an embodiment, the second array antenna AR2 and/or the third array antenna AR3 may be arranged at a position overlapping the second protective cover arranged on the second housing 720 when the flexible display 730 is viewed from above. In this case, when the flexible display 730 is viewed from above, the area of the second protective cover 725 overlapping the second array antenna AR1 or the third array antenna AR3 may include a non-conductive material (e.g., a polymer material). In another embodiment, the second array antenna AR2 and/or the third array antenna AR3 may be arranged to a position overlapping the second flat area 730*b* of the flexible display 730 when the flexible display 730 is viewed from above. In another embodiment, the at least one array antenna AR1, AR2, AR3 may be arranged at a position overlapping a bendable area 730*c* when the flexible display 730 is viewed from above. In this case, the dielectric sheet 732 may be formed of a bendable material. According to an embodiment, the first array antenna AR1, the second array antenna AR2, and/or the third array antenna AR3 may form a beam pattern in a direction the flexible display 730 is facing when the electronic device 700 is in an unfolding state. In another embodiment, the first array antenna AR1, the second array antenna AR2, and/or the third array antenna AR3 may be replaced with one mesh pattern part (e.g., the mesh pattern part 510 in FIG. 5C) arranged on the dielectric sheet 732.

FIG. 22 illustrates a partial cross-sectional view of an electronic device 700 taken along line 22-22 of FIG. 20B according to an embodiment of the disclosure.

Referring to FIG. 22, the electronic device 700 may include the flexible display 730 arranged through at least a portion of the inner space 7101 of the first housing 710. According to an embodiment, the flexible display 730 may include a window layer 731, a dielectric sheet 732 including a first array antenna AR1 arranged under the window layer 731, a display panel 733 arranged under the dielectric sheet 732, a polymer layer 734 arranged under the display panel 733, and/or a metal sheet layer 735. According to an embodiment, the window layer 731 may include a polymer member (e.g., PET) and a glass member (e.g., UTG or polyimide) arranged under the polymer member. According to an embodiment, the flexible display 730 may include a polarizer (e.g., POL) arranged on the display panel 733. According to an embodiment, the polymer layer 734 may be applied with a dark color (e.g., black) to help implement a background when the display is turned off. According to an embodiment, the polymer layer 734 may operate as a cushion to absorb an impact from the outside of the electronic device 700 to prevent damage of the flexible display 730. According to an embodiment, the metal sheet layer 735 may help to reinforce stiffness of the electronic device 700, shield ambient noise, and be used for dissipating a heat emitted from peripheral heat emitting components. According to an embodiment, the metal sheet layer 735 may include at least one of steel use stainless (SUS) (e.g., stainless steel (STS)), Cu, Al, or CLAD (e.g., a stacked member in which SUS and Al are alternately arranged). In another embodiment, the metal sheet layer 735 may include other alloy materials. According to an embodiment, the flexible display 730 may include at least one functional member (not illustrated) arranged between the polymer layer 734 and the metal sheet layer 735. According to an embodiment, the functional member may include at least one of a graphite sheet for heat dissipation, a force touch FPCB, a fingerprint sensor FPCB, a communication antenna radiator, a heat dissipation sheet, a conductive/non-conductive tape, and a detection member for detecting an input by a writing member of an electromagnetic induction method. According to an embodiment, the detecting member may include a digitizer.

According to various embodiments, the first array antenna AR1 arranged on the dielectric sheet 732 may be arranged at a position overlapping the first protective cover 715 when the flexible display 730 is viewed from above. In this case, when the flexible display 730 is viewed from above, the area of the first protective cover 715 overlapping the first array antenna AR1 may include a non-conductive material 7151. In another embodiment, the first array antenna AR1 may be arranged at a position overlapping the active area of the display panel 733 instead of the first protective cover 715 when the flexible display 730 is viewed from above.

Figure 23:
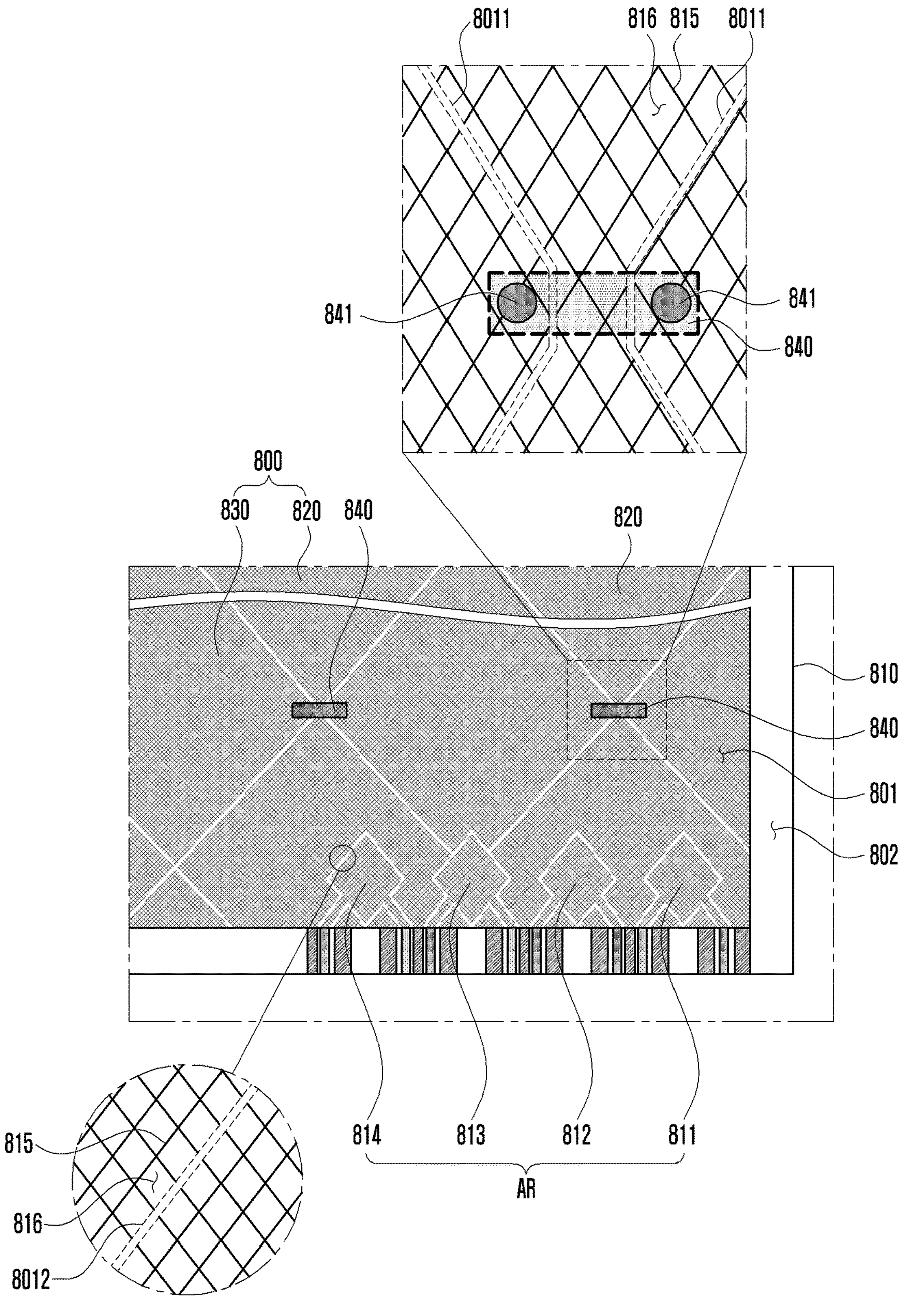
FIG. 23 illustrates a constitution view of a dielectric sheet in which a touch sensor and an antenna are arranged together through conductive lines according to an embodiment of the disclosure.

FIG. 23 illustrates a constitution view of a dielectric sheet 810 in which a touch sensor 800 and an antenna AR are arranged together through conductive lines 815 according to an embodiment of the disclosure.

Referring to FIG. 23, the electronic device may include a dielectric sheet 810 and a touch sensor 800 including a plurality of electrode pattern parts 820, 830 formed on the dielectric sheet 810. According to an embodiment, the dielectric sheet 810 may include a first region 801 and a second region 802 at least partially encompassing the first region 801. According to an embodiment, the first area 801 may include an area facing the active area (display area) of the display. According to an embodiment, the second area 802 may include an area facing the inactive area (a non-display area) of the display.

According to various embodiments, the plurality of electrode pattern parts 820, 830 may include first electrode pattern parts 820 arranged at a predetermined interval along a first direction and second electrode pattern parts 830 arranged between the first electrode pattern parts 820 at predetermined intervals along a second direction intersecting the first direction. According to an embodiment, the first electrode pattern parts 820 and the second electrode pattern parts 830 may arranged in the first area 801 of the dielectric sheet 810 to be segmented through a gap 8011 formed by cutting at least a portion of the unit patterns 816 formed by the plurality of conductive lines 815. According to an embodiment, each of the second electrode pattern parts 830 may be electrically connected through a conductive bridge 840 and/or conductive vias 841. According to an embodiment, the touch sensor 800 may include a capacitive touch sensor. According to an embodiment, the touch sensor 800 may include the first electrode pattern parts 820, the second electrode pattern parts 830, and a touch control circuit (e.g., a touch display driver IC (TDDI)). According to an embodiment, the first electrode pattern parts 820 and the second electrode pattern parts 830 may be electrically connected to a wiring structure arranged in the second area 802 of the dielectric sheet 810, and the wiring structure may be electrically connected to the printed circuit board (e.g., the printed circuit board 340 in FIG. 3C) of the electronic device through the FPCB. According to an embodiment, the FPCB may include a touch display driver IC (TDDI).

According to various embodiments, an array antenna AR arranged on at least a portion of the first area 801 of the dielectric sheet 810 may be included. According to an embodiment, the array antenna AR may include a first mesh pattern part 811, a second mesh pattern part 812, a third mesh pattern part 813, and/or a fourth mesh pattern part 814. The first mesh pattern part 811, the second mesh pattern part 812, the third mesh pattern part 813, and/or the fourth mesh pattern part 814 may have, for example, substantially the same electrical wiring structure as the mesh pattern part 510 in FIG. 5C. According to an embodiment, the first mesh pattern part 811, the second mesh pattern part 812, the third mesh pattern part 813, and/or the fourth mesh pattern part 814 may be arranged to be segmented from the peripheral conductive lines 815 through a gap 8012 formed by cutting at least a portion of the plurality of conductive lines 815. According to an embodiment, the size of the first mesh pattern part 811, the second mesh pattern part 812, the third mesh pattern part 813, and/or the fourth mesh pattern part 814 are formed to be smaller than the size of the electrode pattern parts 820, 830 for the touch sensor 800, so touch operation may not be affected.

Figure 24A:
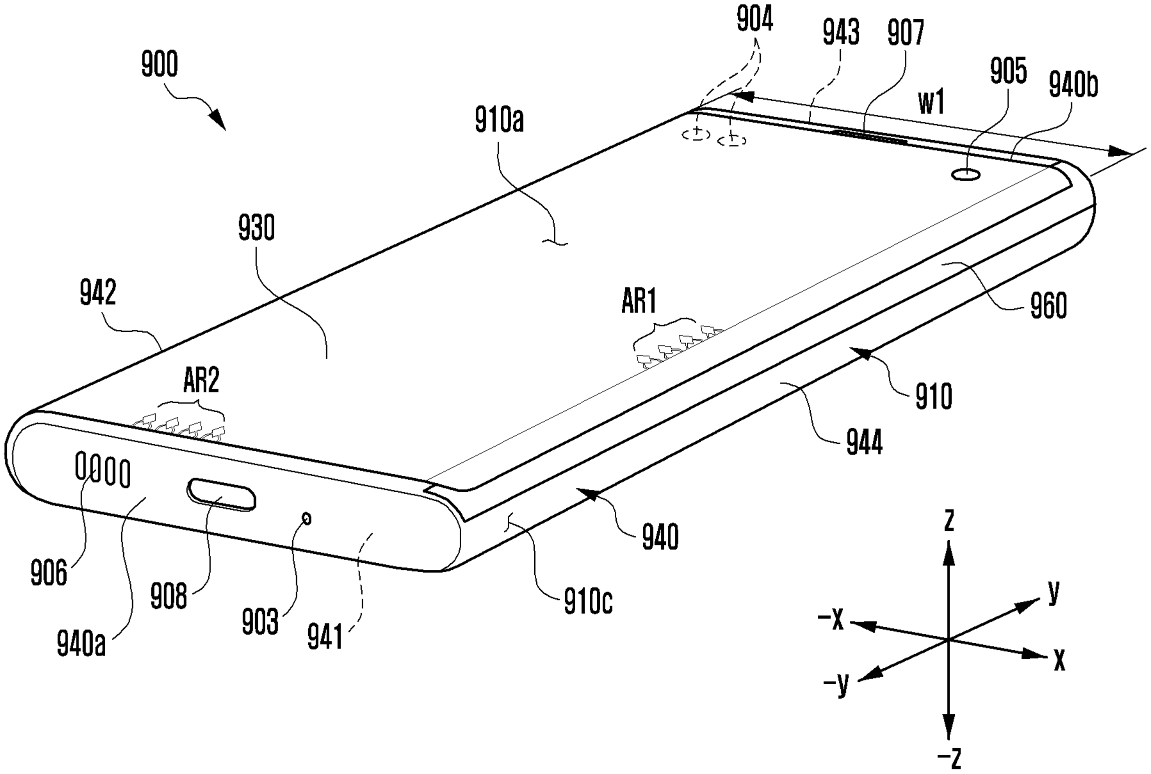
FIGS. 24A and 24B illustrate a front perspective view of an electronic device in a slide-in state and a slide-out state according to various embodiments of the disclosure.
Figure 24B:
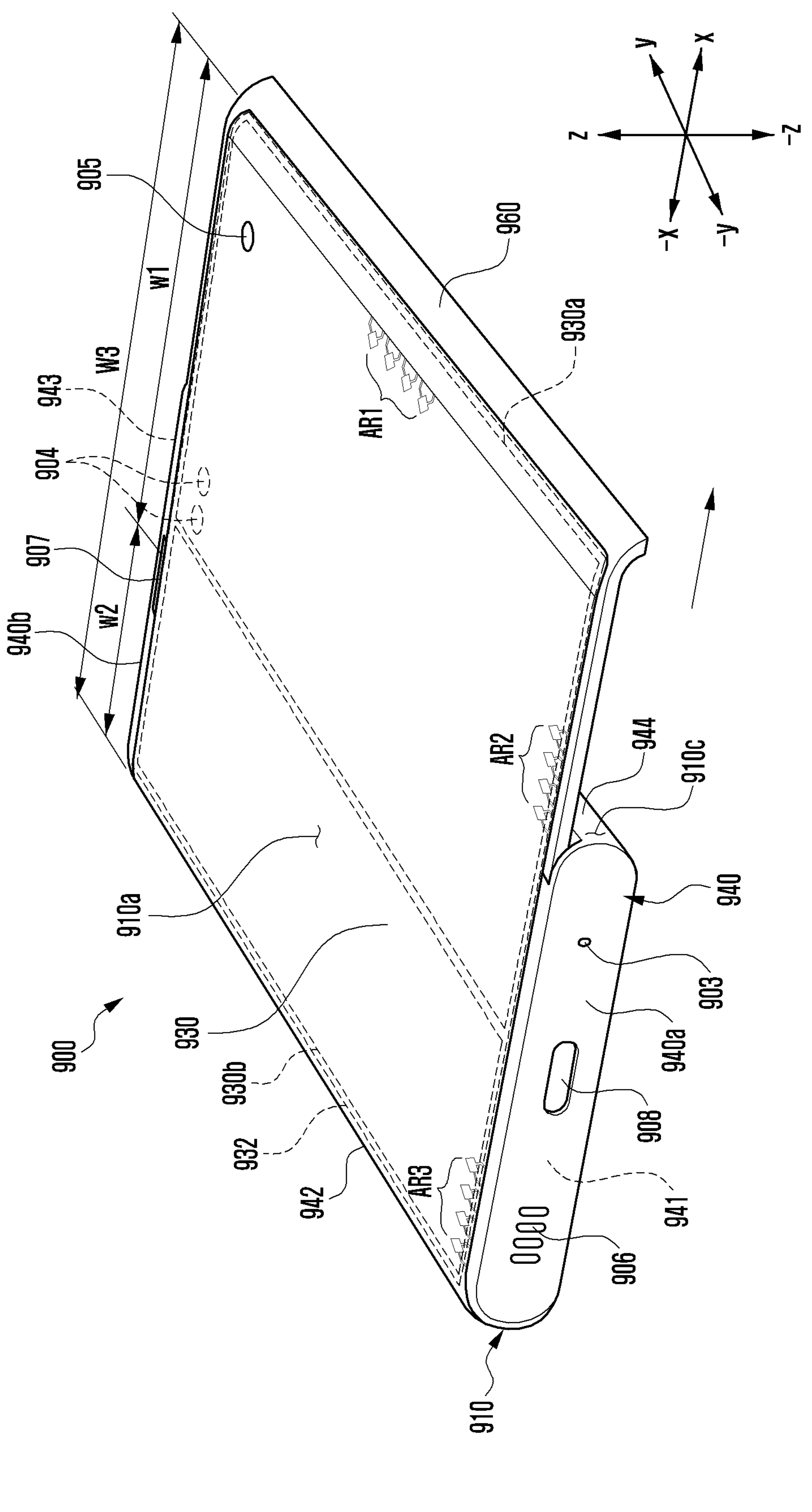

FIGS. 24A and 24B illustrate a front perspective view of an electronic device 900 in a slide-in state and a slide-out state according to various embodiments of the disclosure.

Figure 25A:
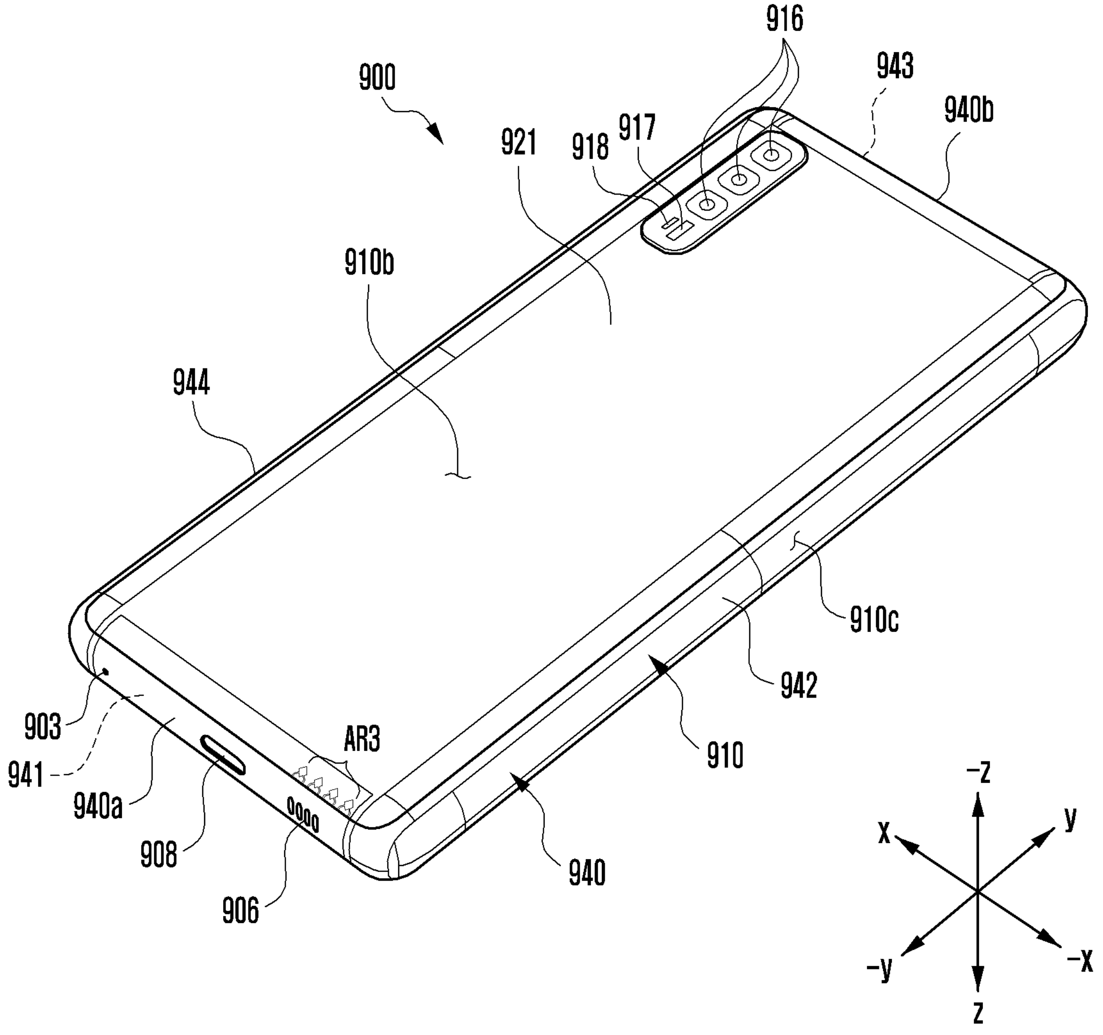
FIGS. 25A and 25B illustrate a rear perspective view of an electronic device in a slide-in state and a slide-out state according to various embodiments of the disclosure.
Figure 25B:
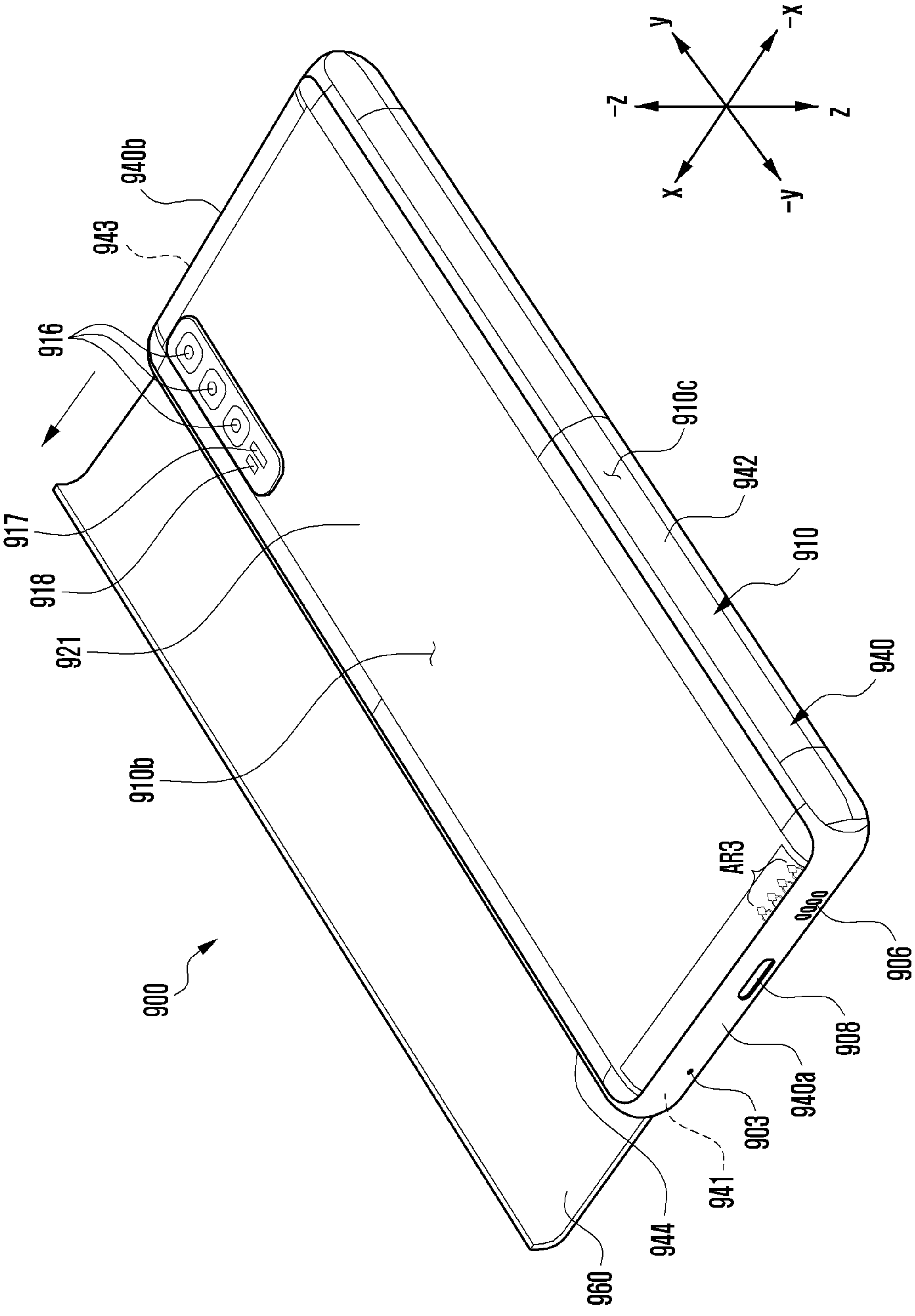

FIGS. 25A and 25B illustrate a rear perspective view of an electronic device 900 in a slide-in state and a slide-out state according to various embodiments of the disclosure.

The electronic device 900 of FIG. 24A may be at least partially similar to the electronic device 101 of FIG. 1 or may further include other embodiments of an electronic device.

Referring to FIGS. 24A, 24B, 25A, and 25B, an electronic device 900 may include a housing 910 (e.g., a housing structure) and a slide plate 960 that is at least partially movably coupled from the housing 910 and supports at least a portion of the flexible display 930. According to an embodiment, the slide plate 960 may include a bendable hinge rail (not illustrated) coupled to an end and supporting at least a portion of the flexible display 930. For example, in a case that the slide plate 960 performs a sliding operation in the housing 910, the hinge rail may be drawn into the inner space of the housing 910 while supporting the flexible display 930. According to an embodiment, the electronic device 900 may include the housing 910 including a front surface **910*a* (e.g., a first surface) facing a first direction (e.g., z-axis direction), a rear surface 910*b* (e.g., a second surface) facing a second direction (e.g., −z-axis direction) opposite to the first direction, and a lateral member 940 encompassing the space between the front surface 910*a* and the rear surface 910*b* and including a side surface 910*c* at least partially exposed to the outside. According to an embodiment, the rear surface 910*b* may be formed through a rear cover 921 coupled to the housing 910. According to an embodiment, the rear cover 921 may be formed of at least one of polymer, coated or colored glass, ceramic, metal (e.g., aluminum, stainless steel (STS), or magnesium), or any combination of at least two of the above materials. In another embodiment, the rear surface 921 may be formed integrally with the housing 910. According to an embodiment, at least a portion of the side surface 910*c* may be arranged to be exposed to the outside through the housing 910**.

According to various embodiments, the lateral member 940 may include a first side 941 having a first length, and a second side extending in a direction perpendicular to the first side 941 and having a second length longer than the first length, a third side 943 extending parallel to the first side 941 from the second side 942 and having the first length, and a fourth 944 extending parallel to the second side 942 from the third side 943 and having the second length. According to an embodiment, the slide plate 960 supports the flexible display 930 and opens the flexible display 930 in a direction (e.g., x-axis direction) from the second side 942 to the fourth side 944 (slide-out), thereby extending the display area of the flexible display 930, or closes the flexible display 930 in a direction (e.g., −x-axis direction) from the fourth side 944 to the second side 942 (slide-in), thereby reducing the display area of the flexible display 930. According to an embodiment, the electronic device 900 may include a first side cover 940*a* and a second side cover 940*b* for covering the first side 941 and the third side 943. According to an embodiment, the first side 941 and the third side 943 may be arranged so as not to be exposed to the outside through the first side cover 940*a* and the second side cover 940*b*.

According to various embodiments, the electronic device 900 may include a flexible display 930 arranged to be supported by the slide plate 960. According to an embodiment, the flexible display 930 may include a flat portion 231 supported by the slide plate 960 and a bendable portion 930*b* extending from the flat portion 930*a* and supported by the hinge rail 961. According to an embodiment, the bendable portion 930*b* of the flexible display 930 may be arranged to be drawing in the inner space of the housing 910 to prevent exposure to the outside when the electronic device 900 is in a closed state (e.g., a state in which the slide plate 960 is drawn into the housing 910), and may be exposed to the outside to extend from the flat portion 931 while being supported by the hinge rail when the electronic device 900 is in an open state (e.g., a state in which the slide plate 960 is drawn out from the housing 910). Accordingly, the electronic device 900 may include a rollable type or a slideable type electronic device in which the area of the display screen of the flexible display 930 is changed according to the movement of the slide plate 960 from the housing 910.

According to various embodiments, the slide plate 960 may be movably coupled in a sliding manner so as to be at least partially retracted or drawn out from the housing 910. For example, in the closed state, the electronic device 900 may be constituted to have a first width w1 from the second side 942 to the fourth side 944. According to an embodiment, in the open state, the electronic device 900 may be constituted to have a third width w greater than the first width w1 as the hinge rail having a second width w2 drawn into the housing 910 moves to the outside of the electronic device.

According to various embodiments, the slide plate 960 may be operated through a user's manipulation. In another embodiment, the slide plate 960 may be automatically operated through a driving mechanism arranged in the inner space of the housing 910. According to an embodiment, when the electronic device 900 detects an event for opening/closing state transition of the electronic device 900 through a processor (e.g., the processor 120 in FIG. 1), the electronic device 900 may be configured to control the operation of the slide plate 960 through the driving mechanism. In another embodiment, the processor (e.g., the processor 120 in FIG. 1) of the electronic device 900 may control to display an object in various way and execute an application program in response to the changed display area of the flexible display 930 according to the open state, closed state, or intermediate state of the slide plate 960.

According to various embodiments, the electronic device 900 may include at least one of an input device 903, sound output devices 906, 907, sensor modules 904. 917, camera modules 905, 916, a connector port 908, a key input device (not illustrated), or an indicator (not illustrated). In another embodiment, the electronic device 900 may omit at least one of the above-mentioned components, or may additionally include other components.

According to various embodiments, the input device 903 may include a microphone 903. In another embodiment, the input device 903 may include a plurality of microphones 903 arranged to sense the direction of sound. The sound output devices 906, 907 may include speakers 906, 907. The speakers 906, 907 may include an external speaker 906 and a phone call receiver 907. In another embodiment, the sound output devices 906, 907 may include a speaker (e.g., a piezo speaker) that operates without a separate speaker hole 906.

According to various embodiments, the sensor modules 904, 917 may generate an electrical signal or a data value corresponding to the internal operating state of the electronic device 900 or an external environmental state. The sensor modules 904, 917 may include, for example, a first sensor module 904 (e.g., a proximity sensor or an illuminance sensor) arranged on the front surface of the electronic device and/or a second sensor module 917 (e.g., an HRM sensor) arranged on the rear surface of the electronic device. According to an embodiment, the first sensor module 904 may be arranged below the flexible display 930 in the front surface 910*a* of the electronic device 900. According to an embodiment, the first sensor module 904 may further include at least one of a proximity sensor, an illuminance sensor 904, a time of flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, and a humidity sensor.

According to various embodiments, the camera devices 905, 916 may include a first camera device 905 arranged on the front surface 910*a* of the electronic device 900 and a second camera 916 arranged on the rear surface 910*b* of the electronic device 900. According to an embodiment, the electronic device 900 may include a flash 918 arranged in the vicinity of the second camera 916. According to an embodiment, the camera devices 905, 916 may include one or more lenses, an image sensor, and/or an image signal processor. According to an embodiment, the first camera device 905 may be arranged under the flexible display 930, and may be constituted to image an object through a part of the active area of the flexible display 930. According to an embodiment, the flash 918 may include, for example, a light-emitting diode or a xenon lamp. In another embodiment, two or more lenses (e.g., a wide-angle lens and a telephoto lens) and image sensors may be arranged on one surface of the electronic device 900.

According to various embodiments, the electronic device 900 may include at least one antenna (not illustrated). According to an embodiment, the at least one antenna may wirelessly communicate with an external electronic device (e.g., the electronic device 104 in FIG. 1), or may wirelessly transmit/receive the power required for charging. According to an embodiment, the antenna may include a legacy antenna, a mmWave antenna, a nearfield communication (NFC) antenna, a wireless charging antenna, and/or a magnetic secure transmission (MST) antenna.

According to various embodiments, the housing 910 (e.g., a side frame) may be at least partially formed of a conductive material (e.g., a metal material). According to an embodiment, at least the first side 941 and/or the third side 943 of the housing 910, which are not involved in driving the slide plate 960, may be formed of a conductive material, and may be divided into a plurality of conductive parts electrically insulated through the non-conductive material. According to an embodiment, the plurality of conductive parts is electrically connected to a wireless communication circuit (e.g., the wireless communication module 192 in FIG. 1) arranged inside the electronic device 900 and may be used as antennas operating in various frequency bands.

According to various embodiments, the electronic device 900 may include a dielectric sheet 932 arranged to at least partially overlap the flexible display 930 in an inner space. According to an embodiment, the dielectric sheet 932 may be formed to have substantially the same size as the flexible display 930. In another embodiment, the dielectric sheet 932 may be formed to have a smaller size than that of the flexible display 930. According to an embodiment, the dielectric sheet 932 may include at least one array antenna AR1, AR2, AR3 (e.g., the array antenna AR in FIG. 19) arranged in at least a partial area. For example, the at least one array antenna AR1, AR2, AR3 may include a first array antenna AR1, a second array antenna AR2, and/or a third array antenna AR3. According to an embodiment, the at least one array antenna AR1, AR2, AR3 may include the first antenna array AR and second antenna array AR2 arranged in an area overlapping a flat portion 930*a* and the third antenna array AR3 arranged in an area overlapping a bendable portion 930*b* in the dielectric sheet 932 when the flexible display 930 is viewed from above. According to an embodiment, the first antenna array AR1 may be arranged near the fourth side 944 in an area overlapping the flat portion 930*a* when the flexible display 930 is viewed from above. According to an embodiment, the second antenna array AR2 may be arranged near the first side 941 in an area overlapping the flat portion 930*a* when the flexible display 930 is viewed from above. According to an embodiment, the third antenna array AR3 may be arranged near the first side 941 in an area overlapping the bendable portion 930*b* when the flexible display 930 is viewed from above. In another embodiment, the first antenna array AR1 and the second antenna array AR2 may be arranged in the first side 941, the second side 942, or the third side 943 in an area overlapping the flat portion 930*a* when the flexible display 930 is viewed from above. In another embodiment, the third antenna array AR3 may be arranged on at least a portion of the second side 942 or the third side 943 in an area overlapping the bendable portion 930*b* when the flexible display 930 is viewed from above.

According to various embodiments, the first antenna array AR1 and the second antenna array AR2 may form a beam pattern in a first direction (e.g., z-axis direction) regardless of the closed state and/or open state of the electronic device 900. According to an embodiment, in the case of the electronic device 900 in the open state, the third antenna array AR3 may form a beam pattern in the first direction (e.g., z-axis direction). According to an embodiment, in the case of the electronic device 900 in the closed state, the third antenna array AR3 may form a beam pattern in the second direction (e.g., −z-axis direction) according to the movement of the bendable portion 930*b*. Accordingly, the electronic device 900 may be constituted to expand a beam coverage through the first antenna array AR1, the second antenna array AR2, and/or the third antenna array AR3 according to a change in state. In another embodiment, in the case of the electronic device 900 in the closed state, the third antenna array AR3 may be arranged to form a beam pattern at least partially in a direction (e.g., −x direction) toward which the second side surface 942 faces.

According to various embodiments of the disclosure, the at least one antenna array AR1, AR2, AR3 may be constituted to form beam coverage in various directions according to a change in the position of the flexible display 930 according to a change in the state of the electronic device 900. For example, the dielectric sheet 932 including the at least one array antenna AR1, AR2, AR3 may be applied to an out-foldable electronic device that allows the flexible display to be visible from the outside in a folding state, or a multi-foldable electronic device in which three or more housings operate to be folded relative to each other in various ways.

According to various embodiments, the electronic device (e.g., the electronic device 300 in FIG. 3C) includes a housing (e.g., the housing 310 in FIG. 3A) including a front cover (e.g., the front cover 302 in FIG. 3C), a rear cover (e.g., the rear plate 311 in FIG. 3C) facing a direction (e.g., −z-axis direction in FIG. 3C) opposite to the front cover, and a lateral member (e.g., the lateral member 320 in FIG. 3C) encompassing a space between the front cover and the rear cover, a display panel (e.g., the display panel 431 in FIG. 4) arranged in the space and visible from the outside through the front cover, a dielectric sheet (e.g., the dielectric sheet 500 in FIG. 5C) arranged between the display panel and the front cover, a first mesh pattern part (e.g., the first mesh pattern part 510 in FIG. 5C) formed through a plurality of first conductive lines in the dielectric sheet, and a wireless communication circuit (e.g., the wireless communication circuit 591 in FIG. 5B) arranged in the space and electrically connected to the first mesh pattern part. The first mesh pattern part is formed so that an inner length d1 of a first line (e.g., the first line L1 in FIG. 5C) passing through a first center (e.g., the center C in FIG. 5C) of the first mesh pattern part and facing a first direction (e.g., the direction ① in FIG. 5C) is formed to be longer than an inner length d2 of a second line (e.g., the second line L2 in FIG. 5C) passing through the first center and facing a second direction (e.g., the direction ② in FIG. 5C) perpendicular to the first direction. The first mesh pattern part includes at least one unit pattern (e.g., the unit pattern 516 in FIG. 5C). The unit pattern may be formed so that an inner length d3 of a third line (e.g., the third line L3 in FIG. 5C) passing through a second center (e.g., the center C' in FIG. 5C) of the unit pattern and forming an angle in the range of 0 degrees to 45 degrees with the first direction is formed longer than an inner length d4 of a fourth line (e.g., the fourth line L4 in FIG. 5C) perpendicular to the third line.

According to various embodiments, the dielectric sheet may include a second mesh pattern part (e.g., the second mesh pattern part 520 in FIG. 5B) formed to be spaced apart from the first mesh pattern part at a predetermined interval. The wireless communication circuit may form a beam pattern in a direction (e.g., the z-axis direction in FIG. 4) toward which the front cover faces through an array antenna (e.g., the array antenna AR1 in FIG. 4) including the first mesh pattern part and the second mesh pattern part.

According to various embodiments, the first mesh pattern part and the second mesh pattern part may be arranged in parallel with any one edge (e.g., the first edge 5031 in FIG. 5C) of the dielectric sheet at a predetermined interval.

According to various embodiments, the first mesh pattern part may be arranged to overlap an active area (display area) of the display panel when the front surface cover is viewed from above.

According to various embodiments, at least one dummy pattern part formed through a plurality of second conductive lines to encompass at least a portion of the first mesh pattern part may be further included. The first mesh pattern part and the at least one dummy pattern part may be segmented with respect to each other through at least one gap spaced apart from each other by a predetermined interval between the plurality of first conductive lines and the plurality of second conductive lines.

According to various embodiments, the first mesh pattern part may include a first feed line (e.g., the first feed line 511 in FIG. 5C) connected to a first point (e.g., the first side 513 in FIG. 5C) of the first mesh pattern part and a second feed line (e.g., the second feed line 512 in FIG. 5C) connected to a second point (e.g., the second side 514 in FIG. 5C) of the first mesh pattern part spaced apart from the first point by a predetermined interval.

According to various embodiments, the wireless communication circuit may be configured to transmit and/or receive a first signal having a first polarization through the first feed line, and a second signal having a second polarization perpendicular to the first polarization through the second feed line.

According to various embodiments, the first feed line may include a first subline (e.g., the first subline 5111 in FIG. 5C) vertically connected to the first point at a center of the first point and a second subline (e.g., the second subline 5112 in FIG. 5C) extending perpendicular to the edge of the dielectric sheet from the first subline.

According to various embodiments, the second feed line may include a third subline (e.g., the third subline 5121 in FIG. 5C) vertically connected to the second point at a center of the second point and a fourth subline (e.g., the fourth subline 5122 in FIG. 5C) extending perpendicular to the edge from the third subline.

According to various embodiments, the first feed line may be connected to the first point in a direction perpendicular to the edge at a position farther from the edge of the dielectric sheet than the center of the first point.

According to various embodiments, the second feed line may be connected to the second point in a direction perpendicular to the edge at a position farther from the edge than the center of the second point.

According to various embodiments, the dielectric sheet may include a first area including the first mesh pattern part and a second area encompassing at least a portion of the first area, and may include a first feed pad (e.g., the first feed pad 5021 in FIG. 5C) arranged in the second area and electrically connected to the first feed line and a second feed pad (e.g., the second feed pad 5022 in FIG. 5C) arranged in the second area and electrically connected to the second feed line.

According to various embodiments, a flexible printed circuit board (FPCB) (e.g., the FPCB 590 in FIG. 5C) attached to the dielectric sheet and electrically connected to the first feed line and the second feed line may be included.

According to various embodiments, a printed circuit board (e.g., the printed circuit board 340 in FIG. 3C) arranged in the inner space may be further included, and the FPCB may be electrically connected to the printed circuit board.

According to various embodiments, the wireless communication circuit may be arranged on the FPCB or the printed circuit board.

According to various embodiments, a polarizer (e.g., the polarizer 432 in FIG. 4) arranged between the front cover and the display panel may be further included, the dielectric sheet may be arranged between the polarizer and the front cover or between the polarizer and the display panel.

According to various embodiments, a touch sensor arranged between the front cover and the display panel may be further included, and the dielectric sheet may be arranged between the touch sensor and the front cover.

According to various embodiments, the wireless communication circuit may be configured to transmit and/or receive a wireless signal in a frequency band of 3 GHz to 100 GHz through the first mesh pattern portion.

According to various embodiments, a display includes a display panel (e.g., the display panel 431 in FIG. 4), a dielectric sheet (e.g., the dielectric sheet 500 in FIG. 5C) arranged on the display panel, and a first mesh pattern part (e.g., the first mesh pattern part 510 in FIG. 5C) formed in the dielectric sheet through a plurality of conductive lines (e.g., the conductive lines 515 in FIG. 5C) and operated as an antenna. The first mesh pattern part is formed so that an inner length d1 of a first line (e.g., the first line L1 in FIG. 5C) passing through a first center (e.g., the center C in FIG. 5C) of the first mesh pattern part and facing a first direction (e.g., the direction ① in FIG. 5C) is formed to be longer than an inner length d2 of a second line (e.g., the second line L2 in FIG. 5C) passing through the first center and facing a second direction (e.g., the direction ② in FIG. 5C) perpendicular to the first direction. The first mesh pattern part includes at least one unit pattern (e.g., the unit pattern 516 in FIG. 5C). The unit pattern may be formed so that an inner length d3 of a third line (e.g., the third line L3 in FIG. 5C) passing through a second center (e.g., the center C' in FIG. 5C) of the unit pattern and forming an angle in the range of 0 degrees to 45 degrees with the first direction is formed longer than an inner length d4 of a fourth line (e.g., the fourth line L4 in FIG. 5C) perpendicular to the third line.

According to various embodiments, the dielectric sheet may include a second mesh pattern part (e.g., the second mesh pattern part 520 in FIG. 5B) formed to be spaced apart from the first mesh pattern part at a predetermined interval. The first mesh pattern part and the second mesh pattern part may operate as an array antenna (e.g., the array antenna AR1 in FIG. 4) in which a beam pattern is formed in a direction toward which the display panel faces.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprises:

a housing including:
- a front cover,
- a rear cover facing a direction opposite to a direction of the front cover, and
- a lateral member encompassing a space between the front cover and the rear cover;

a display panel which is arranged in the space and which is arranged to be viewable from an outside of the electronic device through the front cover;

a dielectric sheet arranged between the display panel and the front cover;

a first mesh pattern part formed through a plurality of first conductive lines in the dielectric sheet; and a wireless communication circuit which is arranged in the space, and which is electrically connected to the first mesh pattern part, wherein the first mesh pattern part is formed so that an inner length of a first line, which passes through a first center of the first mesh pattern part and faces a first direction, is longer than an inner length of a second line, which passes through the first center and faces a second direction perpendicular to the first direction, wherein the first mesh pattern part includes at least one unit pattern, wherein the at least one unit pattern is formed so that an inner length of a third line, which passes through a second center of the unit pattern and is at an angle range of 0 to 45 degrees with respect to the first direction, is longer than an inner length of a fourth line, which passes through the second center of the unit pattern and is perpendicular to the third line, wherein the first mesh pattern part includes a first feed line connected to a first point of the first mesh pattern part, wherein the dielectric sheet includes a first area including the first mesh pattern part and a second area encompassing at least a portion of the first area, and wherein the dielectric sheet includes a first feed pad arranged in the second area and electrically connected to the first feed line.

2. The electronic device of claim 1, wherein the dielectric sheet includes a second mesh pattern part formed to be spaced apart from the first mesh pattern part at a predetermined interval, and wherein the wireless communication circuit forms a beam pattern in a direction toward which the front cover faces through an array antenna including the first mesh pattern part and the second mesh pattern part.

3. The electronic device of claim 2, wherein the first mesh pattern part and the second mesh pattern part are arranged in parallel with any one edge of the dielectric sheet at a predetermined interval.

4. The electronic device of claim 1, wherein at least a portion of the first mesh pattern part is arranged to overlap an active area (display area) of the display panel when the front cover is viewed from above.

5. The electronic device of claim 1, further comprising:

at least one dummy pattern part formed through a plurality of second conductive lines to encompass at least a portion of the first mesh pattern part, wherein the first mesh pattern part and the at least one dummy pattern part are segmented with respect to each other through at least one gap spaced apart from each other by a predetermined interval between the plurality of first conductive lines and the plurality of second conductive lines.

6. The electronic device of claim 1, further comprising:

a second feed line connected to a second point of the first mesh pattern part spaced apart from the first point by a predetermined interval.

7. The electronic device of claim 6, wherein the wireless communication circuit is configured to transmit and/or receive a first signal having a first polarization through the first feed line, and a second signal having a second polarization perpendicular to the first polarization through the second feed line.

8. The electronic device of claim 6, wherein the first feed line includes a first subline vertically connected to the first point at a center of the first point and a second subline extending perpendicular to an edge of the dielectric sheet from the first subline.

9. The electronic device of claim 6, wherein the second feed line includes a third subline vertically connected to the second point at a center of the second point and a fourth subline extending perpendicular to an edge of the dielectric sheet from the third subline.

10. The electronic device of claim 9, wherein the first feed line is connected to the first point in a direction perpendicular to the edge at a position farther from the edge of the dielectric sheet than a center of the first point.

11. The electronic device of claim 9, wherein the second feed line is connected to the second point in a direction perpendicular to the edge at a position farther from the edge than the center of the second point.

12. The electronic device of claim 6, wherein the dielectric sheet further includes a second feed pad arranged in the second area and electrically connected to the second feed line.

13. The electronic device of claim 6, comprising:

a flexible printed circuit board (FPCB) attached to the dielectric sheet and electrically connected to the first feed line and the second feed line.

14. The electronic device of claim 13, further comprising:

a printed circuit board arranged in the space, wherein the FPCB is electrically connected to the printed circuit board.

15. The electronic device of claim 1, further comprising:

a touch sensor arranged between the front cover and the display panel, wherein the dielectric sheet is arranged between the touch sensor and the front cover.

16. The electronic device of claim 14, wherein the wireless communication circuit is arranged on the FPCB or the printed circuit board.

17. The electronic device of claim 1, further comprising a polarizer arranged between the front cover and the display panel, wherein the dielectric sheet is arranged between the polarizer and the front cover or between the polarizer and the display panel.

18. The electronic device of claim 14, wherein the wireless communication circuit is configured to transmit or receive a wireless signal in a frequency band of 3 GHz to 100 GHz through the first mesh pattern part.

19. A display comprises:

a display panel;

a dielectric sheet arranged on the display panel; and a first mesh pattern part formed in the dielectric sheet through a plurality of conductive lines and operated as an antenna, wherein the first mesh pattern part is formed so that an inner length of a first line passing through a first center of the first mesh pattern part and facing a first direction is formed to be longer than an inner length of a second line passing through the first center and facing a second direction perpendicular to the first direction, wherein the first mesh pattern part includes at least one unit pattern, wherein the unit pattern is formed so that an inner length of a third line passing through a second center of the unit pattern and forming an angle in a range of 0 degrees to 45 degrees with the first direction is formed longer than an inner length of a fourth line perpendicular to the third line, wherein the first mesh pattern part includes a first feed line connected to a first point of the first mesh pattern part, wherein the dielectric sheet includes a first area including the first mesh pattern part and a second area encompassing at least a portion of the first area, and wherein the dielectric sheet includes a first feed pad arranged in the second area and electrically connected to the first feed line.

20. The display of claim 19, further comprising a second mesh pattern part formed to be spaced apart from the first mesh pattern part at a predetermined interval at the dielectric sheet, wherein the first mesh pattern part and the second mesh pattern part are configured to operate as an array antenna in which a beam pattern is formed in a direction toward which the display panel faces.

* * * * *